US009813512B2

(12) United States Patent
Wilbur et al.

(10) Patent No.: US 9,813,512 B2
(45) Date of Patent: Nov. 7, 2017

(54) SYSTEMS AND METHODS FOR EFFICIENTLY GENERATING A GEOSPATIAL DATA MAP FOR USE IN AGRICULTURAL OPERATIONS

(71) Applicant: AgVerdict, Inc., San Francisco, CA (US)

(72) Inventors: Michael Wilbur, Hillsborough, CA (US); Jason Ellsworth, Kennewick, WA (US); Toji Oommen, Sammamish, WA (US); Adarsha Mohapatra, Redmond, WA (US); David Thayer, Renton, WA (US)

(73) Assignee: AgVerdict, Inc., San Francisco, CA (US)

( * ) Notice: Subject to any disclaimer, the term of this patent is extended or adjusted under 35 U.S.C. 154(b) by 0 days.

(21) Appl. No.: 15/299,881

(22) Filed: Oct. 21, 2016

(65) Prior Publication Data

US 2017/0041407 A1 Feb. 9, 2017

Related U.S. Application Data

(63) Continuation-in-part of application No. 15/133,658, filed on Apr. 20, 2016.

(Continued)

(51) Int. Cl.
*G06F 15/16* (2006.01)
*H04L 29/08* (2006.01)
*H04W 4/00* (2009.01)

(52) U.S. Cl.
CPC .............. *H04L 67/18* (2013.01); *H04L 67/10* (2013.01); *H04L 67/12* (2013.01); *H04W 4/003* (2013.01)

(58) Field of Classification Search
None
See application file for complete search history.

(56) References Cited

U.S. PATENT DOCUMENTS 7,068,816 B1* 6/2006 Knoblauch .......... A01B 79/005
348/144
2004/0246261 A1* 12/2004 Akitsune .............. G09B 29/102
345/581

(Continued)

*Primary Examiner* — Joshua Joo
(74) *Attorney, Agent, or Firm* — Martine Penilla Group, LLP

(57) ABSTRACT

A data receiving module receives sampled agricultural-related data associated with a given geographic area. An analysis module processes the received sampled agricultural-related data to generate a sub-sampled raster of agricultural-related data over the given geographic area. The analysis module processes the sub-sampled raster of agricultural-related data to generate a final output raster of agricultural-related data over the given geographic area. The final output raster has a higher resolution than the sub-sampled raster. A geospatial data map generation module generates image data that when used to control a display of a remote subscriber computing device causes the display to show a geospatial data map based on the final output raster of agricultural-related data over the given geographic area. A communication module transmits instructions including the generated image data to the remote subscriber computing device to cause processing of the image data to display the geospatial data map on the display.

24 Claims, 59 Drawing Sheets

Related U.S. Application Data

(60) Provisional application No. 62/245,953, filed on Oct. 23, 2015, provisional application No. 62/177,375, filed on Apr. 20, 2015.

(56) References Cited

U.S. PATENT DOCUMENTS

| | | | | |
|---|---|---|---|---|
| 2011/0135196 A1* | 6/2011 | Paris | ............... | G06T 7/00 |
| | | | | 382/165 |
| 2011/0135197 A1* | 6/2011 | Paris | ............... | G06T 7/00 |
| | | | | 382/165 |
| 2013/0066666 A1* | 3/2013 | Anderson, Jr. | ...... | A01C 21/005 |
| | | | | 705/7.12 |
| 2014/0002489 A1* | 1/2014 | Sauder | ............ | A01B 79/005 |
| | | | | 345/629 |
| 2015/0302305 A1* | 10/2015 | Rupp | ............ | A01B 79/005 |
| | | | | 706/46 |
| 2015/0310633 A1* | 10/2015 | Nelan | ............ | G06T 7/0002 |
| | | | | 382/110 |
| 2016/0003792 A1* | 1/2016 | Owens | ............ | G01N 33/24 |
| | | | | 702/5 |
| 2016/0302351 A1* | 10/2016 | Schildroth | ......... | A01B 79/005 |
| 2016/0309646 A1* | 10/2016 | Starr | ............ | A01C 21/007 |

* cited by examiner

AGVERDICT

View / Edit Grower Details  Required *  ⊘ Edit  ⊗ Cancel

Company Details

| | | |
|---|---|---|
| JDE# | Organization # | Company Name * |
| N/A | 11444 | Grower C |
| Address Line 1 * | Address Line 2 | Address Line 3 |
| 919 East Pima Road | N/A | N/A |
| State * | City * | Zip Code * |
| California | Morgan Hill | 95037 |
| Phone # * | Email | Confirm Email |
| 408-123-4567 | grower_c@grower_c.com | grower_c@grower_c.com |
| Fax # | Tank Size | Bill To |
| 408-123-4568 | N/A  gallons ▶ | N/A |

Branch Association *
☑ Western Division
☐ Central Division

> Permit Details

> Contact Details

[ Growers ]  [ Tasks ]  [ Tools ]

— Doe, John

View / Edit Grower Details   Required *   ⊘ Edit   ⊗ Cancel

∨ Company Details

∨ Permit Details

∧ Contact Details

| First Name | Middle Name | Last Name | Suffix |
|---|---|---|---|
| John | N/A | Doe | <-Select-> ▶ |

Mobile Phone #   Email   Confirm Email
831-123-4567     N/A     N/A

☐ Same as company details

Address Line 1           Address Line 2   Address Line 3
919 East Pima Road       N/A              N/A State         City            Zip Code
California    Morgan Hill     95037

Phone #            Add Grower as User
408-123-4567       ☐ Allow Access

Created By     Created On
Jane Doe       9/24/2014

Modified By    Modified On
Jane Doe       11/16/2015

AGVERDICT

Growers — 1305
Tasks — 1307
Tools — 1309

1300
1301 — Doe, John — 1303

Field 1
Grower A - Western Division, Big Farm, Field 1

New Boundary — 4801

Boundary Name *
Boundary A

Boundary Description

Boundary Type *
● Management Boundary   ○ Operational Boundary

Plotting Method *
● Draw manually on the map   ○ Upload from a shape file

⊙ Next

SYSTEMS AND METHODS FOR EFFICIENTLY GENERATING A GEOSPATIAL DATA MAP FOR USE IN AGRICULTURAL OPERATIONS

CLAIM OF PRIORITY

This application claims priority under 35 U.S.C. 119(e) to U.S. Provisional Patent Application No. 62/245,953, filed Oct. 23, 2015. This application is also a continuation-in-part (CIP) application under 35 U.S.C. 120 of prior U.S. patent application Ser. No. 15/133,658, filed on Apr. 20, 2016, which claims priority under 35 U.S.C. 119(e) to U.S. Provisional Patent Application No. 62/177,375, filed Apr. 20, 2015, and to U.S. Provisional Patent Application No. 62/245,953, filed Oct. 23, 2015. The disclosure of each above-identified patent application is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to commercial agriculture.

2. Description of the Related Art

Modern commercial agricultural continues to become a more data-driven industry, taking advantage of technological advances in computing and communication resources. As more data is generated about a given agricultural process, significant challenges develop with regard to managing the generated data and distilling the generated data into meaningful information that can ultimately be used to affect agricultural production of a specific terrestrial area. It is within this context that the present invention arises.

SUMMARY

In an example embodiment, a cloud-based system is disclosed for generation of a geospatial data map of agricultural-related data. The system includes a registration module configured to provide an agricultural enterprise control application to a subscriber for installation on a remote subscriber computing device. The system also includes a data receiving module configured to receive sampled agricultural-related data associated with a given geographic area. The system also includes an analysis module configured to process the received sampled agricultural-related data to generate a sub-sampled raster of agricultural-related data over the given geographic area. The analysis module is further configured to process the sub-sampled raster of agricultural-related data over the given geographic area to generate a final output raster of agricultural-related data over the given geographic area. The final output raster has a higher resolution than the sub-sampled raster. The system also includes a geospatial data map generation module configured to generate image data that when used to control a display of the remote subscriber computing device causes the display to show a geospatial data map based on the final output raster of agricultural-related data over the given geographic area. The system also includes a communication module configured to transmit geospatial data map display instructions including the generated image data over a wireless communication channel to the remote subscriber computing device. The geospatial data map display instructions cause the remote subscriber computing device to process the image data to display the geospatial data map on the display of the remote subscriber computing device.

In an example embodiment, a method is disclosed for generation of a geospatial data map of agricultural-related data. The method includes directing operation of a cloud-based computing system to receive sampled agricultural-related data associated with a given geographic area. The method also includes directing operation of the cloud-based computing system to process the received sampled agricultural-related data to generate a sub-sampled raster of agricultural-related data over the given geographic area. The method also includes directing operation of the cloud-based computing system to process the sub-sampled raster of agricultural-related data over the given geographic area to generate a final output raster of agricultural-related data over the given geographic area. The final output raster has a higher resolution than the sub-sampled raster. The method also includes directing operation of the cloud-based computing system to generate image data that when used to control a display of a remote subscriber computing device causes the display to show a geospatial data map based on the final output raster of agricultural-related data over the given geographic area. The method also includes directing operation of the cloud-based computing system to transmit geospatial data map display instructions including the generated image data over a wireless communication channel to the remote subscriber computing device. The geospatial data map display instructions cause the remote subscriber computing device to process the image data to display the geospatial data map on the display of the remote subscriber computing device.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 15B shows the user interface upon selection of the company details menu activation icon, in accordance with some embodiments of the present invention.

FIG. 15C shows the user interface upon selection of the permit details menu activation icon, in accordance with some embodiments of the present invention.

FIG. 15D shows the user interface upon selection of the contact details menu activation icon, in accordance with some embodiments of the present invention.

FIG. 17 shows the user interface upon selection of the add farm icon, in accordance with some embodiments of the present invention.

FIG. 20 shows the user interface upon selection of the add field icon, in accordance with some embodiments of the present invention.

FIG. 21 shows the user interface upon selection of the view/edit field icon, in accordance with some embodiments of the present invention.

FIG. 26 shows the user interface upon selection of the add block icon, in accordance with some embodiments of the present invention.

FIG. 27 shows the user interface upon selection of the view/edit block icon, in accordance with some embodiments of the present invention.

FIG. 32 shows the user interface upon selection of the add sub-block icon, in accordance with some embodiments of the present invention.

FIG. 33 shows the user interface upon selection of the view/edit sub-block icon, in accordance with some embodiments of the present invention.

FIG. 48 shows the user interface upon selection of the create new boundary icon, in accordance with some embodiments of the present invention.

DETAILED DESCRIPTION

Figure 1:
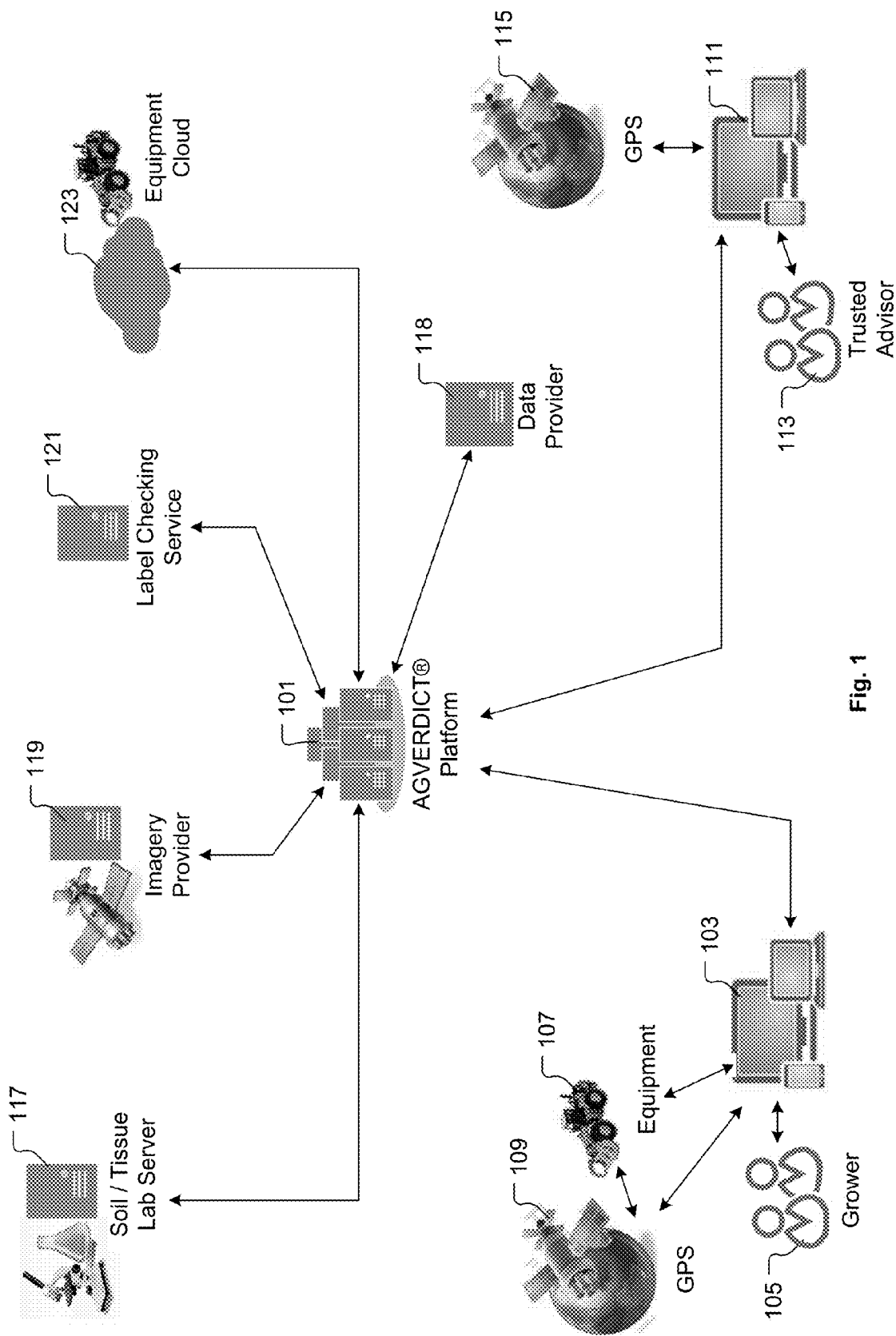
FIG. 1 shows an overview of the AGVERDICT® system, in accordance with some embodiments of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Systems and methods are described herein for collection, management, and analysis of agricultural data to generate integrated information and agricultural process prescriptions for a specific terrestrial area identified by geolocation. These systems and associated methods are referred to herein as the "AGVERDICT® system" provided by AgVerdict, Inc. of San Francisco, Calif. The AGVERDICT® system includes a computing platform that provides a suite of tools for enabling growers to raise their crops more efficiently and increase their return on investment in a sustainable way. All citations herein to the product name "AGVERDICT®" is only by way of example, and the name and/or trademark is simply used for easy of reference to example systems, methods, and/or products. The functionality provided or enabled by the systems described herein may be referred to by any name, so long as the processing and information produced by said processing is enabled. Furthermore, the AGVERDICT® system is one that can be embodied in a number of forms, including a processing server system, a server-client system, a cloud-based system, a standalone client, a portable device, interconnected computers, networked computers, datacenter servers, datacenter storage, distributed servers and storage, local processed routines and remotely processed routines, hybrid-routines that require processing by local computers and/or systems that can process technical computing operations to produce technical information based on templates, based on requests made by clients, based on predefined formulas, based on learned data, based on information mined from local or distributed databases or data sources, or the like. With the above in mind, several example implementations will now be described.

The AGVERDICT® system provides a repository for records related to a grower's agricultural production enterprise. The AGVERDICT® system is also defined to provide assistance to the grower in making decisions about their particular agricultural activities based on the records related to the grower's agricultural production enterprise. Additionally, the AGVERDICT® system is defined to assist the grower with food security and regulatory compliance matters applicable to the grower's agricultural production enterprise. Through the AGVERDICT® system, growers are able to collaborate with trusted advisors, such as pest control advisors (PCSs), agronomist advisors, soil advisors, among other types of advisors, to share data about the grower's agricultural assets and to make agricultural process decisions in a more collaborative and efficient manner. Also, the grower is able to continuously communicate data to and receive data from the AGVERDICT® system, thereby enabling the growers to manage their agricultural assets and equipment on an ongoing basis and in an informed manner.

Users can communicate with the AGVERDICT® system through the Internet using many different electronic devices such as computers, smart phones, and/or tablets, among others, and from essentially anywhere, including the farm, tractor, home, office, and/or transportation vehicle, among other locations. Through the AGVERDICT® system, grower's have full control of their agricultural enterprise data and can control sharing of their data with others, such as with trusted advisors. Using historical data, weather forecasts, trends in the commodity market, and any other type of relevant data, the AGVERDICT® system is defined to model, forecast, and assist the grower with making decisions about future actions concerning their agricultural assets.

FIG. 1 shows an overview of the AGVERDICT® system, in accordance with some embodiments of the present invention. The AGVERDICT® system operates on a cloud-based computing platform 101. In some embodiments, the AGVERDICT® system is built on the cloud based computing platform 101 using a service oriented architecture (SOA). In some embodiments, services provided by the AGVERDICT® system are implemented using web servers, high throughput computing servers, databases, big data storage systems, content delivery networks (CDNs), among other types of cloud-based computing systems and technology. The AGVERDICT® system can be hosted on essentially any cloud provider, such as a cloud provider that provides Infrastructure as a Service (IaaS). For instance, in an example embodiment, the AGVERDICT® system is hosted on the Amazon Web Services (AWS) cloud system. It should be understood that the AGVERDICT® system is a distributed system that allows for scaling out as the user base increases and as data size grows. Moreover, it should be understood that the AGVERDICT® system is not limited to any country or region. Also, the capabilities of the AGVERDICT® system can be leveraged for any farm, range, crop, etc.

In some examples, the data produced and/or accessed by the AGVERDICT® system may be represented in graphical user interfaces (GUIs). The GUIs may form part of a user interface that provides control and access to information, functions for filtering, selection, optimizing and/or sending requests to severs from local computers, portable devices or any computing device that can serve data and/or process data and/or present data in one or more GUIs. These user interfaces provide, by way of example, technical functionality that solve the problem of today's systems that are neither integrated nor provide multi-faceted responses. By way of example, server processing can perform operations that combine data from multiple disparate sources in a dynamic form, and instantly or substantially instantly produce or return data to a requesting client.

As shown in FIG. 1, the AGVERDICT® system is defined to communicate with one or more computer systems 103 of a grower 105. The computer systems 103 of the grower 105 can be essentially any type of computer system capable of communicating data over the Internet, such as a desktop computer, a laptop computer, a smart phone, a tablet computer, among others. The computer systems 103 of the grower 105 can also be configured to communicate with agricultural equipment 107 used by the grower and with a global positioning system device 109 onboard the agricultural equipment 107. The computer systems 103 of the grower 105 can also be configured to communicate with the global positioning system device 109 of the grower 105. For example, if the grower 105 is engaged in field work, data compiled by the grower 105 can be associated with geolocation data acquired from the global positioning system device 109. Communication between the computer systems 103 of the grower 105 and the agricultural equipment 107 and/or global positioning system device 109 can be done through a wireless mode of communication and/or through a wired mode of communication. For example, in some embodiments, data is communicated between the computer systems 103 of the grower 105 and the agricultural equipment 107 and/or global positioning system device 109 over a cellular data communication network, or through radio transmission, or through a combination of cellular network and Internet, or through transfer of data on a flash memory device, or through other data communication methods.

The AGVERDICT® system is also defined to communicate with one or more computer systems 111 of a trusted advisor 113 of the grower 105. The computer systems 111 of the trusted advisor 113 can be essentially any type of computer system capable of communicating data over the Internet, such as a desktop computer, a laptop computer, a smart phone, a tablet computer, among others. The computer systems 111 of the trusted advisor 113 can be configured to communicate with a global positioning system device 115 of the trusted advisor 113. For example, if the trusted advisor 113 is engaged in field work, data compiled by the trusted advisor 113 can be associated with geolocation data acquired from the global positioning system device 115.

The AGVERDICT® system is also defined to communicate with one or more computer systems 117 of a soil and/or tissue laboratory. For example, if the grower 105 and/or trusted advisor 113 has collected soil and/or tissue samples from the field and provided those samples to the soil and/or tissue laboratory for analysis, the results of the analysis can be communicated from the computer systems 117 of the soil and/or tissue laboratory to the AGVERDICT® system for conveyance to the grower 105 and/or trusted advisor 113, and/or for incorporation into further data integration and processing by the AGVERDICT® system. Similarly, the AGVERDICT® system is also defined to communicate with one or more computer systems 119 of an imagery provider. The imagery provider can be essentially any type of entity that provides aerial images of the growers agricultural assets, i.e., farms, equipment, etc. Aerial images can be transmitted from the computer systems 119 of the imagery provider to the AGVERDICT® system for conveyance to the grower 105 and/or trusted advisor 113, and/or for incorporation into further data integration and processing by the AGVERDICT® system.

Also, in some embodiments, the AGVERDICT® system may receive data from one or more data providers 118. For example, in some embodiments, the data provider 118 can provide weather data for geographic locations of interest. The weather data may be historical data and/or current data and/or forecast data. And, in some embodiments, the data provider 118 can provide pest activity data for geographic locations of interest. The pest activity data may be provided from state-sponsored databases or from other sources, and may be historical data and/or current data and/or forecast data. It should be understood that the above-mentioned weather data and pest activity data are examples of types of data that can be provided by the data provider(s) 118 to the AGVERDICT® system. In various embodiments, different data provider(s) 118 can be accessed to provide essentially any type of data to the AGVERDICT® system that is relevant to the user's agricultural enterprise.

The AGVERDICT® system is also defined to communicate with one or more computer systems 121 of a label checking service. The label checking service can be essentially any entity that provides information and/or recommendations on proper use of agricultural products, such as seed, fertilizer, herbicide, pesticide, and essentially any other type of product, so as to ensure compliance with manufacturer directions, safety precautions, state regulatory requirements, and/or federal regulatory requirements. For example, in some embodiments, the AGVERDICT® system may develop a prescription for a given field that requires application of particular agricultural product to the given field. And, prior to providing that prescription to the grower 105, the AGVERDICT® system can communicate through the computer systems 121 of the label checking service to ensure that the prescription is safe and legal.

The AGVERDICT® system is also defined to communicate with an equipment cloud 123. The equipment cloud 123 is a cloud-based computing system that receives data from and transmits data to various types of agricultural equipment having Internet and/or wireless data communication capability. The equipment cloud 123 can also include resources that provide information about the operational capabilities of various types of equipment. In this manner, the grower 105 can register their equipment 107 with the equipment cloud 123 so that the AGVERDICT® system can obtain a real-time status and location of the equipment 107, and can receive information from the equipment 107 about its activities/performance, and can transmit instructions to the equipment 107 directing performance of particular activities as a function of schedule and/or geolocation.

It should be understood that the connectivity of the AGVERDICT® system as described with regard to FIG. 1 is provided by way of example. In other embodiments, the AGVERDICT® system can be defined to communicate with fewer or more entities than shown in FIG. 1, or with other agriculture support entities not specifically shown in FIG. 1. For example, in some embodiments, the AGVERDICT® system can communicate with one or more computer systems of an agricultural product supplier to determine the availability of a particular agricultural product within a particular geographic region. It should be understood that essentially any agricultural service and/or product supplier can be connected with the AGVERDICT® system as a resource for enhancing data processing/analysis and resource management for the grower 105.

Figure 2:
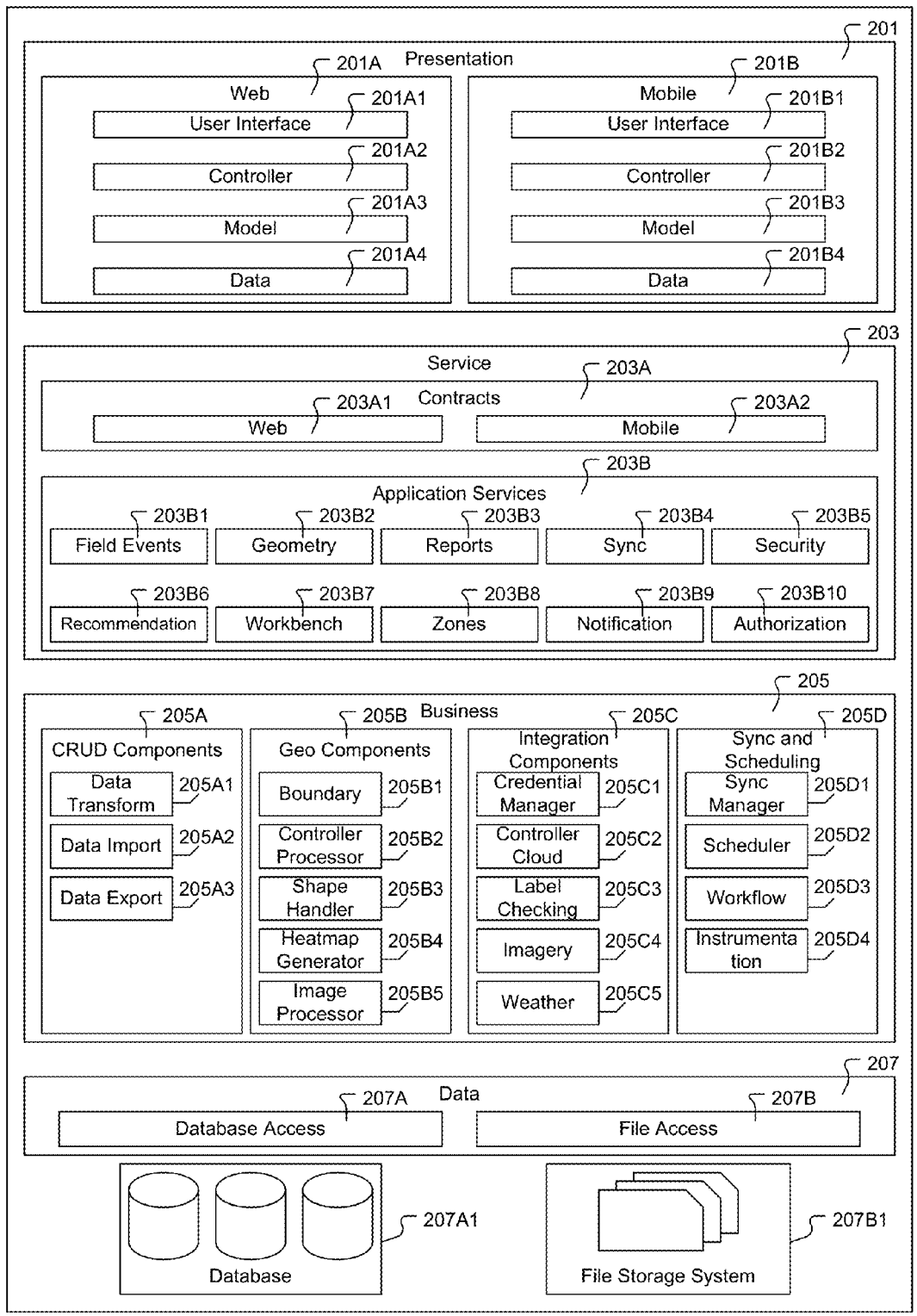
FIG. 2 shows a logical architecture diagram for the AGVERDICT® system, in accordance with some embodiments of the present invention.

FIG. 2 shows a logical architecture diagram for the AGVERDICT® system, in accordance with some embodiments of the present invention. The logical architecture includes a presentation layer 201, a service layer 203, a business layer 205, and a data management layer 207. In some embodiments, the presentation layer 201 provides a web interface 201A and a mobile interface 201B for operation with the computer systems of the entities that interface with the AGVERDICT® system. The web interface 201A includes a user interface module 201A1 defined to provide a graphical user interface (GUI) for user access to the AGVERDICT® system for display on the user's computer system, such as within an Internet browser. The GUI provided by the user interface module 201A1 includes various graphical components, such as controls, fields, style sheets, etc., to enable entry of data, retrieval of data, navigation through data, processing of data, and searching of data within the AGVERDICT® system. In general, the user interface module 201A1 manages the display of information to the user.

The web interface 201A also includes a controller module 201A2 defined to process input received from the user through various input modes such as mouse, keyboard, touchscreen, voice command, gesture, etc., and direct the performance of various actions based on the input received from the user. The model 201A3 manages the behavior and data of the AGVERDICT® system within the presentation layer 201 as it relates to the web interface 201A, including directing response to requests for information received through the user interface module 201A1 and directing performance of necessary actions through the controller module 201A2. The web interface 201A also includes data 201A4 which represents any type of textual, graphical, video, image, sound, or other type of data required for presentation and operation of the web interface 201A.

The mobile interface 201B includes a user interface module 201B1 defined to provide a GUI for user access to the AGVERDICT® system for display on the user's mobile electronic device, such as within an application. The mobile interface 201B also includes a controller module 201B2, a model 201B3, and data 201B4. The controller module 201B2 is defined to process input received from the user through various input modes such as touchscreen, voice command, gesture, etc., and direct the performance of various actions based on the input received from the user. The model 201B3 manages the behavior and data of the AGVERDICT® system within the presentation layer 201 as it relates to the mobile interface 201B, including directing responses to requests for information received through the user interface module 201B1 and directing performance of necessary actions through the controller module 201B2. The data 201B4 includes any type of textual, graphical, video, image, sound, or other type of data required for presentation and operation of the mobile interface 201B. The data 201B4 also includes downloaded data for enabling offline operations of the AGVERDICT® system on the user's mobile device.

The service layer 203 includes a contracts module 203A that specifies how to access data and services of the AGVERDICT® system. The contracts module 203A provides a web platform contract 203A1 and a mobile platform contract 203A2. Each of the web platform contract 203A1 and the mobile platform contract 203A2 provides a set of requirements and/or constraints for components, connectors, and data elements within the AGVERDICT® system. In some embodiments, the web platform contract 203A1 and the mobile platform contract 203A2 specifies a number of application programming interfaces (APIs) that can be called to access and manipulate data within the AGVERDICT® system.

The service layer 203 also includes an application services module 203B for providing various service applications and utility applications for operation within the AGVERDICT® system. In some embodiments, the application services module 203B includes a field events module 203B1 that handles data input and data retrieval associated with any activity that may occur within a grower's field, such as soil turning, bed preparation, application of agricultural products (fertilizer, herbicide, pesticide, etc.), planting, irrigation, pruning, culling, harvesting, among essentially any other activity that may occur within the grower's field. Data handled by the field events module 203B1 can be entered manually by the grower or by an entity authorized by the grower and/or entered automatically by systems in communication with the AGVERDICT® system, such as by controllers operating on various types of agricultural equipment within the grower's field.

The application services module 203B includes a geometry module 203B2 that handles geometry-related operations within the AGVERDICT® system. For example, the geometry module 203B2 provides a utility for drawing polygons to define geographic field boundaries and for plotting points corresponding to geographic locations on aerial/satellite images and/or maps. In an example embodiment, the geometry module 203B2 provides a drawing utility that can be used by a grower to draw annotations on an aerial/satellite image of the grower's field. The geometry module 203B2 is a utility application that can be used by other applications within the AGVERDICT® system.

The application services module 203B includes a reports module 203B3 that provides tools which allow a grower to select and organize data about their agricultural activities. The report module 203B3 can provide for generation of predefined reports and custom reports. The reports module 203B3 provides for generation of reports on essentially any activity associated with the grower's agricultural business, such as field event reports, product application reports, production reports, irrigation reports, yield reports, trap reports, among many other types of reports.

The application services module 203B includes a sync module 203B4 that provides for synchronization of data between the mobile application and the backend platform of the AGVERDICT® system when the mobile application transitions from an offline state to an online state. The application services module 203B includes a security module 203B5 that provides a utility for determining whether or not a user can access particular data and services within the AGVERDICT® system. The security module 203B5 is a utility application that can be used by other applications within the AGVERDICT® system.

The application services module 203B includes a recommendation module 203B6 that provides for generation of a prescription for a grower based on data entered into and processed within the AGVERDICT® system. A prescription can be generated for essentially any activity related to the grower's agricultural operations, such as for soil preparation, application of products (fertilizers, pesticides, herbicides, etc.), planting, testing, irrigation, harvesting, among many other activities. The prescription can be a uniform prescription in which the prescribed activity is to be performed in a uniform manner over an entire field or collection of fields. The prescription can also be a variable-rate prescription in which the activity is to be performed as a function of geolocation within a given field. The recommendation module 203B6 is also defined to generate instructions for various types of equipment controllers to implement the generated prescriptions. For example, the recommendation module 203B6 can generate instructions for a controller of a fertilizer application device, so that as the fertilizer application device is moved throughout the field, a variable-rate prescription for fertilizer application will be performed automatically based on the real-time geolocation of the fertilizer application device within the field.

The application services module 203B includes a workbench module 203B7 that provides a utility for queuing data for processing within the AGVERDICT® system. For example, when agriculture-related data is entered into the AGVERDICT® system from various sources, such as from controllers on equipment, from users, from laboratories, from trusted advisors, etc., the workbench module 203B7 manages the incoming data by batching the data if needed and queuing the data for processing by an appropriate module of within the AGVERDICT® system.

The application services module 203B includes a zones module 203B8 that executes different algorithms on agriculture-related data for a given geographic area, e.g., for a given field, to identify zones of having similar characteristics within the given geographic area, which in turn provides for zone-based land management. The application services module 203B also includes a notification module 203B9 that provides a utility for transmitting a notification to a user for various purposes, such as for taking an action, notifying of an event that occurred, sending of a report, requesting an approval, and for essentially any other purpose that may arise within the context of agricultural operations. The notification module 203B9 can be defined to transmit notifications through the web interface 201A, the mobile interface 201B, and/or through essentially any other mode of communication, such as email, text, phone, etc. The application services module 203B also includes an authorization module 203B10 that provides for secure access to the AGVERDICT® system by a user.

The business layer 205 controls routing and processing of data within the AGVERDICT® system. The business layer 205 includes a CRUD (create, read, update, delete) components module 205A for handling database operations. The CRUD components module 205A includes a data transform module 205A1 that provides a utility for converting between various data formats. The CRUD components module 205A also includes a data import module 205A2 that provides a utility for entering data into a database 207A1 and/or a storage system 207B1. The CRUD components module 205A also includes a data export module 205A3 that provides a utility for retrieving data from the database 207A1 and/or the storage system 207B1.

The business layer 205 includes a geometry components module 205B that provides various utilities for performing geometry-related operations to support implementation of the geometry module 203B2. The geometry components module 205B includes a boundary module 205B1 that provides a utility for defining and adjusting one or more closed polygon shapes corresponding to boundaries of a geographic area of interest, such as of a field, or body of water, or other terrestrial feature.

The geometry components module 205B also includes a controller processor module 205B2 that provides a utility for processing data that enters the AGVERDICT® system from various types of machine controllers operating on various types of agricultural equipment. The controller processor module 205B2 can be defined to convert data from a given controller data format into an internal format used by the AGVERDICT® system.

The geometry components module 205B also includes a shapefile handler module 205B3 that provides for conversion of data received in a shapefile format into an internal format used by the AGVERDICT® system. The shapefile format is a geospatial vector data format used by various geographic information system (GIS) applications to describe vector features, such as a points, lines, and polygons. The shapefile handler module 205B3 also provides for conversion of data from the internal format used by the AGVERDICT® system into the shapefile format for exporting of data from the AGVERDICT® system in the shapefile format. The shapefile handler module 205B3 can also apply various data interpolation algorithms to facilitate conversion of the data from the shapefile format into the internal format used by the AGVERDICT® system, vice-versa.

The geometry components module 205B also includes a heat map generator module 205B4 that provides for processing of a given data set to present the given data set in a visual format, such as a heat map for a given geographic area. In some embodiments, the heat map includes an aerial/satellite image of the given geographic area with an overlay of colored regions, where different colors of the colored regions correspond to different value ranges of a given parameter. In some embodiments, the heat map generator module 205B4 can also provide some user controls for generation and/or customization of heat maps. And, in some embodiments, the heat map generator module 205B4 can implement various data interpolation algorithms to facilitate generation of heat maps for a given geographic area based on a given input data set for the given geographic area. The geometry components module 205B also includes an image processor module 205B5 that provides a utility for converting an input aerial image and/or satellite image into a raster that can be stored and used for generation of heat maps and other types of data processing. The raster is a column by row segmentation of a given image.

The business layer 205 includes an integration components module 205C that handles API integration between the AGVERDICT® system and other external interfacing systems. The integration components module 205C includes a credential manager module 205C1 for handling API integration between the AGVERDICT® system and interfacing security service systems, such as authentication services and controller access services, among others. The integration components module 205C includes a controller cloud module 205C2 for handling API integration between the AGVERDICT® system and a cloud system that handles interfacing and communication with various controllers of various types of agricultural equipment.

The integration components module 205C includes a label checking module 205C3 for handling API integration between the AGVERDICT® system and a label information system to enable querying of the label information system to obtain information about product usage requirements and to support verification of generated prescriptions for compliance with manufacturer specifications and regulatory requirements. The integration components module 205C also includes an imagery module 205C4 for handling API integration between the AGVERDICT® system and image provider systems, such as those of aerial image providers and/or satellite image providers, to enable acquisition of aerial/satellite images of particular geographical areas. The integration components module 205C also includes a weather module 205C5 for handling API integration between the AGVERDICT® system and weather information systems, to provide for retrieval of historical and current weather data and weather forecast data.

The business layer 205 includes a sync and scheduling module 205D that handles data synchronization activities within the AGVERDICT® system and between external devices and the AGVERDICT® system. The sync and scheduling module 205D includes a sync manager module 205D1 for implementing the sync module 203B4 and for resolving conflicts that arise during data sync operations. The sync and scheduling module 205D includes a scheduler module 205D2 for scheduling activities within the AGVERDICT® system. In some embodiments, the sync and scheduling module 205D can also include a workflow module 205D3 for tracking a given workflow through different states of completion. The workflow module 205D3 also supports providing users with status updates of a given workflow and handles issuing of requests for action and/or notifications associated with a given workflow. In some embodiments, the sync and scheduling module 205D can also include an instrumentation module 205D4 for providing diagnostics on internal operations of the AGVERDICT® system.

The data layer 207 provides utilities for data management. In some embodiments, the data layer 207 includes a database access module 207A and a file access module 207B. The database access module 207A controls interaction with the database 207A1. Similarly, the file access module 207B controls interaction with the storage system 207B1.

Figure 3:
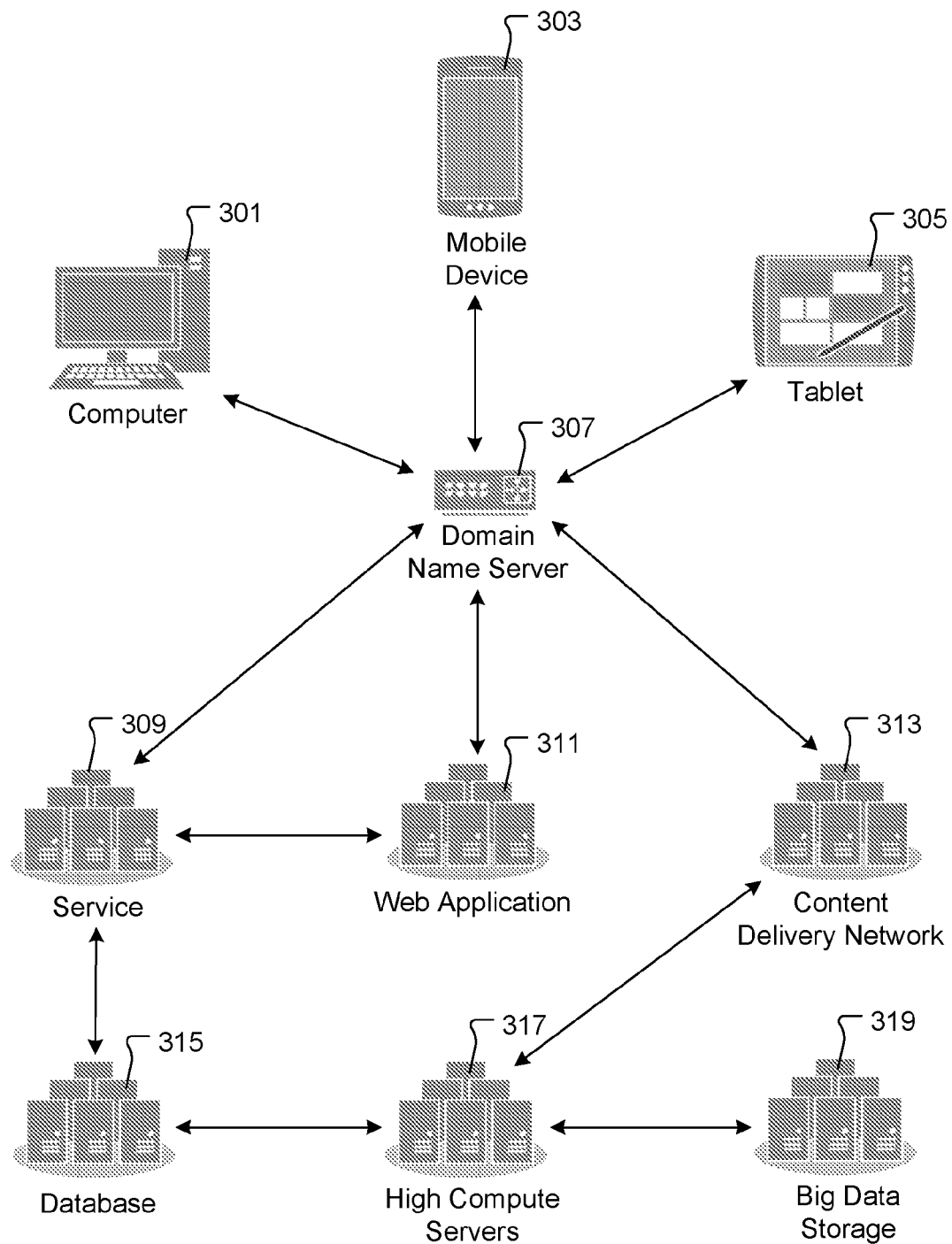
FIG. 3 shows a physical architecture diagram of the AGVERDICT® system, in accordance with some embodiments of the present invention.

FIG. 3 shows a physical architecture diagram of the AGVERDICT® system, in accordance with some embodiments of the present invention. Users can access the AGVERDICT® system from essentially any type of computing device, including computers 301, mobile devices 303, tablets 305, among others. Through their computing device, the user can access a domain name server (DNS) 307 using a universal resource locator to reach the front end of the AGVERDICT® system. A web application server 311 operates to provide the user interface of the AGVERDICT® system to the user's computing device, by way of the DNS 307. A content delivery network (CDN) 313 operates to deliver content for the user interface, by way of the DNS 307. Some content can be transmitted from high compute servers 317 through the CDN 313 to the user interface, by way of the DNS 307. A web service computing system 309 operates to implement the functionality of the service layer 203 as discussed with regard to FIG. 2. The web service computing system 309 is configured for data communication with the DNS 307, the web application server 311, and a database 315.

The high computer servers 317 are configured for data communication with both the database 315 and a data storage system 319. In some embodiments, the data storage system 319 is configured as a big data storage system, such as a cloud data storage system, e.g., Amazon S3, among others. Also, to improve performance and provide for scaling, the high compute servers 317 can be separated into a number of server segments for dedicated types of the data processing. For example, in some embodiments, there may be separate high compute server segments for processing controller files, processing remote sensing files, performing data analysis and decision making, and providing external data processing and synchronization. Depending on the computing power required, the AGVERDICT® system will elastically scale to allocate more computing resources to perform the required data processing at a given time. Also, it should be understood that because the AGVERDICT® system is implemented as a cloud-based architecture, the AGVERDICT® system can be duplicated in a mirrored manner across multiple cloud-based computing platforms and/or datacenters to provide for redundancy and reliability.

Figure 4:
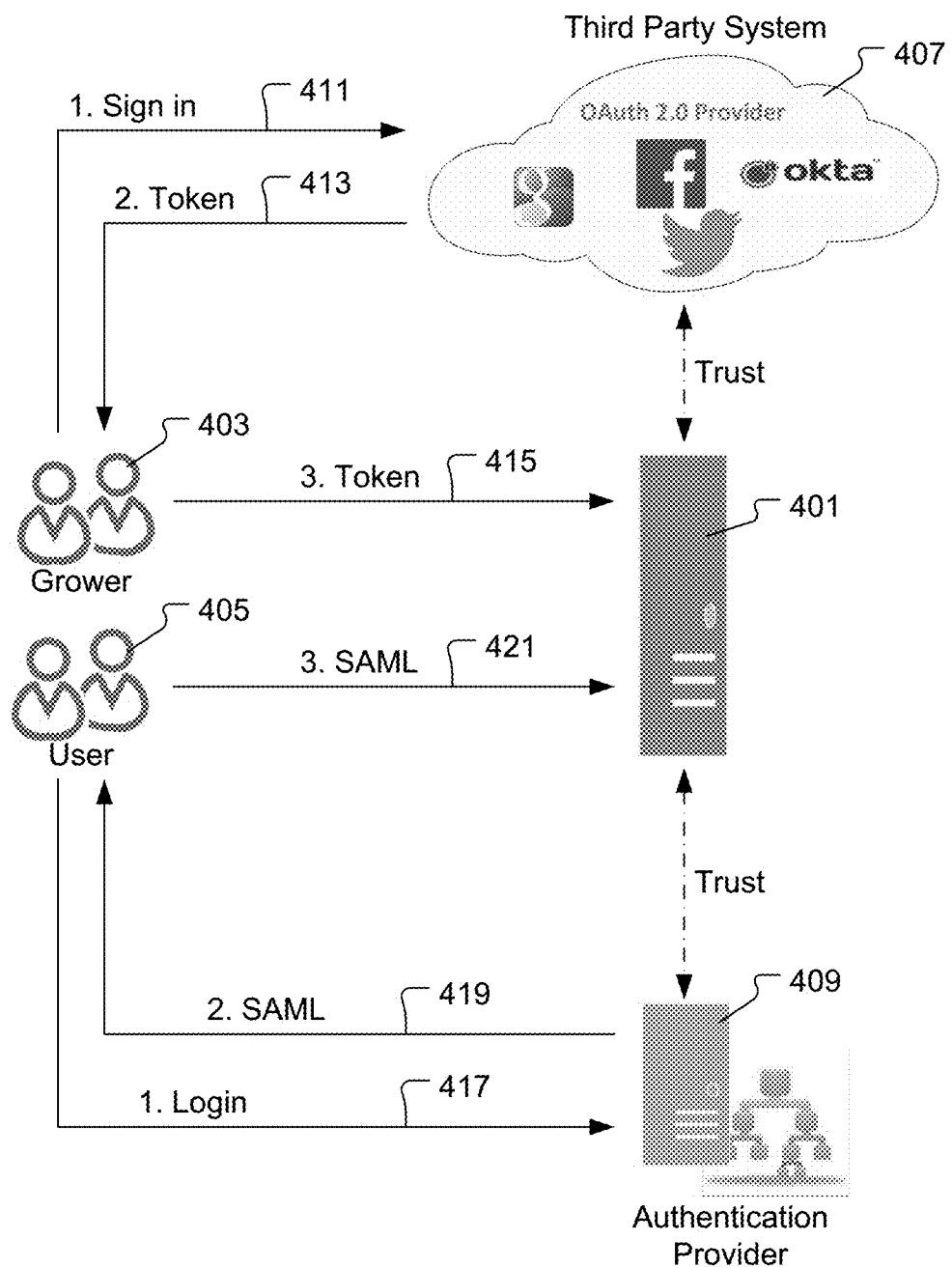
FIG. 4 shows a diagram of how growers and users can be authenticated for login to the AGVERDICT® system, in accordance with some embodiments of the present invention.

FIG. 4 shows a diagram of how growers and users can be authenticated for login to the AGVERDICT® system, in accordance with some embodiments of the present invention. In some embodiments, a grower 403 can login to the AGVERDICT® system 401 through a third party system 407 that implements an approved authentication protocol. For example, in some embodiments, the grower 403 can login to the AGVERDICT® system 401 through third party systems 407, such as Google, Facebook, etc., which implement OAuth 2.0 as an approved authentication protocol. In these embodiments, the grower 403 signs in to the third party system 407 using the approved authentication protocol, as indicated by arrow 411. Then, the third party system 407 transmits an authentication token to the grower 403, i.e., to the grower's computing device, as indicated by arrow 413. The authentication token is then transmitted to the AGVERDICT® system 401, as indicated by arrow 415. The AGVERDICT® system 401 validates the received authentication token, and upon successful validation provides the grower 403 with access to the AGVERDICT® system 401.

In some embodiments, a user 405, such as a trusted advisor, can login to the AGVERDICT® system 401 through a claim-based authentication provider 409. For example, in some embodiments, the user 405 can login to the AGVERDICT® system 401 through Active Directory Federation Services (ADFS). In these embodiments, the user 405 signs in to the claim-based authentication provider 409, as indicated by arrow 417. Then, the claim-based authentication provider 409 transmits an authentication claim to the user 405, i.e., to the user's computing device, as indicated by arrow 419. In some embodiments, the authentication claim can be transmitted as a security assertion markup language (SAML) claim. The authentication claim is then transmitted to the AGVERDICT® system 401, as indicated by arrow 421. The AGVERDICT® system 401 validates the received authentication claim, and upon successful validation provides the user 405 with access to the AGVERDICT® system 401.

The AGVERDICT® system is defined to provide different levels of authorization, i.e., of roles and permissions, to different accessing entities. For example, a grower can have a higher level of authorization than an advisor hired by the grower, such that the grower has access to all of the grower's data, but the trusted advisor only has access to a relevant portion of the grower's data. The authorization model is granular and extensible. In some embodiments, authorization levels can be based on organizational structure, such that different levels within an organization, e.g., corporate, region, branch, etc., can have different levels of authorization.

Figure 5:
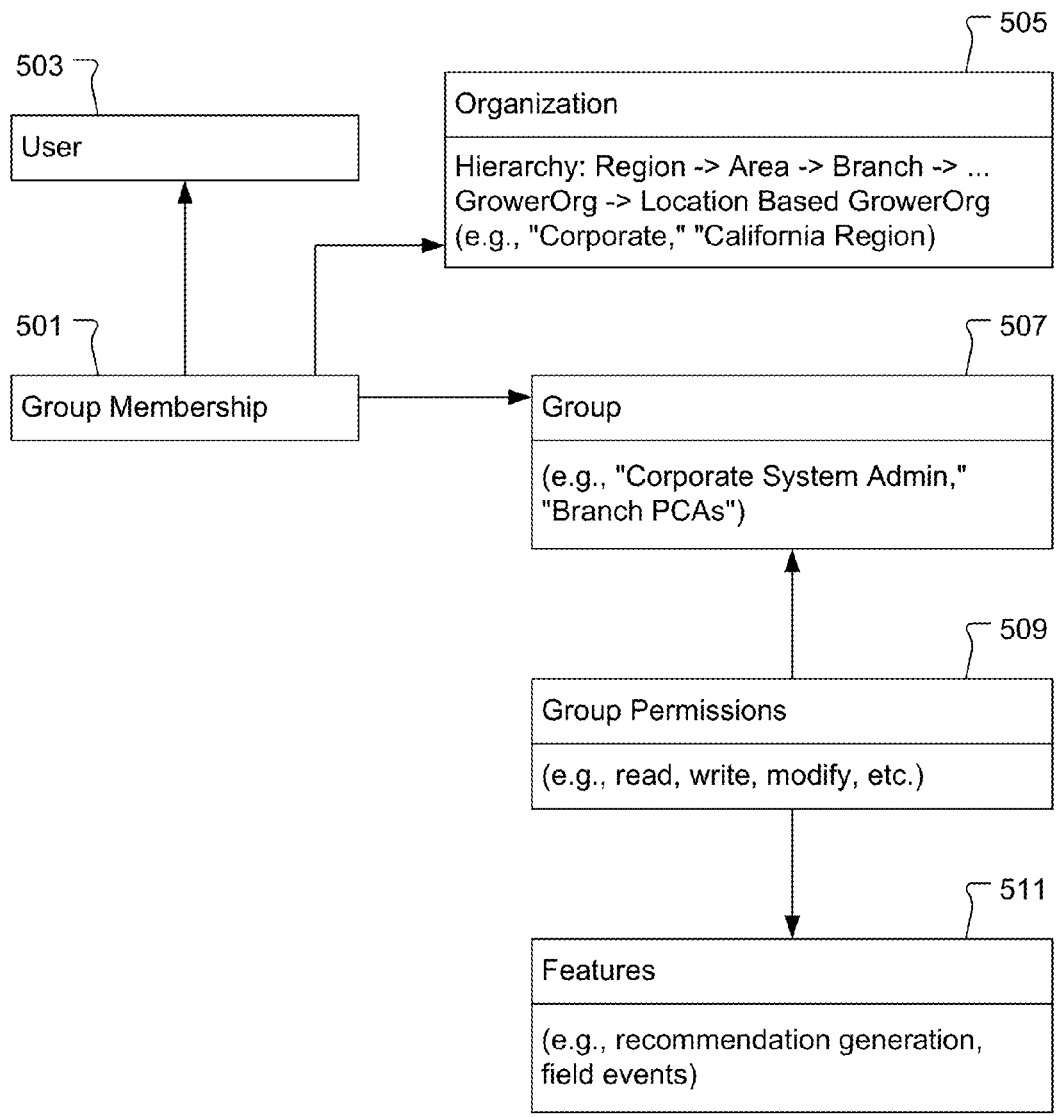
FIG. 5 shows a diagram of an example authorization model implemented within the AGVERDICT® system, in accordance with some embodiments of the present invention.

FIG. 5 shows a diagram of an example authorization model implemented within the AGVERDICT® system, in accordance with some embodiments of the present invention. A group membership allocation table 501 is configured to provide for association of each user 503 with one or more groups and/or one or more organizational levels. Some example organizational levels are shown in an organization table 505. Each group defines a particular set of roles and permissions for a particular set of functions within the AGVERDICT® system. For example, a group 507 is shown to correspond to users that are associated with organizational levels of "Corporate System Admin" and "Branch PCAs." The example group 507 is shown to have a set of example group permissions 509, including read, write, modify, etc. And, the set of example group permissions 509 are shown to apply to example roles 511 of prescription generation and field event generation. Therefore, in the example of FIG. 5, a user associated with either "Corporate System Admin" or "Branch PCAs" will have the roles and permissions defined by the group 507, which includes reading, writing, and modifying as it relates to prescription generation and field event generation. Of course, it should be understood that FIG. 5 is simply an example for discussion purposes. It should be appreciated the authorization model implemented within the AGVERDICT® system is flexible enough to control allocation of roles and permissions to any given user and provide for collection of roles and permissions into any number of groups, where a given group can be associated with a particular organizational level.

The AGVERDICT® system enables growers to interact and collaborate with trusted entities, such as advisors, applicators, managers, and any other trusted entity associated with the grower's agricultural operations. For example, a trusted advisor can create a prescription within the AGVERDICT® system for some action to be taken on the grower's field, such as application of an agricultural product, e.g., fertilizer, pesticide, etc. The grower will receive a notification of issuance of the prescription from the AGVERDICT® system. Then, the grower can access the prescription through the AGVERDICT® system and take the prescribed action. Then, the grower can enter a record of completion of the prescribed action within the AGVERDICT® system. In this manner, the AGVERDICT® system maintains a record of the prescription and record of what was actually done by the grower in response to the prescription.

Figure 6:
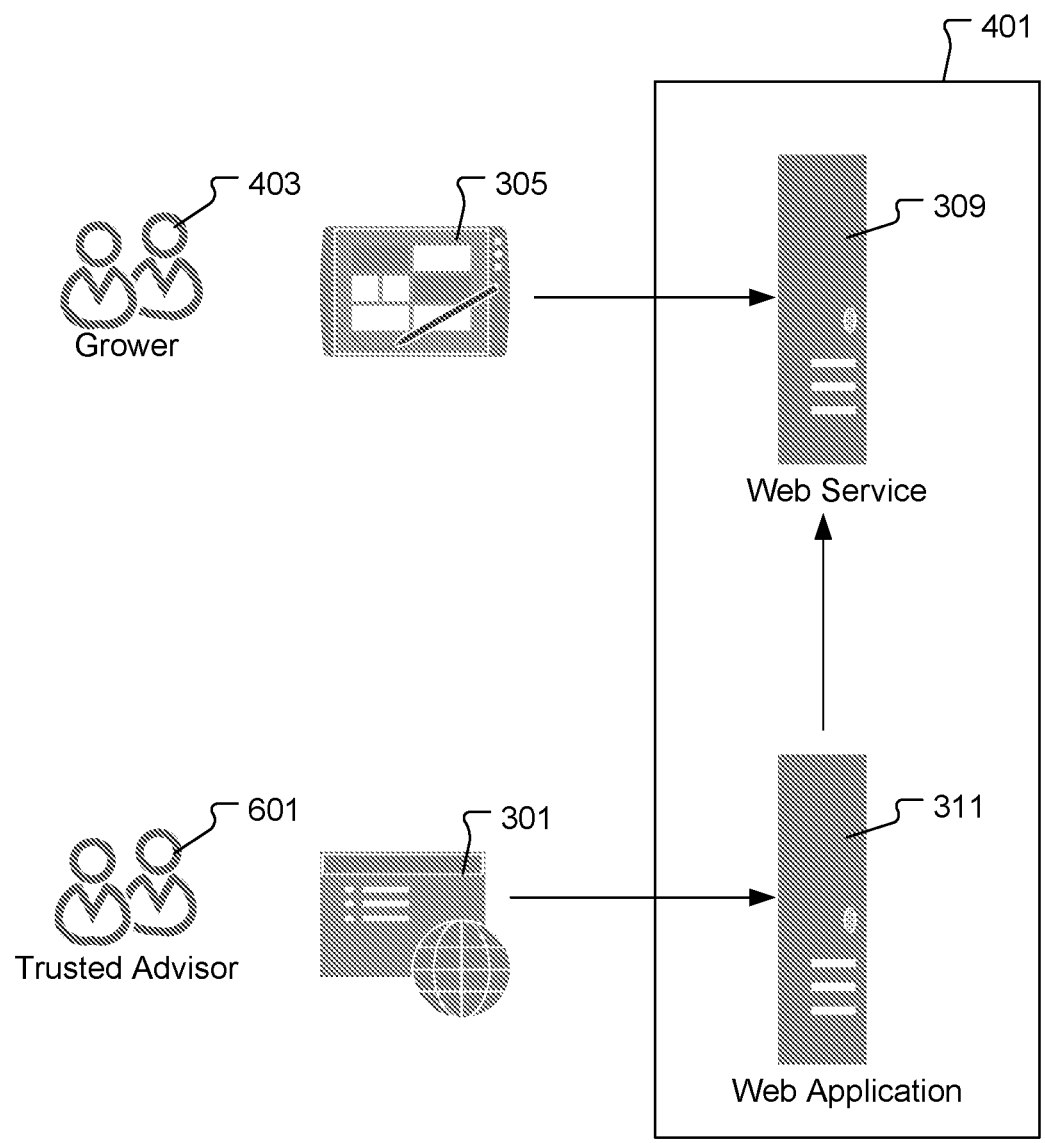
FIG. 6 shows an example diagram of how the AGVERDICT® system provides for interaction between the grower and a trusted advisor, in accordance with some embodiments of the present invention.

FIG. 6 shows an example diagram of how the AGVERDICT® system provides for interaction between the grower 403 and a trusted advisor 601, in accordance with some embodiments of the present invention. In this particular example, the grower 403 uses an application executing on the tablet computing device 305 to access the AGVERDICT® system 401. And, the trusted advisor 601 uses an Internet browser executing on the computer 301 to access the AGVERDICT® system 401. The Internet browser actually accesses the web application server 311, which provides for rendering of the user interface of the AGVERDICT® system 401 within the Internet browser. The web application server 311 accesses the web service computing system 309 to obtain data required for presentation within the user interface of the AGVERDICT® system 401 as rendered within the Internet browser. The application executing on the tablet computing device 305 is a native application and handles its own GUI rendering. Therefore, the application executing on the tablet computing device 305 directly accesses the web service computing system 309 to obtain data required for presentation within the user interface of the AGVERDICT® system 401.

As illustrated in the example of FIG. 6, both the grower 403 and the trusted advisor 601 can access the AGVERDICT® system 401 using whatever computing technology they may have and can perform their respective actions within the AGVERDICT® system 401. In this manner, the AGVERDICT® system 401 facilitates collaboration and controlled exchange of data between the grower 403 and the trusted advisor 601. Additionally, in some embodiments, the AGVERDICT® system 401 can be tasked by either the grower 403 or the trusted advisor 601 to perform specified processing operations on selected data sets and/or information for provision to the other party. And, the AGVERDICT® system 401 can keep a record of the processing operations performed so as to maintain a clean chain of custody of the data and/or information in the event that some later investigation and/or analysis is required.

Figure 7:
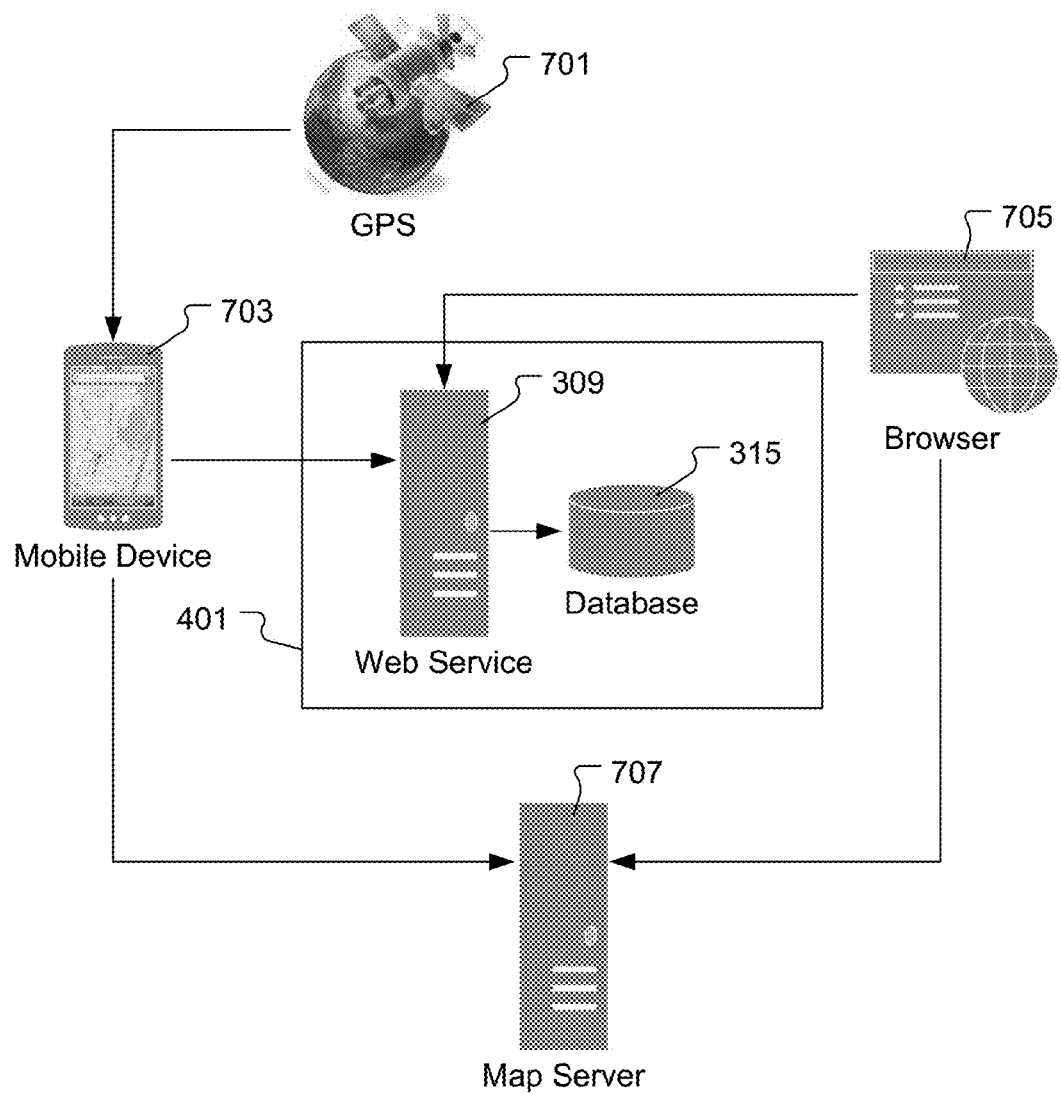
FIG. 7 shows an example diagram of how the AGVERDICT® system allows users to create farm boundaries using either mobiles devices or Internet accessible devices running an Internet browser, in accordance with some embodiments of the present invention.

FIG. 7 shows an example diagram of how the AGVERDICT® system 401 allows users to create farm boundaries using either mobiles devices 703 or Internet accessible devices running an Internet browser 705, in accordance with some embodiments of the present invention. Through the Internet browser 705, the user can access an aerial/satellite image of the geographic area that includes their farm, such as by accessing a map server 707. Then, the user can draw boundaries of their field on the image. The field boundaries can be stored in the database 315 as one or more polygon shapes using a particular geometry data type. Also, in some embodiments, the user can upload a shapefile of previously created field boundaries to the AGVERDICT® system 401 for storage in the database 315.

Also, in some embodiments, the AGVERDICT® system 401 application running on the user's mobile device 703 can use a combination of aerial/satellite images obtained from the map server 707 and geolocation data obtained from a global positioning system (GPS) system 701 to map field boundaries. For example, while running the AGVERDICT® system 401 application on their mobile device 703 in a mode for mapping field boundaries, the user can drive or walk around the boundaries of their field while the AGVERDICT® system 401 application operates to draw the field boundaries on the aerial/satellite image using real-time geolocation data obtained from the user's mobile device 703. Then, the resulting polygon shape(s) representing the field boundaries can be uploaded to the AGVERDICT® system 401 and saved in the database 315.

Once the boundaries of the grower's field have been defined, the grower can collect different data points around the farm through various methods and/or data collection devices. The collected data points can be for essentially any type of agricultural-related parameter. Each of the collected data points includes a data value and a corresponding geolocation. Examples of various types of data points that may be collected include soil samples, tissue samples, Soil Survey Geographic Database (SSURGO) data, field sensor data (such as electrical conductivity data from Veris), satellite imagery data, aerial image data (such as from aircraft and/or unmanned aircraft systems), machine data (such as from controllers operating on machines, providing information such as yield data, as-applied data, as-planted data, etc.), field event data (such as from manual entry or automatic entry from controllers operating on machines, providing information such as planting data, tillage data, irrigation data, harvest data, etc.). It should be understood that the various types of data points mentioned above are provided by way of example and do not in any way represent an exhaustive set. In various embodiments, data points for essentially type of agricultural-related data can be entered into the AGVERDICT® system 401 for integration, persistence, and analysis.

Figure 8:
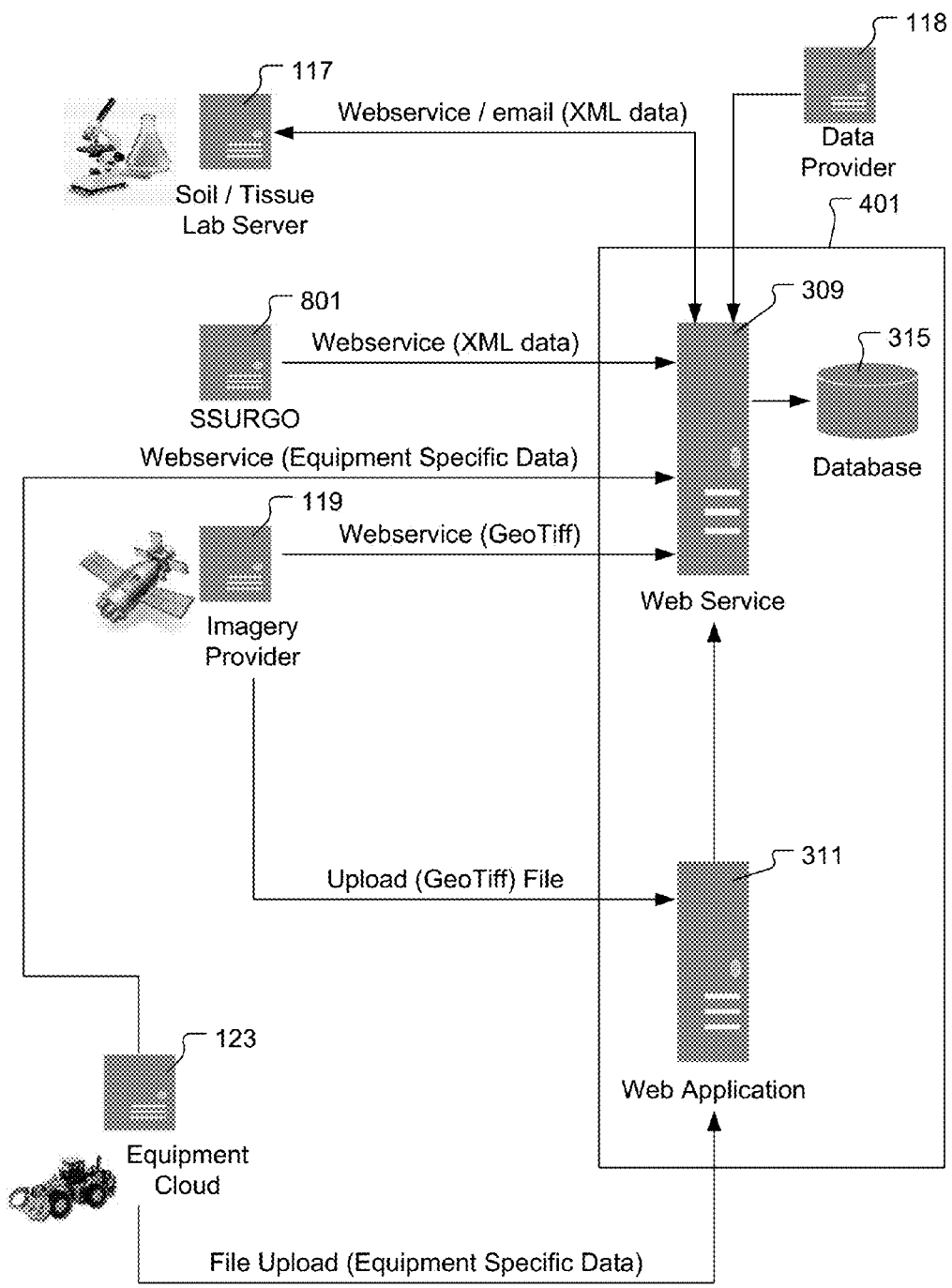
FIG. 8 shows an example diagram of how some data sources can interact with the AGVERDICT® system, in accordance with some embodiments.

FIG. 8 shows an example diagram of how some data sources can interact with the AGVERDICT® system 401, in accordance with some embodiments. In some embodiments, the AGVERDICT® system 401 communicates with the imagery provider 119 and receives GeoTIFF files from the imagery provider 119. For example, the AGVERDICT® system 401 may communicate georeference data for a given field to the imagery provider 119, with the imagery provider 119 in turn providing an aerial image of the field with the georeference data identified thereon to the AGVERDICT® system 401.

Also, in some embodiments, the AGVERDICT® system 401 may receive data from one or more data providers 118. For example, in some embodiments, the data provider 118 can provide weather data for geographic locations of interest. The weather data may be historical data and/or current data and/or forecast data. And, in some embodiments, the data provider 118 can provide pest activity data for geographic locations of interest. The pest activity data may be provided from state-sponsored databases or from other sources, and may be historical data and/or current data and/or forecast data. It should be understood that the above-mentioned weather data and pest activity data are examples of types of data that can be provided by the data provider(s) 118 to the AGVERDICT® system 401. In various embodiments, different data provider(s) 118 can be accessed to provide essentially any type of data to the AGVERDICT® system 401 that is relevant to the user's agricultural enterprise.

Also, in some embodiments, the AGVERDICT® system 401 may receive data point information from the equipment cloud 123. For example, a controller operating on a piece of agricultural equipment within a field may record activities performed by the equipment as a function of geolocation and provide that information as a set of data points to the AGVERDICT® system 401. It should be understood that the AGVERDICT® system is configured to support transmission of data to and from agricultural machines, e.g., tractors, etc., operating in the field. For example, the AGVERDICT® system can operate to prepare a prescription for an operation to be performed within a field and transmit that prescription to a machine that will perform the operation within the field. Then, when machine performs the prescribed operation within the field, the machine can return data about the prescribed operation to the AGVERDICT® system, with the data correlated to geolocation within the field. For example, the machine an return data to the AGVERDICT® system regarding amounts of a product applied as a function of geolocation, planting as a function of geolocation, yield data as a function of geolocation, among other types of data. The AGVERDICT® system can be set up to receive and process essentially any type of data associated with operation of a given agricultural machine. Some agricultural machines provide data on their current location, historical usage, and travel. Each agricultural machine may be different. For example, some machines can be configured to communicate through the cloud (Internet), some machines can be configured to communicate wirelessly, and some machines can rely upon physical transfer of data using computer readable media, such as flash drives, or the like.

Also, in some embodiments, data can be provided from a SSURGO provider 801 to the AGVERDICT® system 401. And, in some embodiments, data points can be provided to the AGVERDICT® system 401 from the soil and/or tissue provider 117. It should be understood that FIG. 8 is meant to show a limited example of how data point information can be provided to and received from the AGVERDICT® system 401. It should also be understood that the AGVERDICT® system 401 can receive and process essentially any type of data point information regarding agricultural activities. The AGVERDICT® system 401 is configured to use different data points, such as soil samples, electrical conductivity data, historical yield data, weather predictions, market trends, and external data analytical engines to aid the grower in making planting decisions, such as in selecting the right crop to plant and the best variety/hybrid of crop to plant. The AGVERDICT® system 401 is also configured to use different data points to guide the grower in essentially any agricultural process, such as soil preparation, planting, growing, pest control, irrigation, harvest, etc.

The more diverse a set of data is about a grower's agricultural enterprise within the AGVERDICT® system 401, the more capable the AGVERDICT® system 401 is of generating effective data-driven recommendations/prescriptions for the grower in order to support the grower in making effective data-driven decisions. For example, fertilization decisions can be based on data from a variety of sources, such as soil sampling, electrical conductivity measurement, imagery, and SSURGO, among others. Also, in addition to providing a prescription for uniform application of fertilizer to a given field, the AGVERDICT® system 401 can use the data points from various sources to divide the given field into a number of zones and prescribe application of different amounts and/or of different types of fertilizer to each zone. A similar approach can be used for planting and product/chemical applications. With fertilizer, seed, and/or chemicals, the AGVERDICT® system 401 enables the grower to apply the right products at the right time, in the right place, and at the right rate.

The AGVERDICT® system 401 also provides a utility for defining nutrition recommendation equations (NREs) for generation of variable-rate prescription maps, i.e., maps for separately managing different zones within a given field. An NRE can be created using defined variables of different types and nested arguments. For example, variables can be defined for information such as field samples, data from management zones, and data from user-defined information. In some embodiments, a trusted advisor can create, save, and share NREs used for creating variable-rate prescription maps within the AGVERDICT® system 401.

Figure 9:
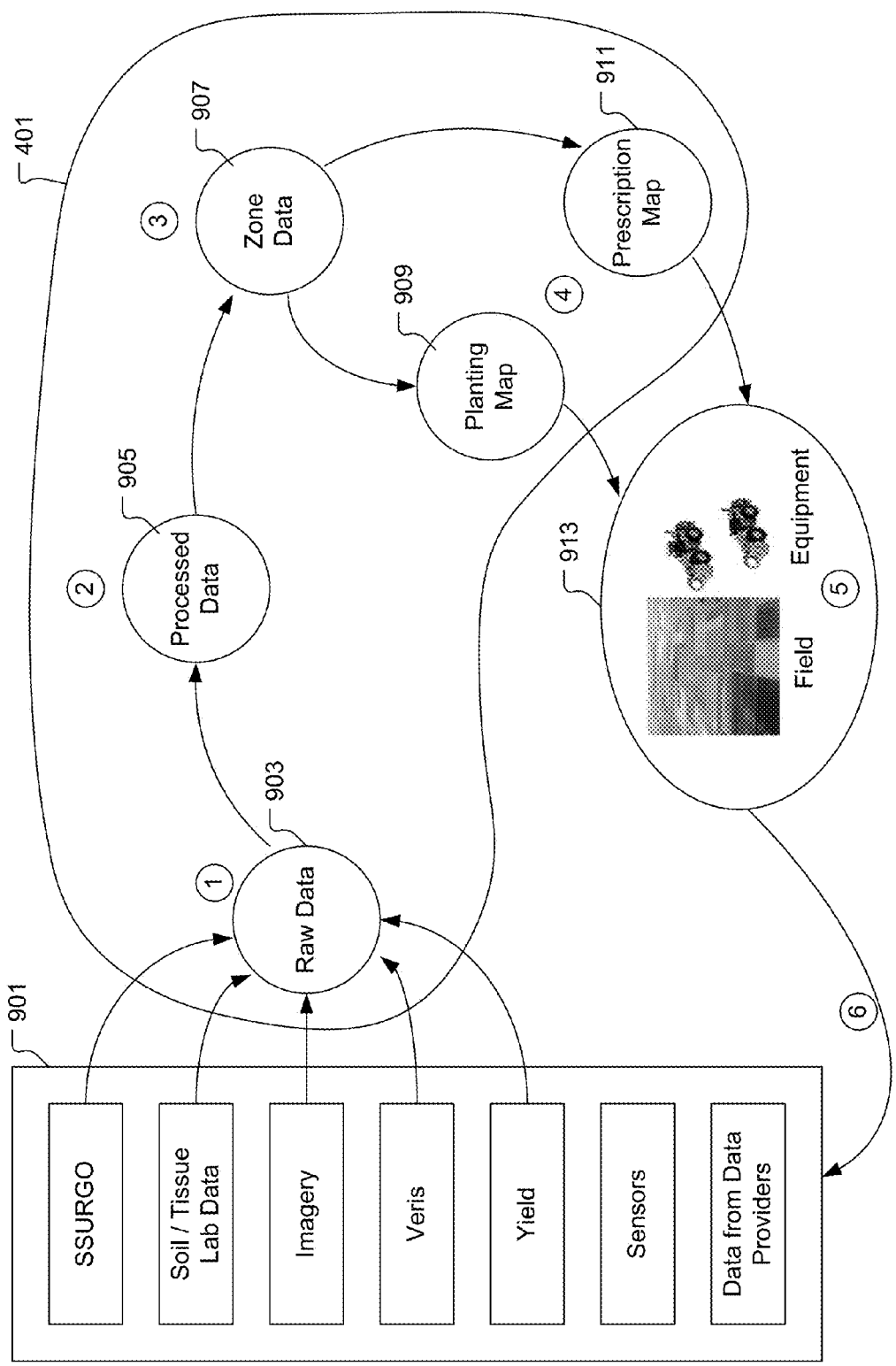
FIG. 9 shows a diagram depicting data flow and processing within the grower's agricultural enterprise using the AGVERDICT® system, in accordance with some embodiments of the present invention.

FIG. 9 shows a diagram depicting data flow and processing within the grower's agricultural enterprise using the AGVERDICT® system 401, in accordance with some embodiments of the present invention. As previously discussed, agricultural-related data can come from many different sources. For example, FIG. 9 shows a number of sources of agriculture-related data 901, including SSURGO data, soil laboratory data, tissue laboratory data, imagery data, Veris (soil electrical conductivity) data, yield data, sensor data, and data from one or more data providers, such as weather data, pest activity data, and/or any other types of data related to agricultural operations. It should be understood that the sources of agriculture-related data 901 can include any data source that provides information about the grower's agricultural operations. The agricultural-related data 901 is received into the AGVERDICT® system 401 as raw data 903 at a first step. The agricultural-related data 901 can either be in the AGVERDICT® system 401 already, retrieved from external sources, and/or users and growers can upload/enter their own data into the AGVERDICT® system 401.

The AGVERDICT® system 401 supports both manual and automated monitoring of field parameters. Scouting of the field is often done during the growing season and includes a grower/user moving through the field making observations that may influence a decision regarding one or more operations to be performed within the field. As part of the agricultural-related data 901, the AGVERDICT® system 401 provides for entry of scouting observation data, which can include field observations captured with both GPS location and camera or video. The AGVERDICT® system 401 is also defined to accept imagery data from aerial (plane or unmanned aerial system (UAS)) and satellite technologies that can provide 4 or 3 band images, which can include Near-Infra-Red, Red, Green, or Blue. The AGVERDICT® system 401 is defined to process the band data to get NDVI, NDVIR, IR, true color, false color, or other vegetative indices, which can provide information about the field depending on the growth stage.

The AGVERDICT® system 401 is also defined to receive data from various types of monitors and sensors, such as temperature sensors, humidity sensors, pressure sensors, rain sensor, light sensors, among other types of sensors. The monitors and sensors can transmit data to the cloud or connect to the Internet through a WiFi network to transmit the data to the AGVERDICT® system 401. The AGVERDICT® system 401 can process the data from various monitors and sensors to alert the grower/user of potential trouble spots within the field.

Throughout the year different activities occur within the field. The AGVERDICT® system 401 provides different data entry forms to capture data associated with the different activities that can occur within the field. The AGVERDICT® system 401 uses a data-driven UI approach to provide for customization of forms by commodity and region to make data entry field specific for the needs of the grower/user. Depending on the form, some forms are stored in tables as fields, while other data is converted into one or more formats for storage in tables, such as XML format or JSON format, among other formats.

Once the raw data 903 is received into the AGVERDICT® system 401, a second step is performed in which the AGVERDICT® system 401 operates on the raw data 903 to generate processed data 905. From each source of raw data 903, the AGVERDICT® system 401 extracts relevant pieces of information for processing. In some embodiments, the raw data 903 goes through a pre-processing state in which some data cleansing may be done. However, the AGVERDICT® system 401 ensures that the original unprocessed data can be recovered. In some embodiments, the AGVERDICT® system 401 provides an option for users/growers to combine raw data 903 of the same type. For example, year-over-year yield data may be combined, or Veris files which are generated over multiple passes on the land may be combined. In some embodiments, the AGVERDICT® system 401 can be operated to normalize multiple data layers using different algorithms or user-provided equations. In cases, such as sampling, where data is non-contiguous across the field, block, or sub-block boundary, the AGVERDICT® system 401 can be operated to interpolate between sampled data points using different algorithms, such as IDW4, Kriging, and/or other types of algorithms. Such interpolation operations generate an interpolated raster that can be based on any resolution mesh. For example, the AGVERDICT® system 401 can generate interpolated rasters based on resolution meshes of 5 meters by 5 meters, or 1 meter by 1 meter, or essentially any other resolution mesh that is suitable for the raw data set and that provides useful information for the user/grower.

In a third step, the processed data 905 is further processed to generate zone-specific data 907. The zone specific data 907 can be for any zone layout defined for the grower's field. In some embodiments, a single zone is defined for a given field, such that recommendations and prescriptions are provided on field-wide basis. And, in some embodiments, a given field is divided into multiple zones, such that recommendations and prescriptions are provided on a zone-by-zone basis. Using the processed data 905, the AGVERDICT® system 401 identifies various zones, i.e., geographic areas, using statistical algorithms such as K-Means, K-Nearest-Neighbors, among other types of statistical algorithms. The AGVERDICT® system 401 can create zones automatically by taking into consideration areas, ranges of values in the processed data 905, and other types of information. In some embodiments, a user of the AGVERDICT® system 401 can specify a number of zones and ranges for each zone. In some embodiments, while creating zones, the AGVERDICT® system 401 optimizes the zones by merging patches, i.e., geospatial areas, which are lower than a threshold area size, or have uneven data, or have other characteristics that suggests their merging, into a smooth, uniform, and contiguous data set. Also, in some embodiments, the AGVERDICT® system 401 allows the user to specify various smoothing levels for zone generation. And, in some embodiments, the AGVERDICT® system 401 lets the user associate each zone with other relevant data.

Once the zone data 907 is generated, a fourth step is performed to generate a planting map 909 and/or prescription map 909. Using the zone data 907, the grower and/or trusted advisor can generate prescriptions for an action to be taken within the field or can create planting directives, depending on the activity planned for the field. The planting map 909 provides recommendations/instructions for how one or more zones of a given field is to be planted as a function of geolocation. The prescription map 911 provides recommendations and/or instructions for an operation to be performed on one or more zones of a given field as a function of geolocation, e.g., variable-rate application data. The operation specified by a given prescription map 911 can be essentially any type of agriculture-related operation, including soil preparation, application of products (herbicides, pesticides, fertilizers, etc.), irrigation, pruning, culling, harvesting, among others.

The AGVERDICT® system 401 allows users to use existing equations or create equations for generation of the planting maps 909 and/or prescription maps 911. The AGVERDICT® system 401 provides features sets for building such equations, including support for creating user-defined variables, system variables, nested "if-then-else-elseif" statements, or other algorithm flow control structures. The AGVERDICT® system 401 then generates the prescription maps 911 and/or planting maps 909 using the data output by the equations. Also, it should be understood that separate prescription maps 911 can be generated for different actions to be performed within the field, including each product to be applied to the field.

The generated planting map 909 and/or prescription map 911 is transmitted to the grower's agricultural operation 913 in a fifth step. The generated planting map 909 and/or prescription map 911 can be generated for either manual use or as a set of instructions for use by a controller of a given type of agricultural equipment. In some embodiments, the AGVERDICT® system 401 operates to transmit the prescription map 911 and/or planting map 909 directly to the controller in a format that can be understood/processed by the controller. Some controllers read shapefiles, while other controllers read a manufacturer-specific format. For a machine controller that reads a manufacturer-specific format, the AGVERDICT® system 401 is defined to integrate with the machine's software development kit (SDK) in order to generate the planting maps 909 and/or prescription maps 911. In this manner, the AGVERDICT® system 401 can be defined to support essentially any type of controller for original equipment manufacturers (OEMs), including John Deere, AgLeader, Case, Raven, Precision Planting, AGCO, among others.

In some embodiments, the controllers are in data communication with the cloud, thereby enabling transfer of planting maps 909, prescription maps 911, and other types of application data from the AGVERDICT® system 401 to the machine controller's cloud service through a service call. For older controllers, data can be transferred from the AGVERDICT® system 401 to the controllers using direct media transfer mechanisms, such as flash drives. In some embodiments, the controller of the agricultural equipment has mobile communication capability. The planting maps 909, prescription maps 911, and other types of application data can be transmitted to the controller of the agricultural equipment either directly or through a company's cloud services, e.g., Slingshot Information Systems, MyJohnDeere (myJD), or any other cloud services platform.

Once the recommendations/instructions as provided within the generated planting map 909 and/or prescription map 911 are implemented within the grower's agricultural operation 913, additional/new agriculture-related data 901 can be obtained, as indicated by a sixth step, so as to complete the cycle of data flow and processing using the AGVERDICT® system 401. In some embodiments, data can be transmitted from controllers on the agricultural equipment to the AGVERDICT® system 401, where such data can include as-applied data, as-planted data, yield event data, among other types of data that is tracked by the controllers. User of the AGVERDICT® system 401 can use the data returned from the controllers to perform analysis and correct their agricultural management strategies. Also, growers/users can collect new data from the field and supply this new data to the AGVERDICT® system 401, thereby creating a closed-loop of data collection, analysis and decision making.

It should be understood that the data flow and processing depicted in FIG. 9 is provided by way of example. In other embodiments, data can flow into, through, and out of the AGVERDICT® system 401 in ways other than what is shown in the example of FIG. 9. The point to be understood is that the AGVERDICT® system 401 is capable of taking in agriculture-related data from a variety of different data sources, process the data in accordance with any number of applicable algorithms/methods, generate useful and/or actionable results for the grower's agricultural operation, preferably as a function of geolocation, and provide those results to the grower's agricultural operation in an efficient manner.

In some embodiments, the AGVERDICT® system 401 is defined to implement a label checking process to verify that generated recommendations, prescriptions, and instructions comply with manufacturer labels for chemicals and with federal, state, and local regulations. To implement this label checking process, the AGVERDICT® system 401 is defined to access an electronic label database, such as the Crop Data Management System (CDMS), among others. The AGVERDICT® system 401 can be directed to access essentially any type of electronic label database and/or label checking system by using an adaptor model. The label checking process is implemented to compare products and product combinations to be applied, commodity, timing, methods of application, and other factors about the field to the pertinent data and requirements within the electronic label database and within applicable federal, state, and local regulations. In this manner, the label checking process verifies that products which are recommended/prescribed for application within the field are legal to use and are used in a correct manner.

The AGVERDICT® system 401 is defined to support growers/users located throughout the world by supporting different languages and currencies. In some embodiments, content within the AGVERDICT® system 401 is retrieved from resx files, which enables the AGVERDICT® system 401 to be localized in different languages. When a user logs into the AGVERDICT® system 401, Windows-based culture indicators can be read by the AGVERDICT® system 401 to enable loading of the correct resource file and setting of the correct date, currency format, and other region-specific parameters. For the web application of the AGVERDICT® system 401, the language can be determined initially from the cookie, browser setting. The user can explicitly change the language and the new language selection can be stored in the cookie. For a web service call, the language specification is sent to the AGVERDICT® system 401 as part of a REST API call. For an iOS application, the AGVERDICT® system 401 uses the "Strings File" to store the resource file.

Figure 10:
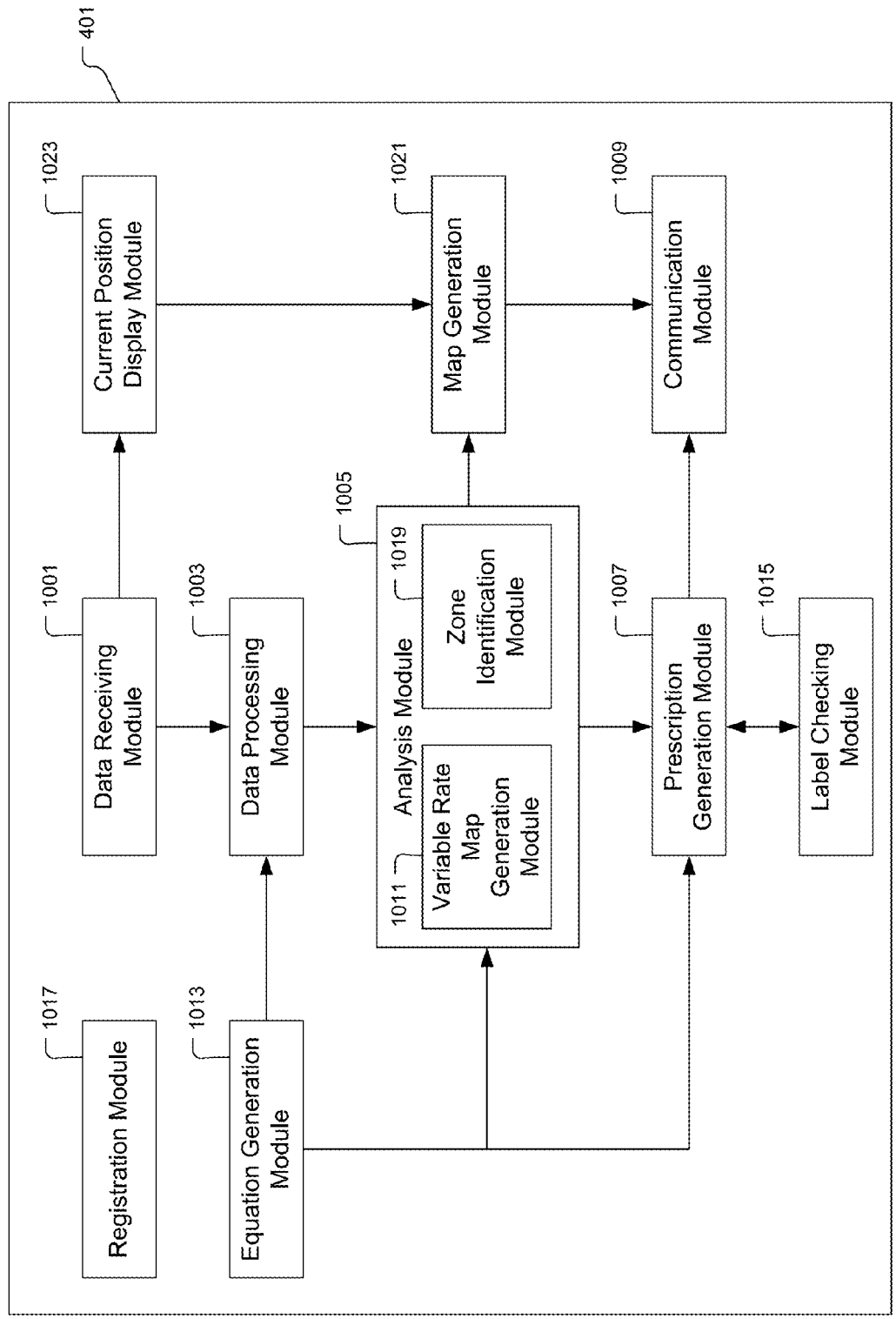
FIG. 10 shows a logical architecture diagram of the AGVERDICT® system, in accordance with some embodiments of the present invention.

The AGVERDICT® system 401 is a cloud-based system for integration of agricultural data with geolocation-based agricultural operations. FIG. 10 shows a logical architecture diagram of the AGVERDICT® system 401, in accordance with some embodiments of the present invention. The AGVERDICT® system 401 includes a data receiving module 1001 configured to receive agricultural-related data associated with a given geographic area. In some embodiments, the AGVERDICT® system 401 is defined to receive agricultural-related that includes one or more of soil survey geographic database (SSURGO) data, Veris soil electrical conductivity data, soil sampling data, tissue sampling data, aerial imagery data, satellite imagery data, commodity yield data, moisture data, elevation data, field event data, data from controllers of agricultural equipment, product application data, planting data, scouting data, trap counting data, boundary mapping data, field sensor data including soil moisture data, temperature data, barometric pressure data, humidity data, rainfall data, wind speed data, wind direction data, and sunlight intensity data, among other types of data. It should be understood that the AGVERDICT® system 401 can be defined to receive essentially any type of agricultural-related data and/or essentially any other type of data that may be relevant to the grower's agricultural enterprise and operations.

The AGVERDICT® system 401 also includes a data processing module 1003 configured to transform the received data into an analysis-ready format. In various embodiments, the agricultural-related data can be provided to the AGVERDICT® system 401 in essentially any native format of a data acquisition system used for initial recording of the data. The AGVERDICT® system 401 operates to transform the received agricultural data into a format specific to the AGVERDICT® system 401, i.e., into the analysis-ready format.

The AGVERDICT® system 401 also includes an analysis module 1005 configured to process the received data having been transformed into the analysis-ready format through one or more algorithms to determine at least one operation to be performed within the given geographic area. In some embodiments, the AGVERDICT® system 401 is defined to process the received data through one or more algorithms including one or more of a threshold value comparison algorithm, a value range comparison algorithm, a numerical interpolation algorithm, a numerical extrapolation algorithm, a statistical zone generation algorithm, and a mathematical operation algorithm, among other types of algorithms. It should be understood that the AGVERDICT® system 401 can be defined to implement essentially any algorithm that processes any number of types of received agricultural-related data to generate result data relevant to the grower's agricultural enterprise and operations. In some embodiments, the at least one operation to be performed within the given geographic area as the function of geolocation as determined by the analysis module 1005 includes one or more of a planting operation, an operation to apply an agricultural product, a crop maintenance operation, an irrigation operation, a tillage operation, a harvesting operation, a pest control operation, an inspection operation, a scouting operation, a surveying operation, a trap counting operation, a data collection operation, a soil sampling operation, and a tissue sampling operation, among other types of operations. It should be understood that the AGVERDICT® system 401 can be defined to determine essentially any type of operation to be performed within the given geographic area as the function of geolocation that is relevant to the grower's agricultural enterprise and operations. Also, in some embodiments, the analysis module 1005 includes a variable rate map generation module 1011 configured to determine an amount of the at least one operation to be performed as a function of geolocation within the given geographic area.

The AGVERDICT® system 401 also includes a prescription generation module 1007 defined to generate a set of instructions for execution of the at least one operation within the given geographic area as a function of geolocation. In some embodiments, the instructions for execution of the at least one operation are encoded for direct use by a controller of a specified type of agricultural equipment. In some embodiments, the specified type of agricultural equipment is one or more of an air seeder, a baler, a chisel plow, a combine, a cultivator, a drill, an electrostatic machine, a harrow, a harvester, a tillage machine, a planter, a plow, a pull-behind sprayer, a seeder, a sprayer, a spreader, a swather, a tractor, a trailer, a truck, and a wagon, among others. However, it should be understood, that the AGVERDICT® system 401 can be defined to encode the set of instructions for use by essentially any type of equipment associated with the grower's agricultural enterprise and operations.

In some embodiments, the set of instructions for execution of the at least one operation within the given geographic area as a function of geolocation is defined as a planting map that divides the given geographic area into a raster pattern and that specifies a planting procedure in accordance with the raster pattern. In some embodiments, the set of instructions for execution of the at least one operation within the given geographic area as a function of geolocation is defined as a prescription map that divides the given geographic area into a raster pattern and that specifies performance of the at least one operation in accordance with the raster pattern. It should be understood that in some embodiments, the set of instructions for execution of the at least one operation within the geographic area as a function of geolocation can be provided in essentially any format that is understood by the grower, the trusted advisor, a field operator, and/or any other person or provider or piece of agricultural equipment that is associated with the grower's agricultural operation.

The AGVERDICT® system 401 also includes a communication module 1009 configured to transmit the instructions for execution of the at least one operation within the given geographic area as a function of geolocation over a wireless communication channel to the controller of the specified type of agricultural equipment. In some embodiments, the instructions for execution of the at least one operation cause the controller to direct operation of the specified type of agricultural equipment to perform the at least one operation within the given geographic area as a function of geolocation in an automated manner. In some embodiments, the instructions for execution of the at least one operation within the given geographic area as a function of geolocation are transmitted to the controller of the specified type of agricultural equipment by direct data transfer using computer readable media, such as by flash drive, compact disk, DVD disc, or other similar types portable computer readable media.

In some embodiments, the AGVERDICT® system 401 includes an equation generation module 1013 configured to provide an interface for defining equations through which the received agricultural-related data can be processed to generate the set of instructions for execution of the at least one operation within the given geographic area as the function of geolocation. The equation generation module 1013 provides for use of system variables and for creation of user-defined variables and for implementation of nested data operation arguments and conditional statements for data operation control. In some embodiments, the equation generation module 1013 operates as a utility for use by the analysis module 1005, the prescription generation module 1007, and/or the data processing module 1003.

In some embodiments, the AGVERDICT® system 401 can include a label checking module 1015 configured to access one or more sources that provide information regarding manufacturer instructions concerning use of specified agricultural products and that provide information regarding federal, state, and local laws and regulations concerning use of specified agricultural products. In some embodiments, the label checking module 1015 is configured to automatically verify that the set of instructions for execution of the at least one operation within the given geographic area as the function of geolocation complies with relevant manufacturer instructions concerning use of specified agricultural products and with relevant federal, state, and local laws and regulations concerning use of specified agricultural products. In some embodiments, the prescription module 1007 is configured to iterate on the generated set of instructions for execution of the at least one operation within the given geographic area as the function of geolocation until the label checking module 1015 provides an indication that a given iteration of the set of instructions is in full compliance with relevant manufacturer instructions concerning use of specified agricultural products and with relevant federal, state, and local laws and regulations concerning use of specified agricultural products.

In some embodiments, the AGVERDICT® system 401 includes a zone identification module 1019 configured to analyze the received data, having been transformed into the analysis-ready format by the data processing module 1003, to define separate geographic zones within the given geographic area, where each geographic zone has at least one related agricultural characteristic, and where each geographic zone is delineated by a boundary defined by a set of geolocation coordinates. In some embodiments, the AGVERDICT® system 401 includes a registration module 1017 configured to provide an agricultural enterprise control application to a subscriber for installation on a remote subscriber computing device. Also, in some embodiments, the AGVERDICT® system 401 includes a map generation module 1021 configured to generate image data that when used to control a display of the remote subscriber computing device causes the display to show a map identifying the separate geographic zones within the geographic area and indicating values of the at least one agricultural characteristic for the separate geographic zones. The communication module 1009 is configured to transmit map display instructions including the generated image data over a wireless communication channel to the remote subscriber computing device. The map display instructions cause the remote subscriber computing device to process the image data to display the map identifying the separate geographic zones within the geographic area on the display of the remote subscriber computing device.

In some embodiments, the AGVERDICT® system 401 includes a current position display module 1023 configured to overlay a position indicator graphic on the map that identifies the separate geographic zones within the geographic area. The position indicator graphic represents a current position of the remote subscriber computing device within the geographic area. In some embodiments, the current position display module 1023 is configured to receive GPS coordinates from the remote subscriber computing device in real-time, by way of the data receiving module 1001, and process the received GPS coordinates to position the position indicator graphic on the map.

Figure 11:
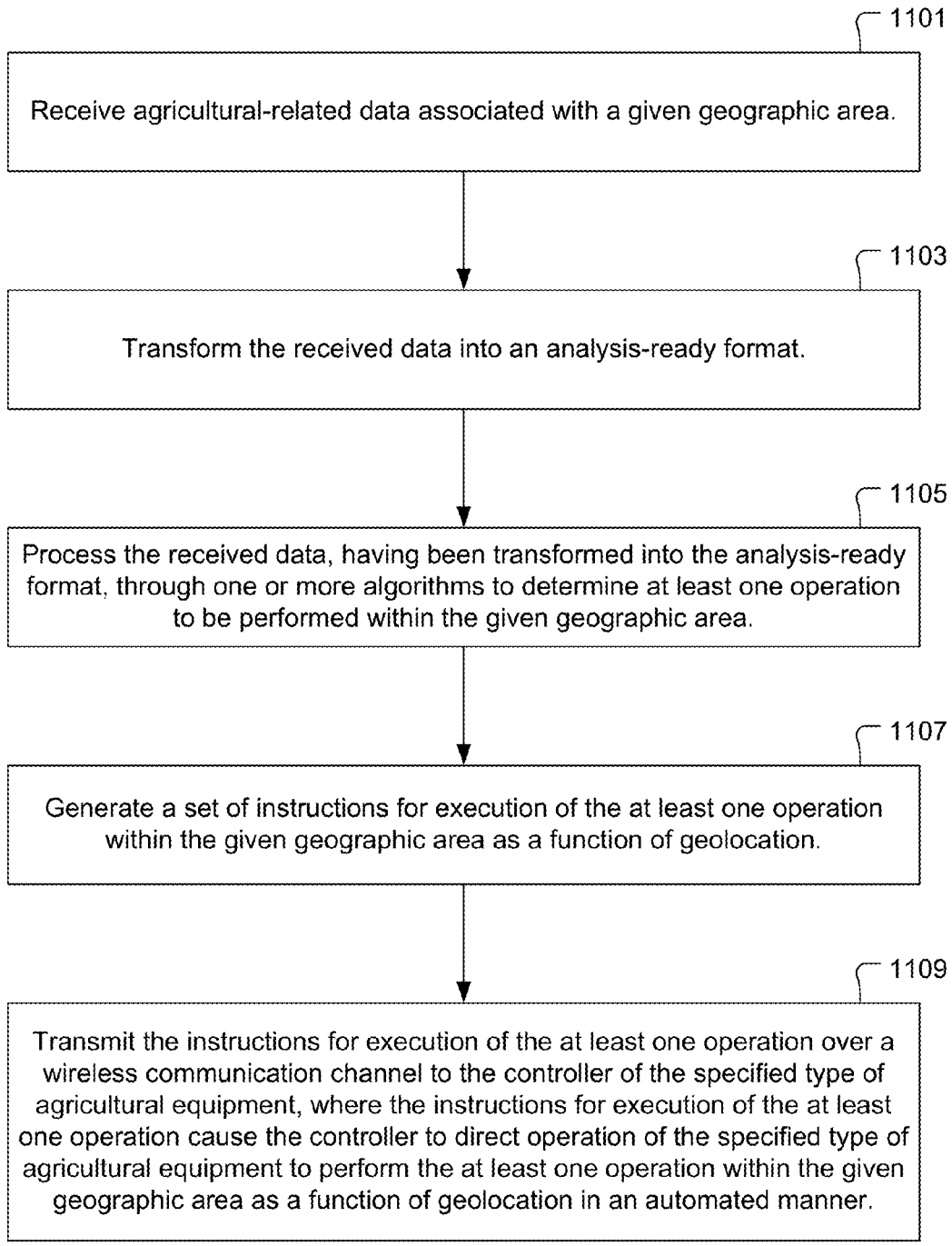
FIG. 11 shows a flowchart of a method for integration of agricultural data with geolocation-based agricultural operations, in accordance with some embodiments of the present invention.

FIG. 11 shows a flowchart of a method for integration of agricultural data with geolocation-based agricultural operations, in accordance with some embodiments of the present invention. The method includes an operation 1101 for directing operation of a cloud-based computing system, i.e., the AGVERDICT® system 401, to receive agricultural-related data associated with a given geographic area. In some embodiments, the cloud-based computing system is defined to receive agricultural-related that includes one or more of soil survey geographic database (SSURGO) data, Veris soil electrical conductivity data, soil sampling data, tissue sampling data, aerial imagery data, satellite imagery data, commodity yield data, moisture data, elevation data, field event data, data from controllers of agricultural equipment, product application data, planting data, scouting data, trap counting data, boundary mapping data, field sensor data including soil moisture data, temperature data, barometric pressure data, humidity data, rainfall data, wind speed data, wind direction data, and sunlight intensity data, among other types of data. It should be understood that the cloud-based computing system can be defined to receive essentially any type of agricultural-related data and/or essentially any other type of data that may be relevant to the grower's agricultural enterprise and operations.

The method includes an operation 1103 for directing operation of the cloud-based computing system to transform the received data into an analysis-ready format. In various embodiments, the agricultural-related data can be provided to the cloud-based computing system in essentially any native format of a data acquisition system used for initial recording of the data. The cloud-based computing system can be operated to transform the received agricultural data into a format specific to the cloud-based computing system, i.e., into the analysis-ready format.

The method includes an operation 1105 for directing operation of the cloud-based computing system to process the received data, having been transformed into the analysis-ready format, through one or more algorithms to determine at least one operation to be performed within the given geographic area. In some embodiments, the cloud-based computing system is defined to process the received data through one or more algorithms including one or more of a threshold value comparison algorithm, a value range comparison algorithm, a numerical interpolation algorithm, a numerical extrapolation algorithm, a statistical zone generation algorithm, and a mathematical operation algorithm, among other types of algorithms. It should be understood that the cloud-based computing system can be defined to implement essentially any algorithm that processes any number of types of received agricultural-related data to generate result data relevant to the grower's agricultural enterprise and operations. In some embodiments, the at least one operation to be performed within the given geographic area as the function of geolocation includes one or more of a planting operation, an operation to apply an agricultural product, a crop maintenance operation, an irrigation operation, a tillage operation, a harvesting operation, a pest control operation, an inspection operation, a scouting operation, a surveying operation, a trap counting operation, a data collection operation, a soil sampling operation, and a tissue sampling operation, among other types of operations. It should be understood that the cloud-based computing system can be defined to determine essentially any type of operation to be performed within the given geographic area as the function of geolocation that is relevant to the grower's agricultural enterprise and operations thereof. Also, in some embodiments, the method includes an operation for directing the cloud-based computing system to determine an amount of the at least one operation to be performed as a function of geolocation within the given geographic area.

The method includes an operation 1107 for directing operation of the cloud-based computing system to generate a set of instructions for execution of the at least one operation within the given geographic area as a function of geolocation. In some embodiments, the method includes an operation for encoding the set of instructions for execution of the at least one operation for direct use by a controller of a specified type of agricultural equipment. In some embodiments, the specified type of agricultural equipment is one or more of an air seeder, a baler, a chisel plow, a combine, a cultivator, a drill, an electrostatic machine, a harrow, a harvester, a tillage machine, a planter, a plow, a pull-behind sprayer, a seeder, a sprayer, a spreader, a swather, a tractor, a trailer, a truck, and a wagon, among others. However, it should be understood, that the method can include encoding of the set of instructions for use by essentially any type of equipment associated with the grower's agricultural enterprise and operations.

In some embodiments, the set of instructions for execution of the at least one operation within the given geographic area as a function of geolocation is defined as a planting map that divides the given geographic area into a raster pattern and that specifies a planting procedure in accordance with the raster pattern. In some embodiments, the set of instructions for execution of the at least one operation within the given geographic area as a function of geolocation is defined as a prescription map that divides the given geographic area into a raster pattern and that specifies performance of the at least one operation in accordance with the raster pattern. It should be understood that in some embodiments, the set of instructions for execution of the at least one operation within the geographic area as a function of geolocation can be provided in essentially any format that is understood by the grower, the trusted advisor, a field operator, and/or any other person or provider or piece of agricultural equipment that is associated with the grower's agricultural operation.

The method includes an operation 1109 for transmitting the instructions for execution of the at least one operation over a wireless communication channel from the cloud-based computing system to the controller of the specified type of agricultural equipment. In some embodiments, the instructions for execution of the at least one operation cause the controller to direct operation of the specified type of agricultural equipment to perform the at least one operation within the given geographic area as a function of geolocation in an automated manner. In some embodiments, the instructions for execution of the at least one operation within the given geographic area as a function of geolocation are transmitted to the controller of the specified type of agricultural equipment by direct data transfer using computer readable media, such as by flash drive, compact disk, DVD disc, or other similar types portable computer readable media.

In some embodiments, the method includes directing operation of the cloud-based computing system to provide an interface for defining equations through which the received agricultural-related data can be processed to generate the set of instructions for execution of the at least one operation within the given geographic area as the function of geolocation. The interface for defining equations provide for use of system variables and for creation of user-defined variables and for implementation of nested data operation arguments and conditional statements for data operation control.

In some embodiments, the method includes directing operation of the cloud-based computing system to access one or more sources that provide information regarding manufacturer instructions concerning use of specified agricultural products and that provide information regarding federal, state, and local laws and regulations concerning use of specified agricultural products. In some embodiments, the method includes directing operation of the cloud-based computing system to automatically verify that the set of instructions for execution of the at least one operation within the given geographic area as the function of geolocation complies with relevant manufacturer instructions concerning use of specified agricultural products and with relevant federal, state, and local laws and regulations concerning use of specified agricultural products. In some embodiments, the method includes directing operation of the cloud-based computing system to iterate on the generated set of instructions for execution of the at least one operation within the given geographic area as the function of geolocation until a given iteration of the set of instructions is in full compliance with relevant manufacturer instructions concerning use of specified agricultural products and with relevant federal, state, and local laws and regulations concerning use of specified agricultural products.

Figure 12:
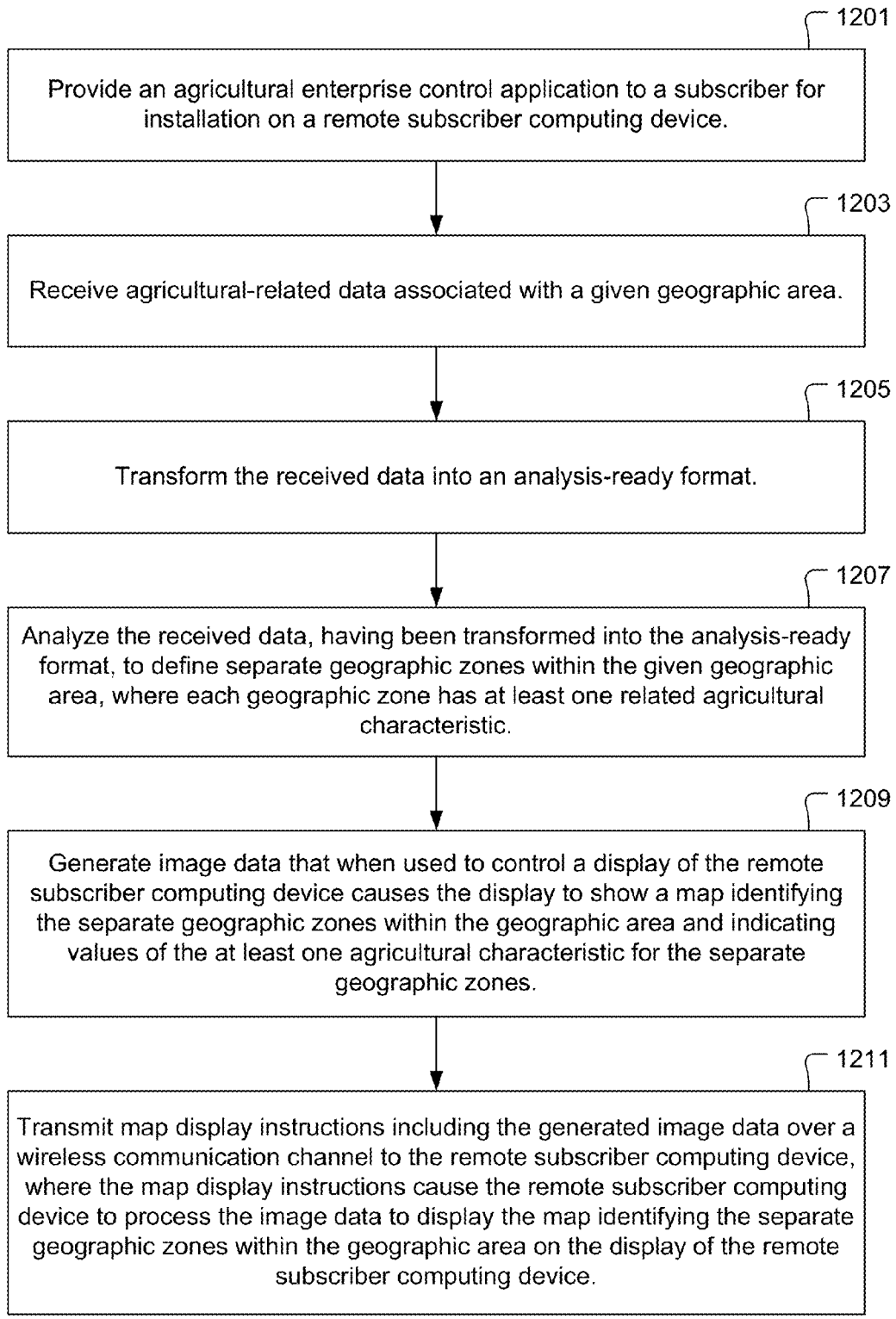
FIG. 12 shows a flowchart of a method for zone-based integration of agricultural data with geolocation-based agricultural operations, in accordance with some embodiments of the present invention.

FIG. 12 shows a flowchart of a method for zone-based integration of agricultural data with geolocation-based agricultural operations, in accordance with some embodiments of the present invention. The method includes an operation 1201 directing operation of a cloud-based computing system, i.e., the AGVERDICT® system 401, to provide an agricultural enterprise control application to a subscriber for installation on a remote subscriber computing device. The method includes an operation 1203 for directing operation of a cloud-based computing system to receive agricultural-related data associated with a given geographic area. In some embodiments, the cloud-based computing system is defined to receive agricultural-related that includes one or more of soil survey geographic database (SSURGO) data, Veris soil electrical conductivity data, soil sampling data, tissue sampling data, aerial imagery data, satellite imagery data, commodity yield data, moisture data, elevation data, field event data, data from controllers of agricultural equipment, product application data, planting data, scouting data, trap counting data, boundary mapping data, field sensor data including soil moisture data, temperature data, barometric pressure data, humidity data, rainfall data, wind speed data, wind direction data, and sunlight intensity data, among other types of data. It should be understood that the cloud-based computing system can be defined to receive essentially any type of agricultural-related data and/or essentially any other type of data that may be relevant to the grower's agricultural enterprise and operations.

The method includes an operation 1205 for directing operation of the cloud-based computing system to transform the received data into an analysis-ready format. In various embodiments, the agricultural-related data can be provided to the cloud-based computing system in essentially any native format of a data acquisition system used for initial recording of the data. The cloud-based computing system can be operated to transform the received agricultural data into a format specific to the cloud-based computing system, i.e., into the analysis-ready format.

The method includes an operation 1207 for directing operation of the cloud-based computing system to analyze the received data, having been transformed into the analysis-ready format, to define separate geographic zones within the given geographic area. Each geographic zone has at least one related agricultural characteristic. And, each geographic zone is delineated by a boundary defined by a set of geolocation coordinates. The method also includes an operation 1209 for directing operation of the cloud-based computing system to generate image data that when used to control a display of the remote subscriber computing device causes the display to show a map identifying the separate geographic zones within the geographic area and indicating values of the at least one agricultural characteristic for the separate geographic zones.

The method also includes an operation 1211 for directing operation of the cloud-based computing system to transmit map display instructions including the generated image data over a wireless communication channel to the remote subscriber computing device. The map display instructions cause the remote subscriber computing device to process the image data to display the map identifying the separate geographic zones within the geographic area on the display of the remote subscriber computing device.

In some embodiments, the method includes directing operation of the cloud-based computing system to overlay a position indicator graphic on the map that identifies the separate geographic zones within the geographic area, where the position indicator graphic represents a current position of the remote subscriber computing device within the geographic area. In some embodiments, the method includes directing operation of the cloud-based computing system to receive GPS coordinates from the remote subscriber computing device in real-time and process the received GPS coordinates to position the position indicator graphic on the map.

In some embodiments, the method includes directing operation of the cloud-based computing system to generate a set of zone-specific instructions for execution of at least one operation within the given geographic area as a function of geolocation, such that execution of the at least one operation is customized for each separate geographic zone within the given geographic area. In some embodiments, generation of the set of zone-specific instructions includes processing of the received data, having been transformed into the analysis-ready format, through one or more algorithms to determine at least one operation to be performed within one or more separate geographic zones within the given geographic area. In some embodiments, the cloud-based computing system is defined to process the received data through one or more algorithms including one or more of a threshold value comparison algorithm, a value range comparison algorithm, a numerical interpolation algorithm, a numerical extrapolation algorithm, a statistical zone generation algorithm, and a mathematical operation algorithm, among other types of algorithms. It should be understood that the cloud-based computing system can be defined to implement essentially any algorithm that processes any number of types of received agricultural-related data to generate result data relevant to the grower's agricultural enterprise and operations.

In some embodiments, the at least one operation to be performed within the given geographic area as the function of geolocation includes one or more of a planting operation, an operation to apply an agricultural product, a crop maintenance operation, an irrigation operation, a tillage operation, a harvesting operation, a pest control operation, an inspection operation, a scouting operation, a surveying operation, a trap counting operation, a data collection operation, a soil sampling operation, and a tissue sampling operation, among other types of operations. It should be understood that the cloud-based computing system can be defined to determine essentially any type of operation to be performed within the given geographic area as the function of geolocation that is relevant to the grower's agricultural enterprise and operations. Also, in some embodiments, the method includes an operation for directing the cloud-based computing system to determine an amount of the at least one operation to be performed as a function of geolocation within one or more separate geographic zones of the given geographic area.

In some embodiments, the set of zone-specific instructions for execution of the at least one operation are encoded for direct use by a controller of a specified type of agricultural equipment. In some embodiments, the specified type of agricultural equipment is one or more of an air seeder, a baler, a chisel plow, a combine, a cultivator, a drill, an electrostatic machine, a harrow, a harvester, a tillage machine, a planter, a plow, a pull-behind sprayer, a seeder, a sprayer, a spreader, a swather, a tractor, a trailer, a truck, and a wagon, among others. However, it should be understood, that the method can include encoding of the set of instructions for use by essentially any type of equipment associated with the grower's agricultural enterprise and operations.

In some embodiments, the set of zone-specific instructions for execution of the at least one operation within the given geographic area as a function of geolocation is defined as a planting map that divides the various geographic zones of the given geographic area into a raster pattern and that specifies a planting procedure in accordance with the raster pattern. In some embodiments, the set of zone-specific instructions for execution of the at least one operation within the given geographic area as a function of geolocation is defined as a prescription map that divides the various geographic zones of the given geographic area into a raster pattern and that specifies performance of the at least one operation in accordance with the raster pattern. It should be understood that in some embodiments, the set of zone-specific instructions for execution of the at least one operation within the geographic area as a function of geolocation can be provided in essentially any format that is understood by the grower, the trusted advisor, a field operator, and/or any other person or provider or piece of agricultural equipment that is associated with the grower's agricultural operation.

In some embodiments, the method can also include directing operation of the cloud-based computing system to transmit the set of zone-specific instructions for execution of the at least one operation over the wireless communication channel to the controller of the specified type of agricultural equipment. In some embodiments, the zone-specific instructions for execution of the at least one operation cause the controller to direct operation of the specified type of agricultural equipment to perform the at least one operation within the given geographic area as a function of geolocation in an automated manner. In some embodiments, the zone-specific instructions for execution of the at least one operation within the given geographic area as a function of geolocation are transmitted to the controller of the specified type of agricultural equipment by direct data transfer using computer readable media, such as by flash drive, compact disk, DVD disc, or other similar types portable computer readable media.

Figure 13:
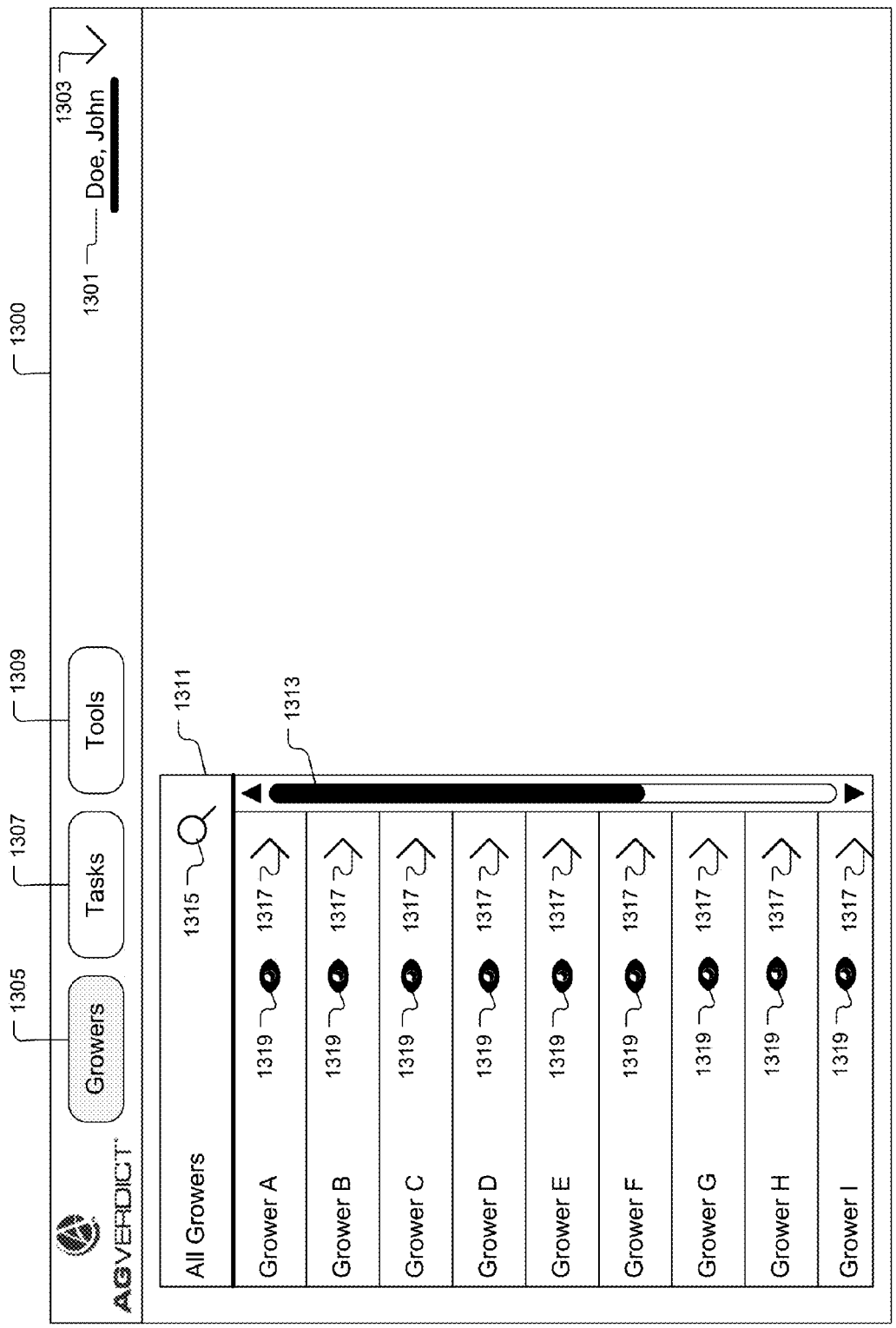
FIG. 13 shows an example user interface for the AGVERDICT® system, in accordance with some embodiments of the present invention.

FIG. 13 shows an example user interface 1300 for the AGVERDICT® system 401, in accordance with some embodiments of the present invention. It should be understood that the user interface examples for the AGVERDICT® system 401 as presented herein can be displayed within either a web browser or by an application executing on a computing device of the user. It should also be understood that the computing device of the user can be essentially any type of computing device including a desktop computer, a laptop computer, a tablet computer, and a smartphone, among other types of computing devices. The example user interface 1300 shows a name 1301 of the user who is currently logged into the AGVERDICT® system 401, and provides a menu activation icon 1303 that when activated can show a number of menu items relevant to the user, such as a user profile item, a password management item, an end-user-license-agreement form, a privacy policy item, a user management item, and a log out item. The user profile item provides a form that allows the user to enter/modify information about the user, such as the user's address. The password management item provides a form that allows the user to reset their password.

Figure 14:
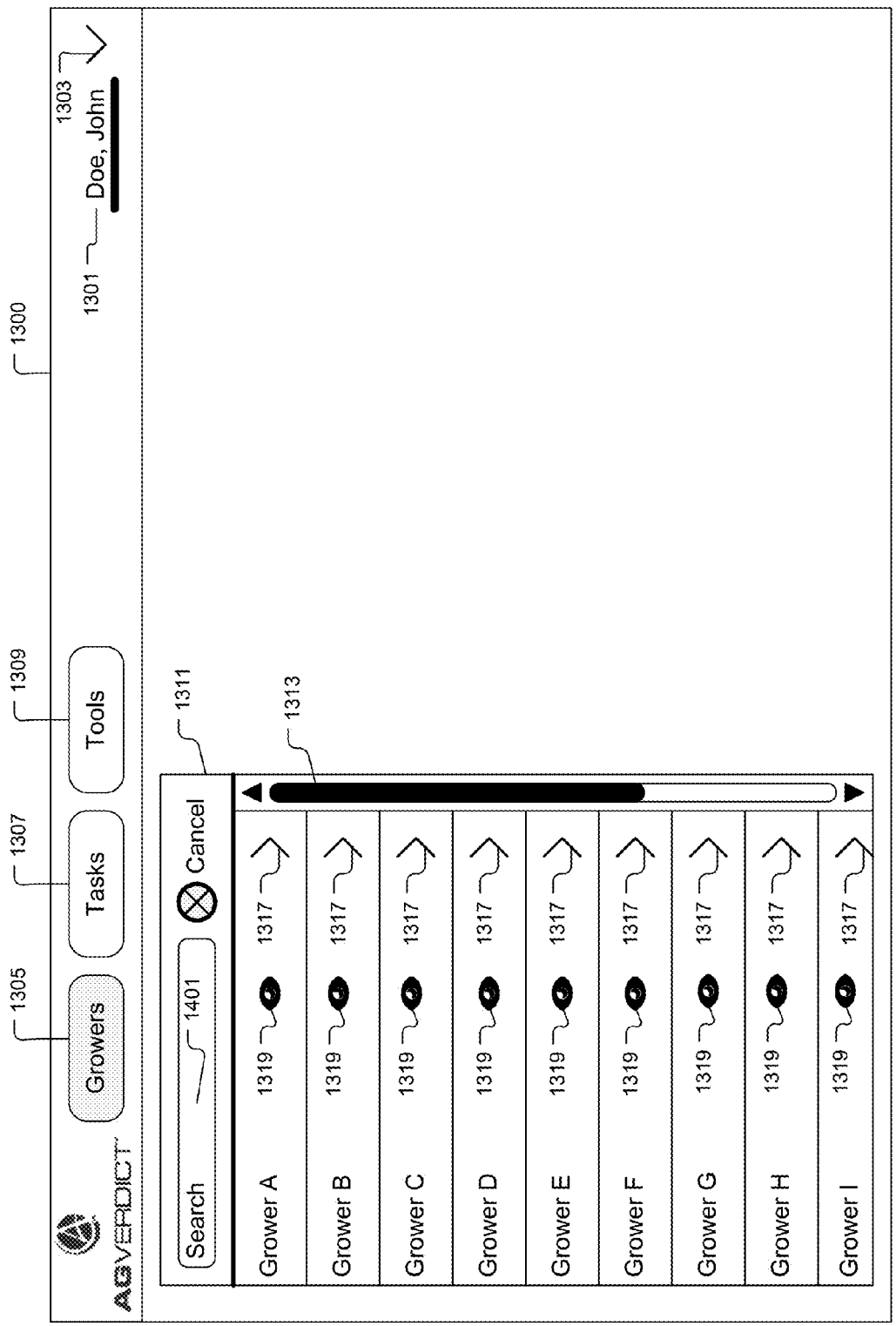
FIG. 14 shows the user interface upon selection of the activatable search icon, in accordance with some embodiments of the present invention.

The user interface 1300 also provides a number of activatable icons for navigating to different aspects of the AGVERDICT® system 401, including a growers button 1305, a tasks button 1307, and a tools button 1309. The user interface 1300 view of FIG. 13 represents activation of the growers button 1305, which causes the user interface 1300 to display a listing of growers 1311 that are registered with the AGVERDICT® system 401 and that the currently logged-in user has permission to view. Activation of the tasks button 1307 causes the user interface to show a number of activatable icons for various tasks that can be performed by the user within the AGVERDICT® system 401. Activation of the tools button 1309 causes the user interface to show a number of activatable icons for various tools that can be used by the user within the AGVERDICT® system 401. The listing of growers 1311 can be navigated by the user using a scroll bar 1313. Also, an activatable search icon 1315 is provided to enable the user to search for a particular grower within the listing of growers 1311. FIG. 14 shows the user interface 1300 upon selection of the activatable search icon 1315, in accordance with some embodiments of the present invention. Upon activation of the search icon 1315 a search field 1401 is displayed to allow the user to enter a search term for locating a particular grower within the listing of growers 1311.

Figure 15A:
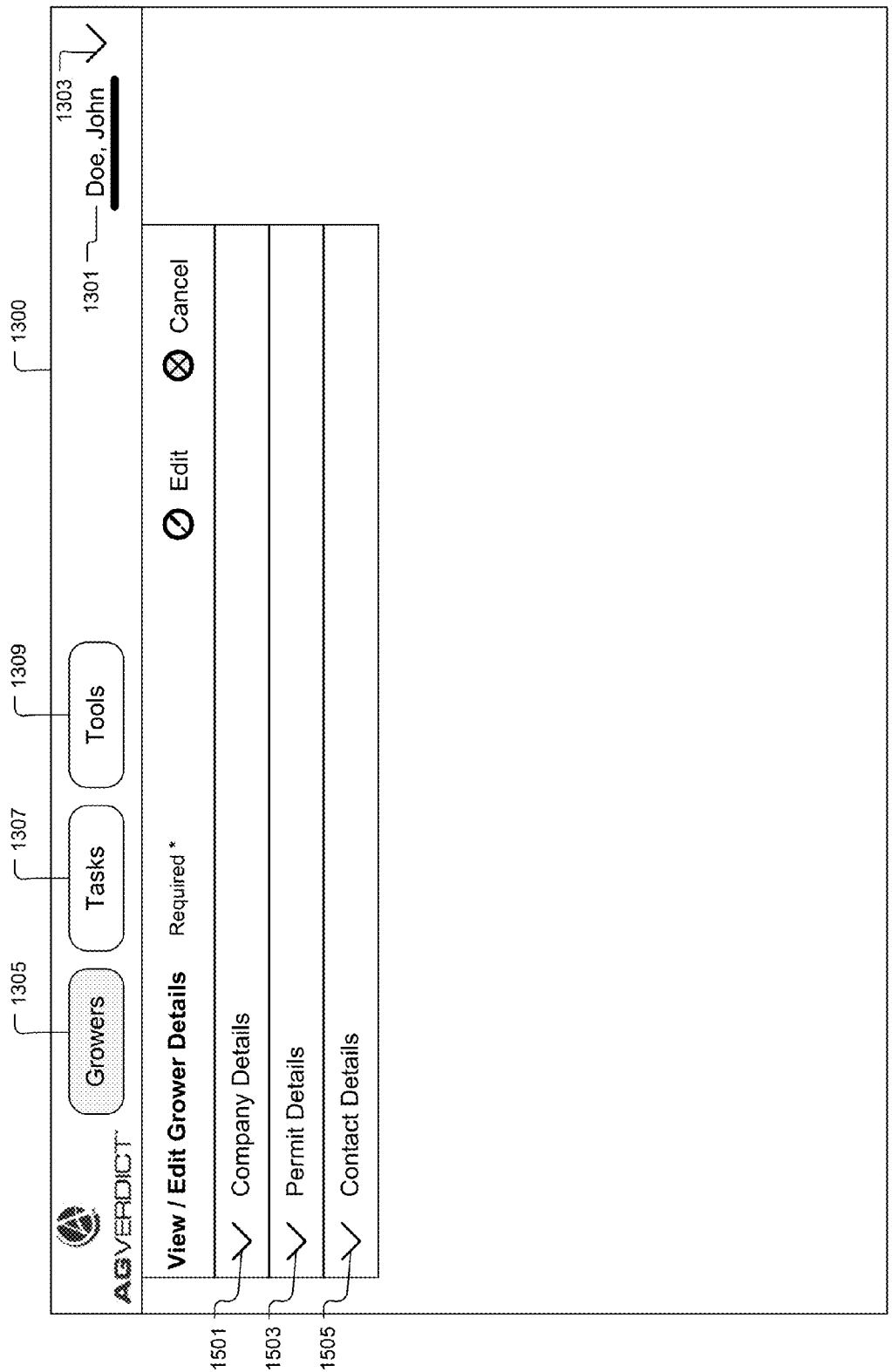
FIG. 15A shows the user interface upon selection of the view/edit grower icon, in accordance with some embodiments of the present invention.

Each registered grower is shown by name in the listing of growers 1311 and has a corresponding activatable view/edit grower icon 1319, that when activated will allow the user to view and edit information about the corresponding grower. FIG. 15A shows the user interface 1300 upon selection of the view/edit grower icon 1319, in accordance with some embodiments of the present invention. The user interface 1300 of FIG. 15A shows a company details menu activation icon 1501 that when activated shows a number of information items about the company associated with the currently selected grower. FIG. 15B shows the user interface 1300 upon selection of the company details menu activation icon 1501, in accordance with some embodiments of the present invention. A company information form 1507 is displayed that allows the user to edit information about the company of the currently selected grower. As shown in FIG. 15B, the grower can be associated with a particular branch of a given company. This branch-level association can be used to control permissions of a given user within the AGVERDICT® system 401.

Figure 15C:
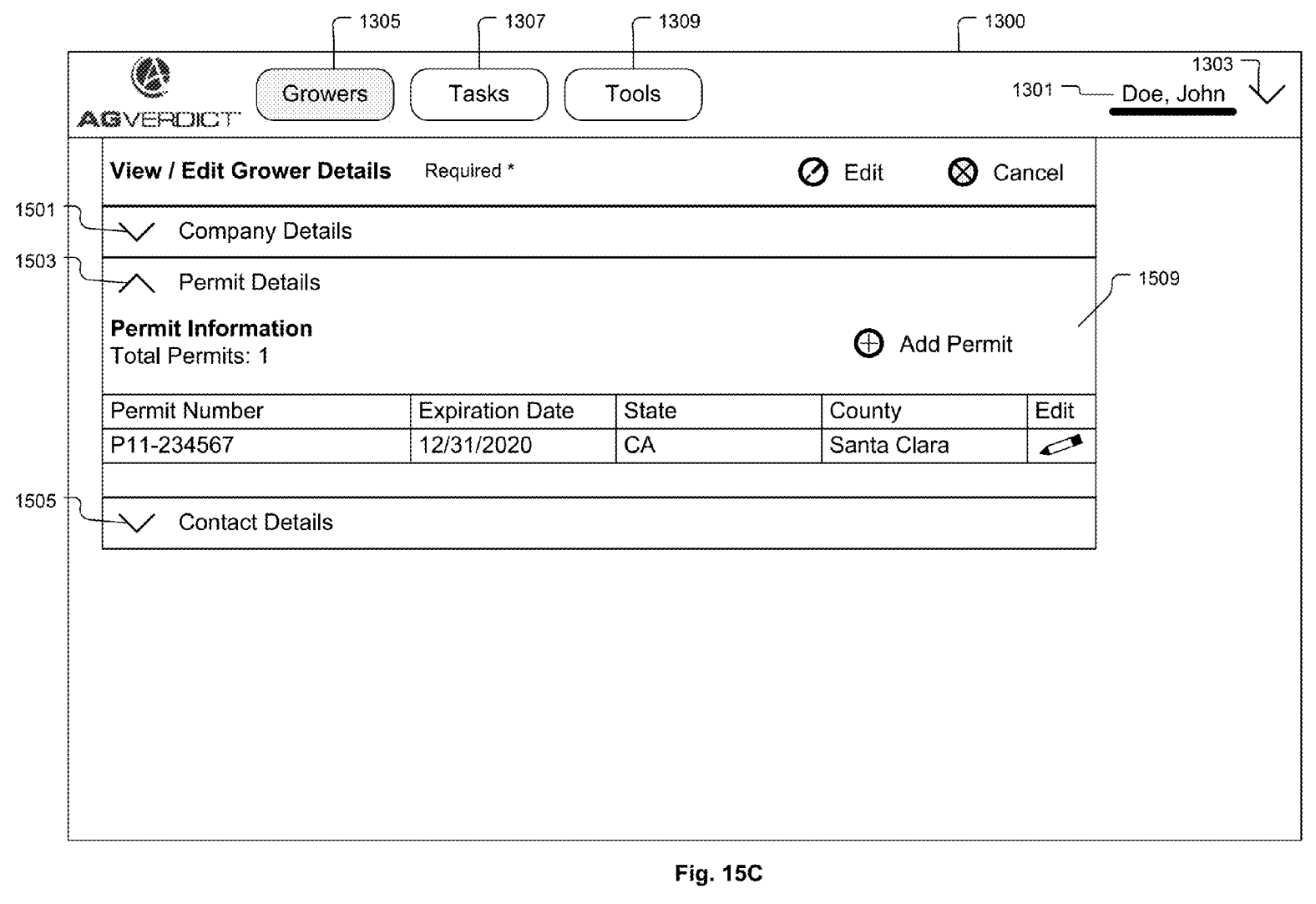

The user interface 1300 of FIG. 15A also shows a permit details menu activation icon 1503 that when activated shows a number of information items about permits held by the currently selected grower. FIG. 15C shows the user interface 1300 upon selection of the permit details menu activation icon 1503, in accordance with some embodiments of the present invention. A permits information form 1509 is displayed that allows a user to edit previously entered permit information and add information for a new permit. The user interface 1300 of FIG. 15A also shows a contact details menu activation icon 1505 that when activated shows a number of information items about contact details for the currently selected grower. FIG. 15D shows the user interface 1300 upon selection of the contact details menu activation icon 1505, in accordance with some embodiments of the present invention. A contact information form 1511 is displayed that allows a user to edit previously entered contact information for the currently selected grower.

Figure 16:
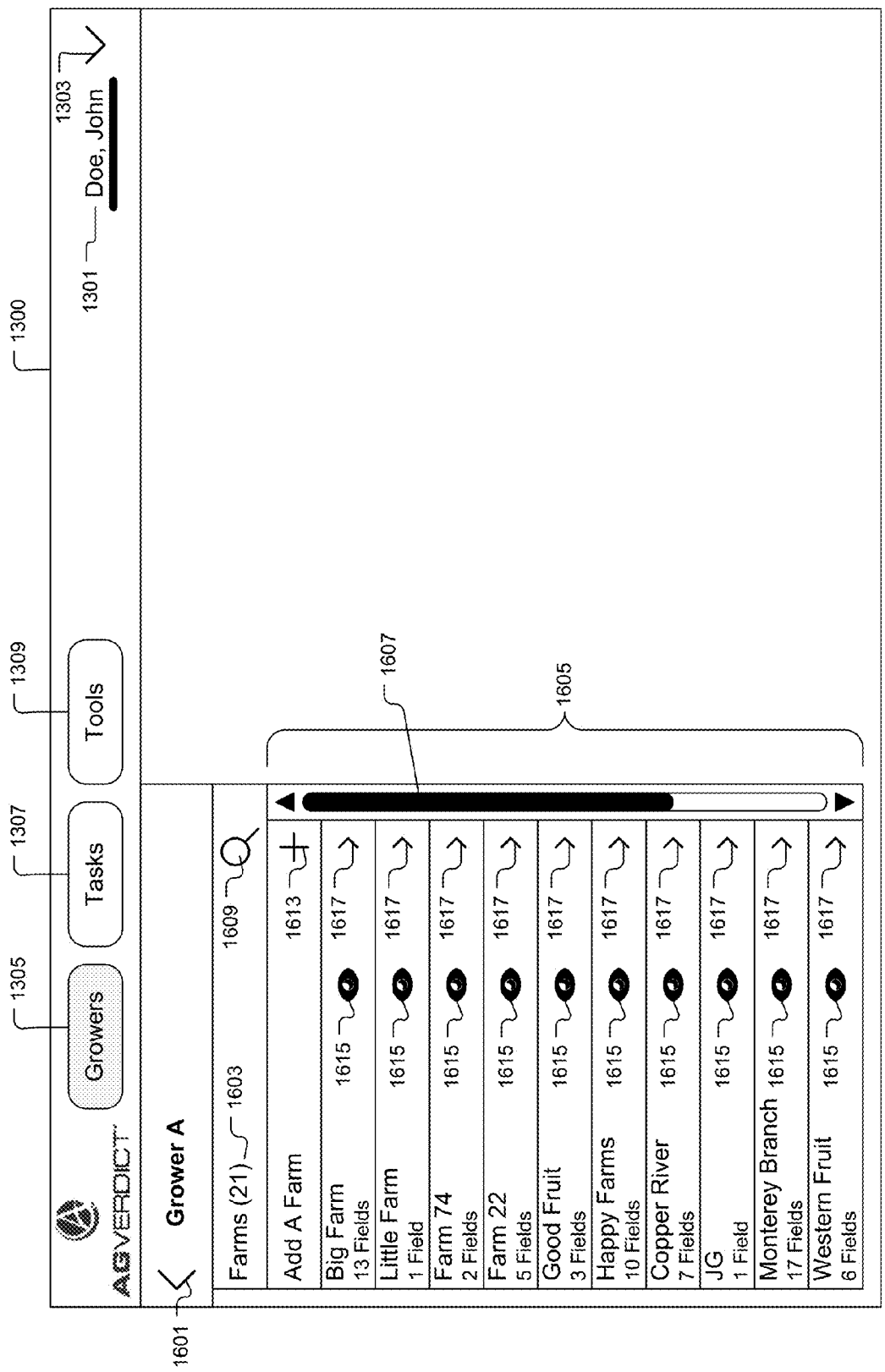
FIG. 16 shows the user interface upon selection of the activatable navigation icon for a given grower in the listing of growers, in accordance with some embodiments of the present invention.

With reference back to FIG. 13, each registered grower is shown by name in the listing of growers 1311 and has a corresponding activatable navigation icon 1317, that when activated will cause the user interface 1300 to display information about the corresponding grower. FIG. 16 shows the user interface 1300 upon selection of the activatable navigation icon 1317 for a given grower in the listing of growers 1311, in accordance with some embodiments of the present invention. The name of the selected grower is displayed along with an activatable navigation icon 1601 that when activated will cause the user interface 1300 to display the listing of growers 1311 from which the selected grower was selected, such as shown in FIG. 13. A number of farms indicator 1603 is displayed showing the number of farms that the selected grower has registered with the AGVERDICT® system 401. Also, a listing of the farms 1605 for the selected grower is provided. A scroll bar 1607 is provided when needed for navigation through the listing of farms 1605. An activatable search icon 1609 is provided to enable the user to search for a particular farm of the selected grower within the listing of farms 1605. In some embodiments, activation of the search icon 1609 causes a search field to be displayed to allow the user to enter a search term for locating a particular farm of the selected grower within the listing of farms 1605, in a similar manner as discussed with regard to presentation of the search field 1401 as shown in FIG. 14.

Figure 17:
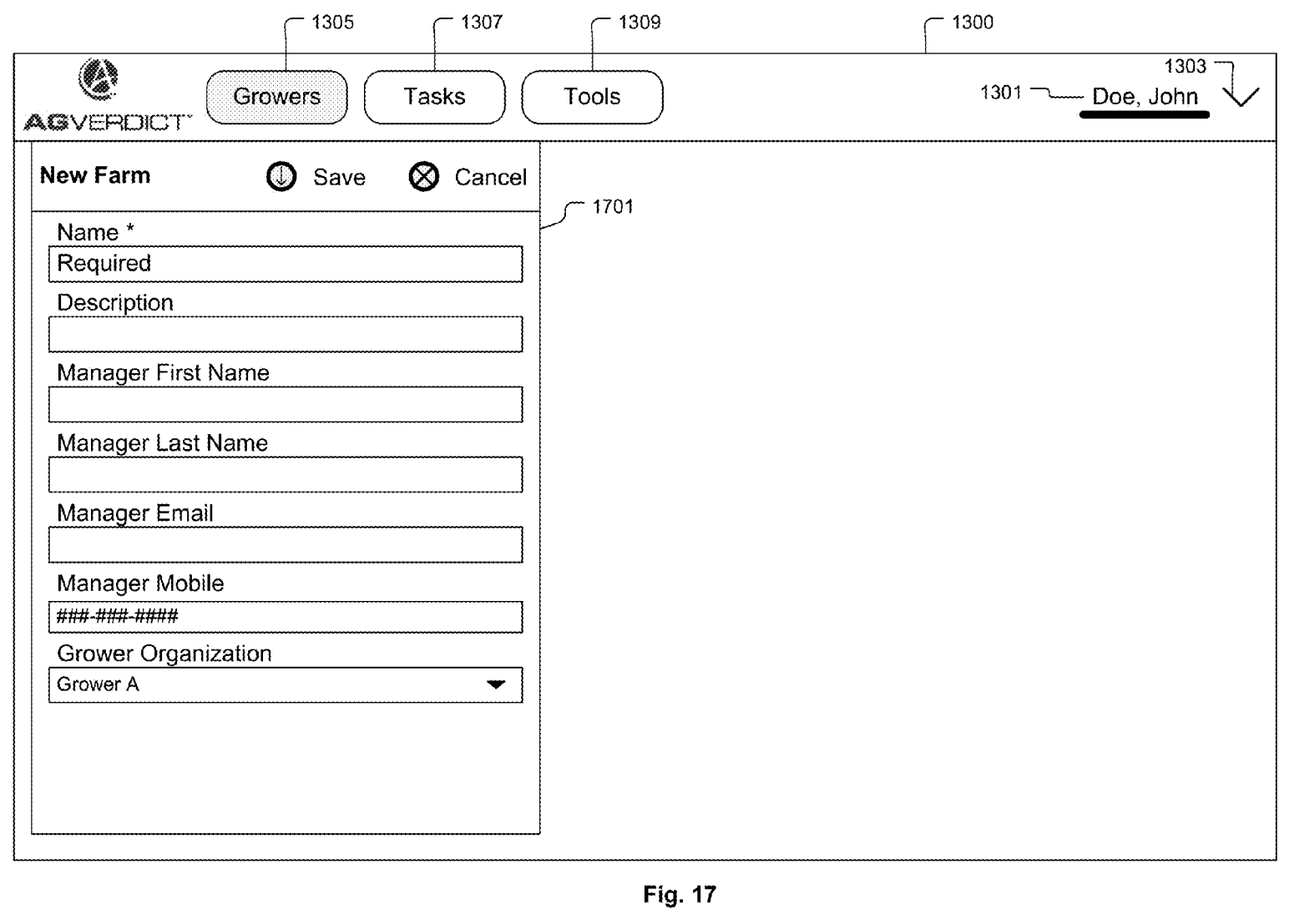

The user interface 1300 of FIG. 16 also presents an activatable add farm icon 1613 for creating a new farm for the currently selected grower within the AGVERDICT® system 401. FIG. 17 shows the user interface 1300 upon selection of the add farm icon 1613, in accordance with some embodiments of the present invention. The user interface 1300 of FIG. 17 shows a form 1701 for entering information about the new farm to be created for the currently selected grower within the AGVERDICT® system 401. The new farm entry within form 1701 can either be saved or cancelled. Upon saving or cancelling the new farm entry, the user interface 1300 will revert back to the listing of farms for the currently selected grower as shown in FIG. 16.

Figure 18:
FIG. 18 shows the user interface upon selection of the view/edit farm icon, in accordance with some embodiments of the present invention.

Each farm of the currently selected grower is shown by name in the listing of farms 1605 and has a corresponding activatable view/edit farm icon 1615, that when activated will allow the user to view and edit information about the corresponding farm. FIG. 18 shows the user interface 1300 upon selection of the view/edit farm icon 1615, in accordance with some embodiments of the present invention. The user interface 1300 of FIG. 18 shows a form 1801 for editing information about the selected farm within the AGVERDICT® system 401. The edited farm data within form 1801 can either be saved or cancelled. Upon saving or cancelling the edited farm data, the user interface 1300 will revert back to the listing of farms for the currently selected grower as shown in FIG. 16. With reference back to FIG. 16, each farm in the listing of farms 1605 has a corresponding activatable navigation icon 1617, that when activated will cause the user interface 1300 to display information about the corresponding farm.

Figure 19:
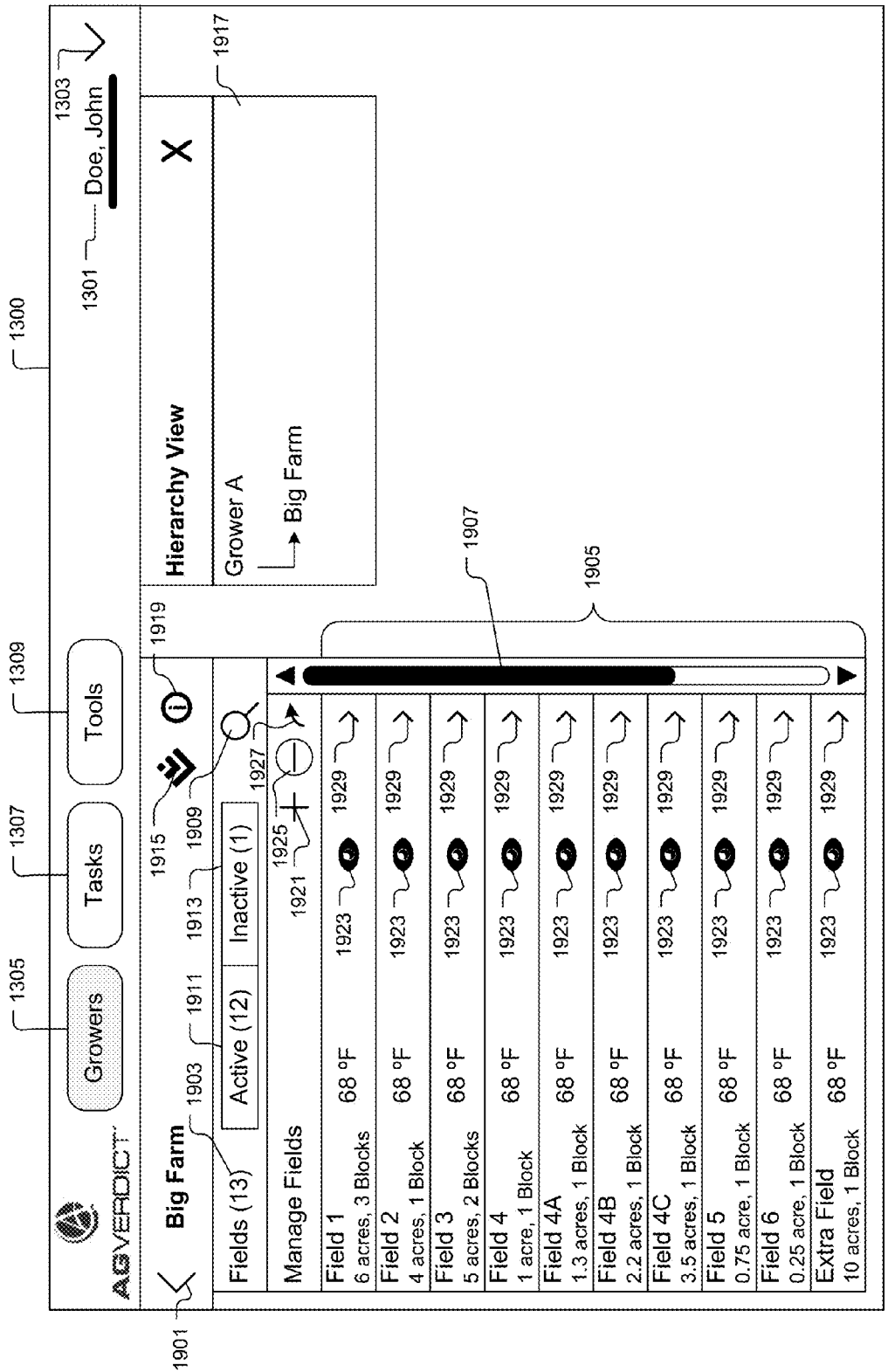
FIG. 19 shows the user interface upon selection of the activatable navigation icon for a given farm in the listing of farms, in accordance with some embodiments of the present invention.

FIG. 19 shows the user interface 1300 upon selection of the activatable navigation icon 1617 for a given farm in the listing of farms 1605, in accordance with some embodiments of the present invention. The name of the selected farm is displayed along with an activatable navigation icon 1901 that when activated will cause the user interface 1300 to display the listing of farms 1605 from which the selected farm was selected, such as shown in FIG. 16. A number of fields indicator 1903 is displayed showing the number of fields currently registered for the selected farm with the AGVERDICT® system 401. An active field indicator 1911 is provided to show the number currently active fields within the currently selected farm. Similarly, an inactive field indicator 1911 is provided to show the number currently inactive fields within the currently selected farm. Also, a listing of the fields 1905 for the selected farm is provided. A scroll bar 1907 is provided when needed for navigation through the listing of fields 1905. An activatable search icon 1909 is provided to enable a user to search for a particular field of the selected farm within the listing of fields 1905. In some embodiments, activation of the search icon 1909 causes a search field to be displayed to allow the user to enter a search term for locating a particular field of the selected farm within the listing of fields 1905, in a similar manner as discussed with regard to presentation of the search field 1401 as shown in FIG. 14.

An activatable hierarchy view button 1915 is provided that upon activation shows a hierarchy view 1917 of the currently selected farm. The hierarchy view 1917 is a tree view of the associations of the currently selected farm up to the currently selected grower. Also, an activatable view/edit farm icon 1919 is provided that when activated will allow the user to view and edit information about the currently selected farm using the interface as shown in FIG. 18.

Figure 20:
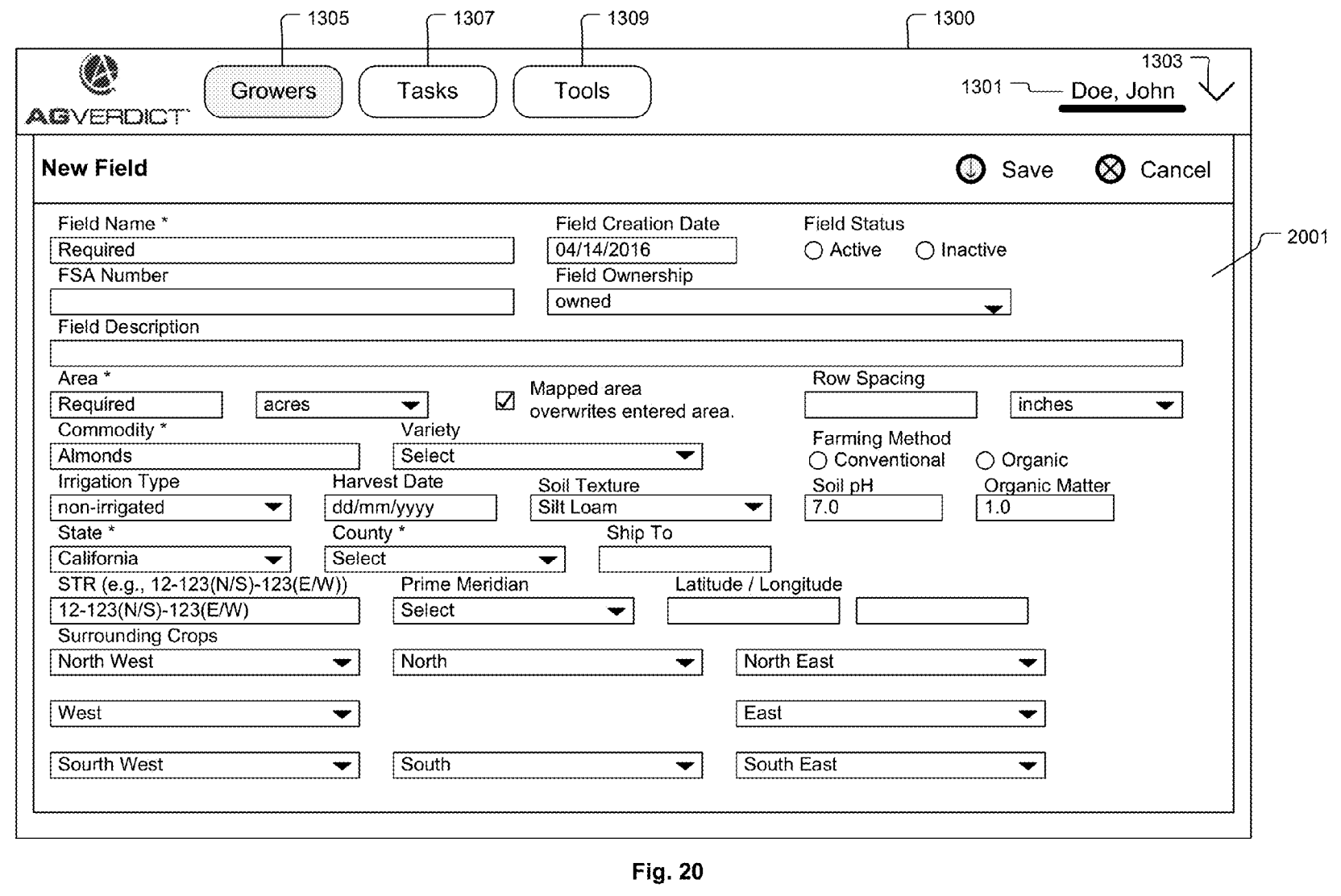

Also, an add field icon 1921 is provided that upon activation will allow the user to create a new field within the AGVERDICT® system 401 for the currently selected grower. FIG. 20 shows the user interface 1300 upon selection of the add field icon 1921, in accordance with some embodiments of the present invention. The user interface 1300 of FIG. 20 shows a form 2001 for entering information about the new field to be created for the currently selected farm within the AGVERDICT® system 401. The new field entry within form 2001 can either be saved or cancelled. Upon saving or cancelling the new field entry, the user interface 1300 will revert back to the listing of fields for the currently selected farm as shown in FIG. 19.

Figure 21:
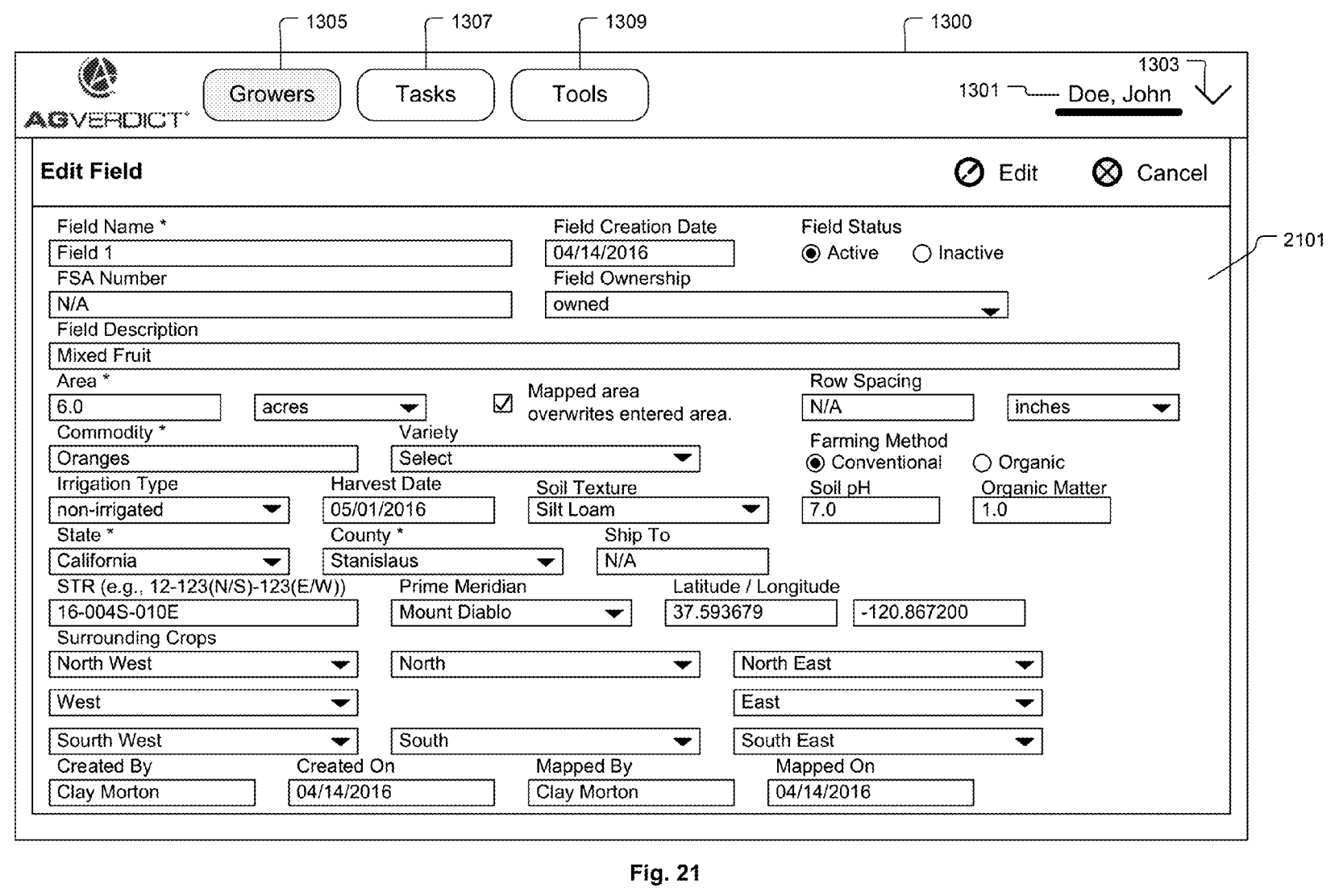

Each field of the currently selected farm is shown by name in the listing of fields 1905 and has a corresponding activatable view/edit field icon 1923, that when activated will allow the user to view and edit information about the corresponding field. FIG. 21 shows the user interface 1300 upon selection of the view/edit field icon 1923, in accordance with some embodiments of the present invention. The user interface 1300 of FIG. 21 shows a form 2101 for editing information about the selected field within the AGVERDICT® system 401. The edited field data within form 2101 can either be saved or cancelled. Upon saving or cancelling the edited field data, the user interface 1300 will revert back to the listing of fields for the currently selected farm as shown in FIG. 19.

Figure 22:
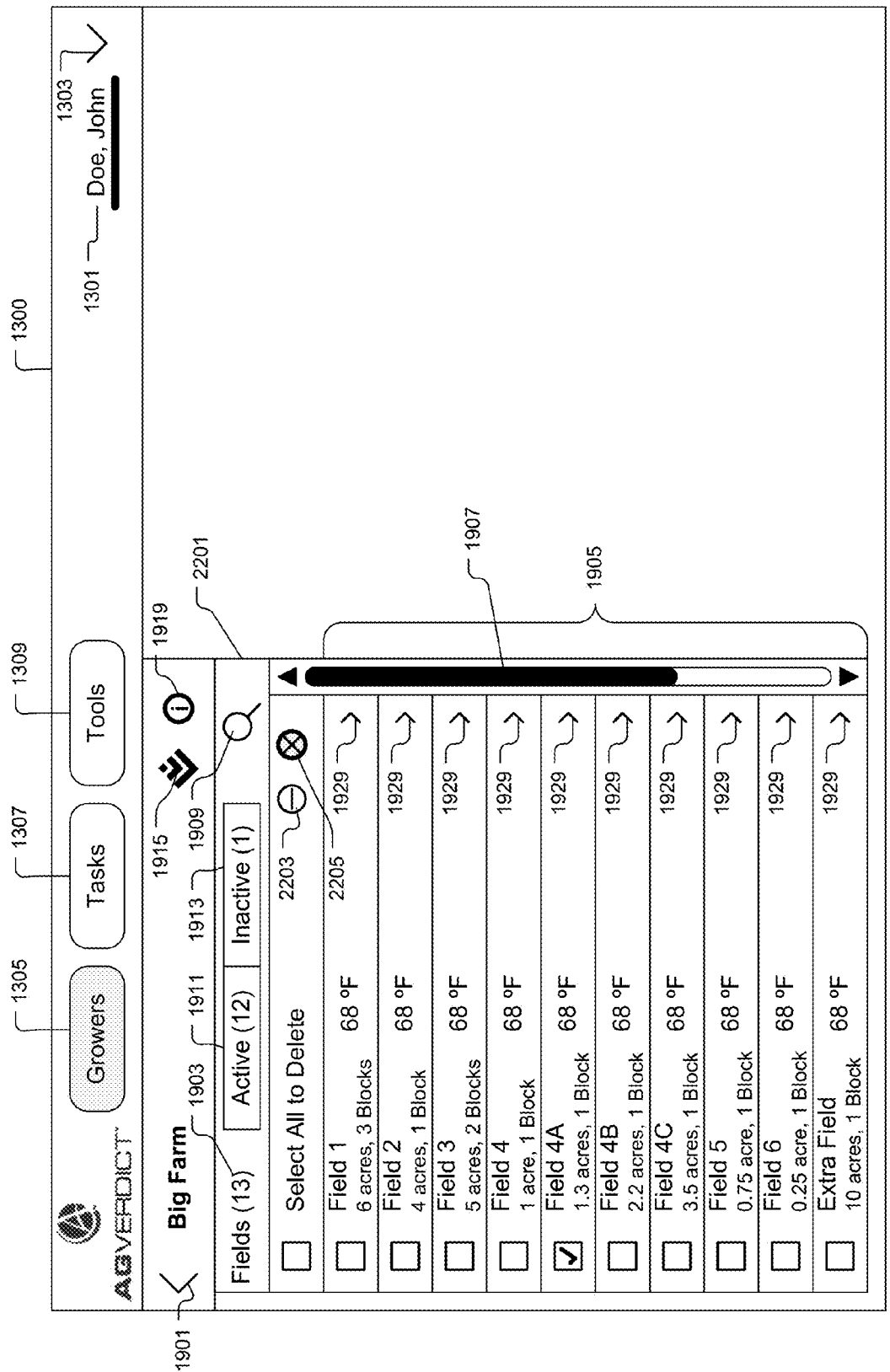
FIG. 22 shows the user interface upon selection of the delete field icon, in accordance with some embodiments of the present invention.

Also, in FIG. 19, an activatable delete field icon 1925 is provided that upon activation will allow the user to delete a field within the AGVERDICT® system 401. FIG. 22 shows the user interface 1300 upon selection of the delete field icon 1925, in accordance with some embodiments of the present invention. The user interface 1300 of FIG. 22 shows a form 2201 that provides selection icons for each of the fields in the listing of fields 1905 for the currently selected farm. The form 2201 also provides a delete icon 2203 that when activated will cause the currently selected fields to be deleted from the AGVERDICT® system 401. The form 2201 also provides a cancel icon 2205 that when activated will cancel the form 2201 and cancel the field deletion process and return the user interface 1300 to the view as shown in FIG. 19.

Figure 23:
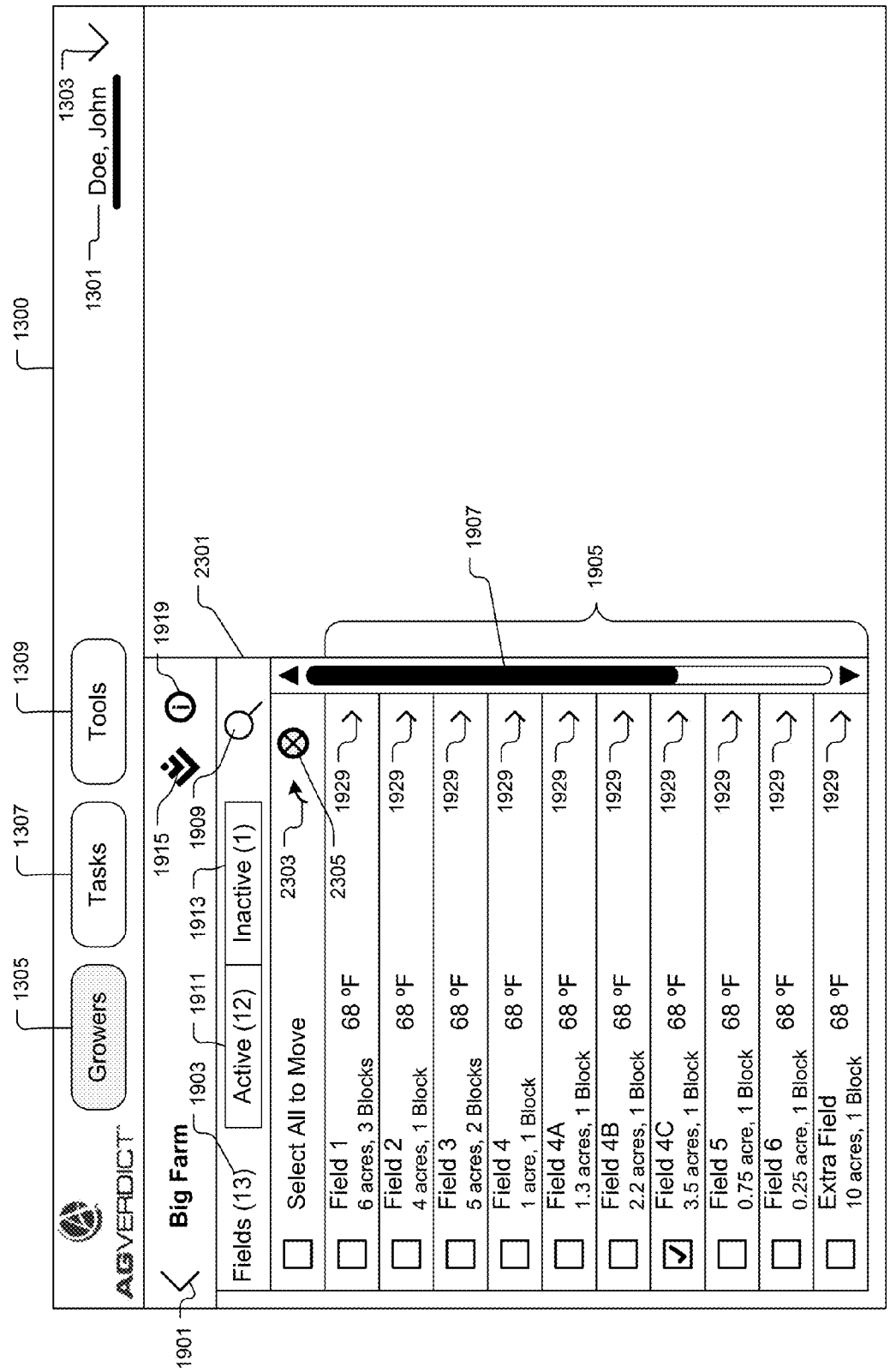
FIG. 23 shows the user interface upon selection of the move field icon, in accordance with some embodiments of the present invention.

Also, in FIG. 19, an activatable move field icon 1927 is provided that upon activation will allow the user to move a field within the AGVERDICT® system 401 to another grower and/or farm and/or field and/or block and/or sub-block. FIG. 23 shows the user interface 1300 upon selection of the move field icon 1927, in accordance with some embodiments of the present invention. The user interface 1300 of FIG. 23 shows a form 2301 that provides selection icons for each of the fields in the listing of fields 1905 for the currently selected farm. The form 2301 also provides a move icon 2303 that when activated will cause the currently selected fields to be moved within the AGVERDICT® system 401. The form 2301 also provides a cancel icon 2305 that when activated will cancel the form 2301 and cancel the field move process and return the user interface 1300 to the view as shown in FIG. 19.

Figure 24:
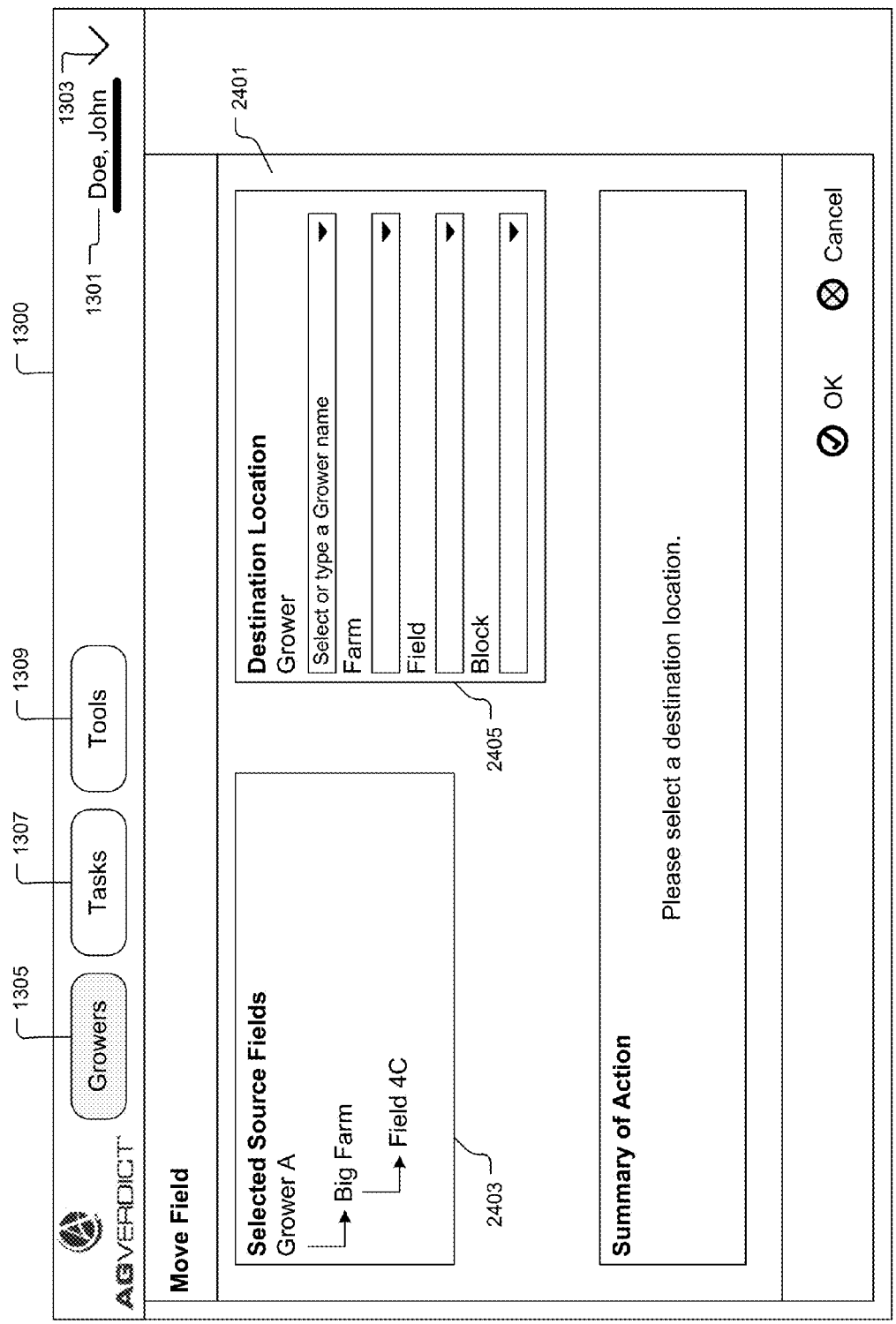
FIG. 24 shows the user interface upon activation of the move field icon, in accordance with some embodiments of the present invention.

FIG. 24 shows the user interface 1300 upon activation of the move icon 2303, in accordance with some embodiments of the present invention. A move field form 2401 is shown to include a hierarchy view 2403 of the field to be moved, and a set of selection fields 2405 for identifying a destination location for the field to be moved. The destination location can be specified by grower and/or farm and/or field and/or block within the AGVERDICT® system 401.

Figure 25:
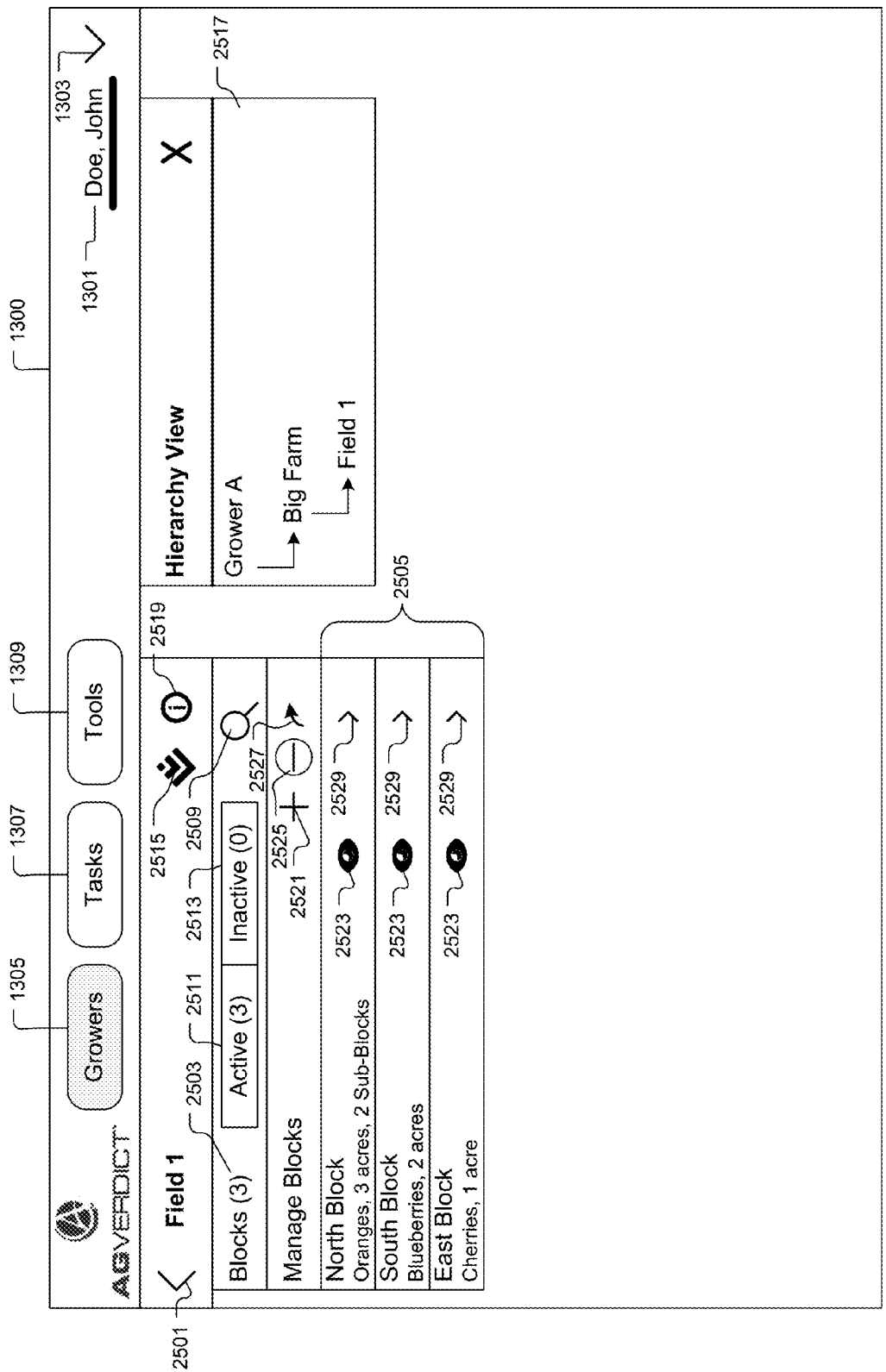
FIG. 25 shows the user interface upon selection of the activatable navigation icon for a given field in the listing of fields, in accordance with some embodiments of the present invention.

With reference back to FIG. 19, each field in the listing of fields 1905 has a corresponding activatable navigation icon 1929, that when activated will cause the user interface 1300 to display information about the corresponding field. FIG. 25 shows the user interface 1300 upon selection of the activatable navigation icon 1929 for a given field in the listing of fields 1905, in accordance with some embodiments of the present invention. The name of the selected field is displayed along with an activatable navigation icon 2501 that when activated will cause the user interface 1300 to display the listing of fields 1905 from which the selected field was selected, such as shown in FIG. 19. A number of blocks indicator 2503 is displayed showing the number of blocks currently registered for the selected field with the AGVERDICT® system 401. An active block indicator 2511 is provided to show the number currently active blocks within the currently selected field. Similarly, an inactive block indicator 2511 is provided to show the number currently inactive blocks within the currently selected field. Also, a listing of the blocks 2505 for the selected field is provided. An activatable search icon 2509 is provided to enable a user to search for a particular block of the selected field within the listing of blocks 2505. In some embodiments, activation of the search icon 2509 causes a search field to be displayed to allow the user to enter a search term for locating a particular block of the selected field within the listing of blocks 2505, in a similar manner as discussed with regard to presentation of the search field 1401 as shown in FIG. 14.

An activatable hierarchy view button 2515 is provided that upon activation shows a hierarchy view 2517 of the currently selected field. The hierarchy view 2517 is a tree view of the associations of the currently selected field up to the currently selected grower. Also, an activatable view/edit field icon 2519 is provided that when activated will allow the user to view and edit information about the currently selected field using the interface as shown in FIG. 21.

Figure 26:
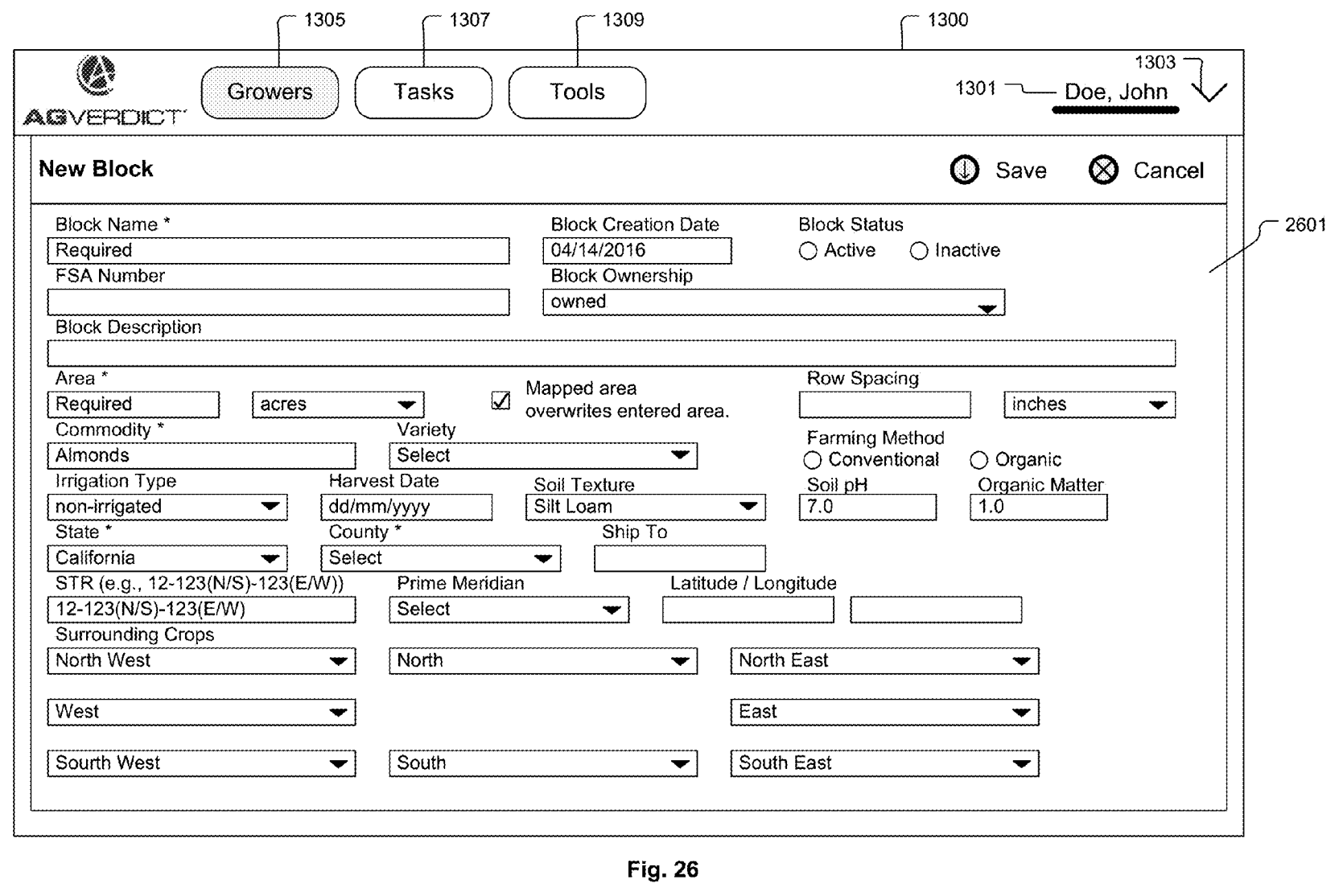

Also, an add block icon 2521 is provided that upon activation will allow the user to create a new block within the AGVERDICT® system 401 for the currently selected field. FIG. 26 shows the user interface 1300 upon selection of the add block icon 2521, in accordance with some embodiments of the present invention. The user interface 1300 of FIG. 26 shows a form 2601 for entering information about the new block to be created for the currently selected field within the AGVERDICT® system 401. The new block entry within form 2601 can either be saved or cancelled. Upon saving or cancelling the new block entry, the user interface 1300 will revert back to the listing of blocks for the currently selected field as shown in FIG. 25.

Figure 27:
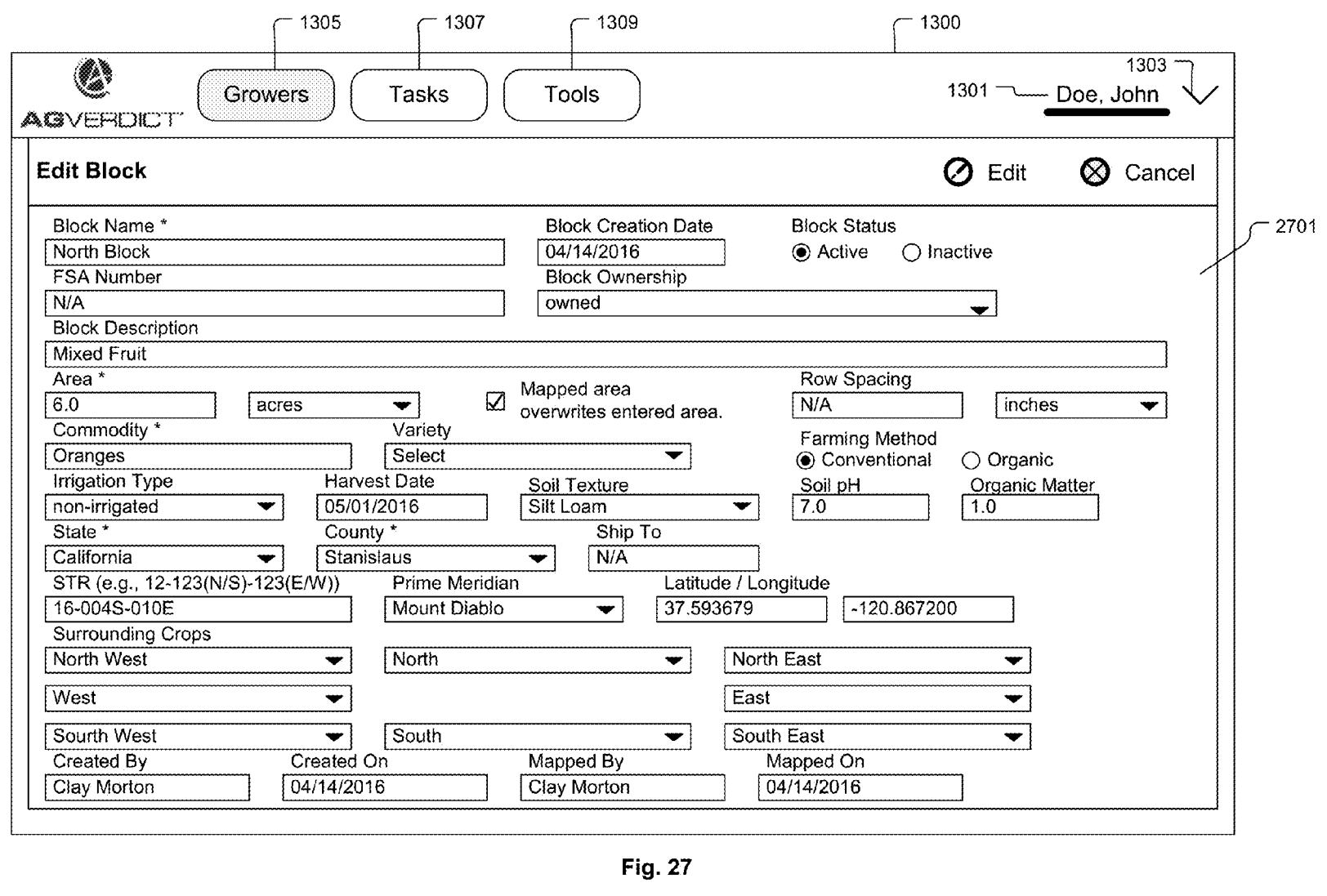

Each block of the currently selected field is shown by name in the listing of blocks 2505 and has a corresponding activatable view/edit block icon 2523, that when activated will allow the user to view and edit information about the corresponding block. FIG. 27 shows the user interface 1300 upon selection of the view/edit block icon 2523, in accordance with some embodiments of the present invention. The user interface 1300 of FIG. 27 shows a form 2701 for editing information about the selected block within the AGVER- DICT® system 401. The edited block data within form 2701 can either be saved or cancelled. Upon saving or cancelling the edited block data, the user interface 1300 will revert back to the listing of blocks 2505 for the currently selected field as shown in FIG. 25.

Figure 28:
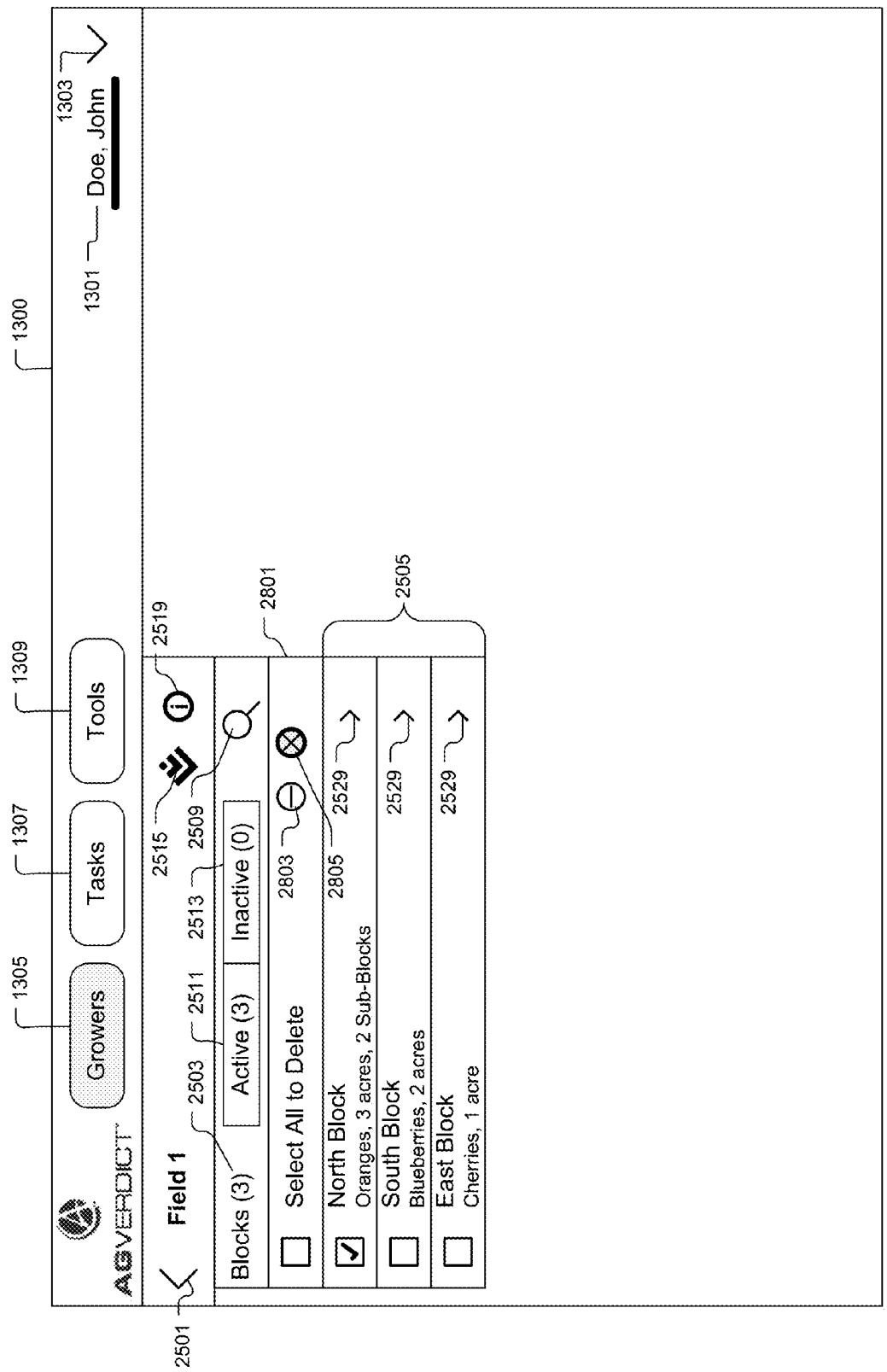
FIG. 28 shows the user interface upon selection of the delete block icon, in accordance with some embodiments of the present invention.

Also, in FIG. 25, an activatable delete block icon 2525 is provided that upon activation will allow the user to delete a block within the AGVERDICT® system 401. FIG. 28 shows the user interface 1300 upon selection of the delete block icon 2525, in accordance with some embodiments of the present invention. The user interface 1300 of FIG. 28 shows a form 2801 that provides selection icons for each of the blocks in the listing of blocks 2505 for the currently selected field. The form 2801 also provides a delete icon 2803 that when activated will cause the currently selected blocks to be deleted from the AGVERDICT® system 401. The form 2801 also provides a cancel icon 2805 that when activated will cancel the form 2801 and cancel the block deletion process and return the user interface 1300 to the view as shown in FIG. 25.

Figure 29:
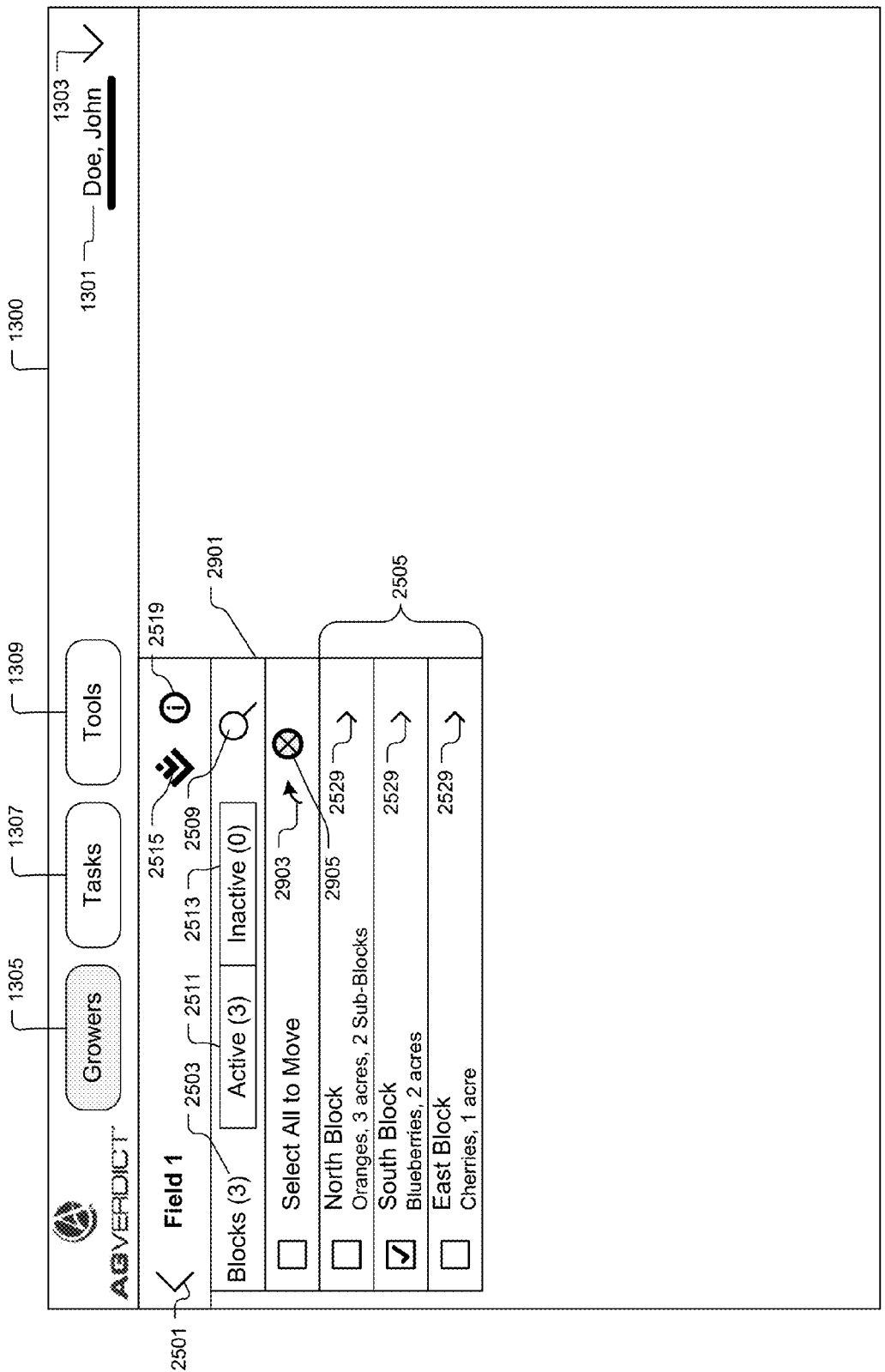
FIG. 29 shows the user interface upon selection of the move block icon, in accordance with some embodiments of the present invention.

Also, in FIG. 25, an activatable move block icon 2527 is provided that upon activation will allow the user to move a block within the AGVERDICT® system 401 to another grower and/or farm and/or field and/or block and/or sub-block. FIG. 29 shows the user interface 1300 upon selection of the move block icon 2527, in accordance with some embodiments of the present invention. The user interface 1300 of FIG. 29 shows a form 2901 that provides selection icons for each of the blocks in the listing of blocks 2505 for the currently selected field. The form 2901 also provides a move icon 2903 that when activated will cause the currently selected blocks to be moved within the AGVERDICT® system 401. The form 2901 also provides a cancel icon 2905 that when activated will cancel the form 2901 and cancel the block move process and return the user interface 1300 to the view as shown in FIG. 25.

Figure 30:
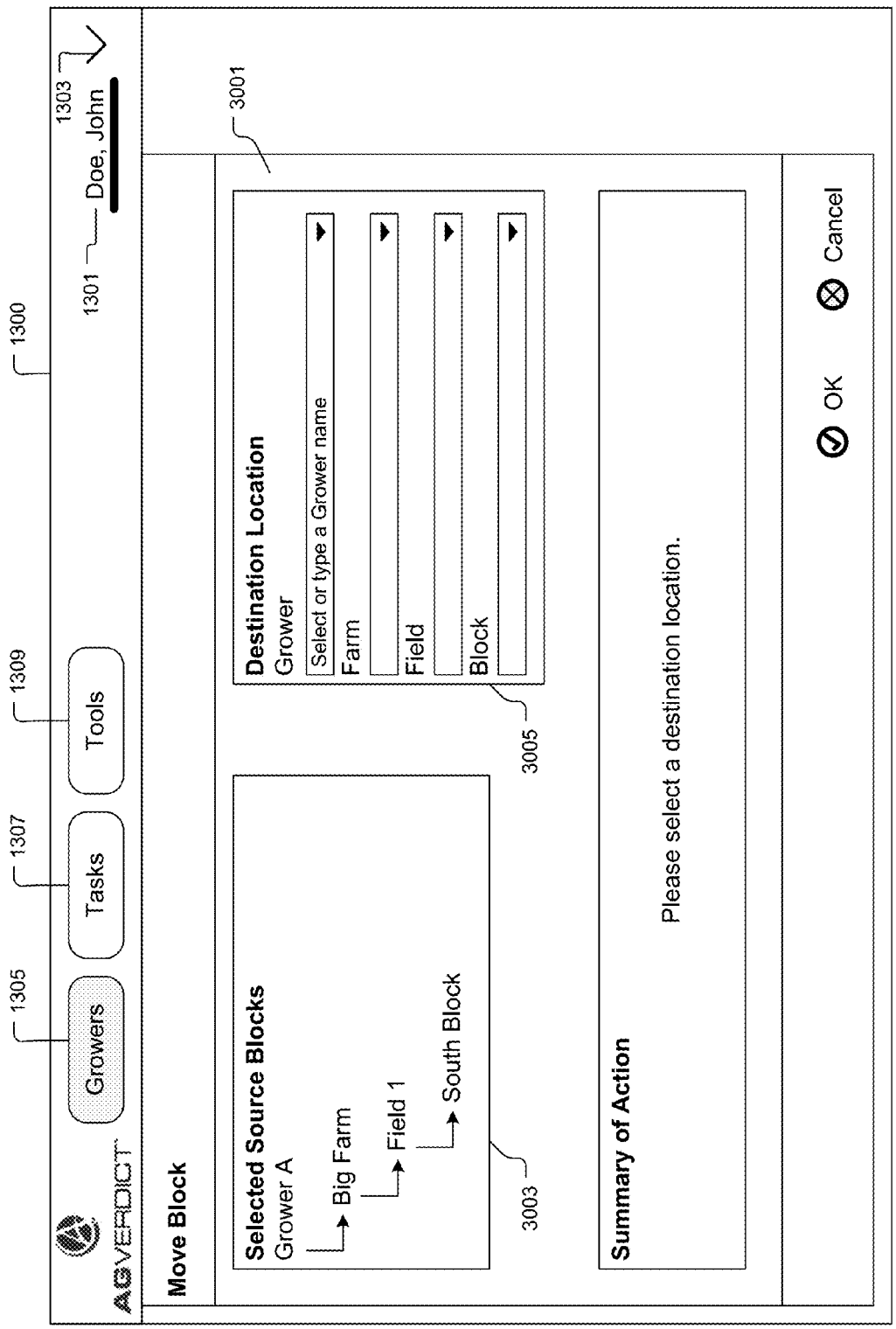
FIG. 30 shows the user interface upon activation of the move block icon, in accordance with some embodiments of the present invention.

FIG. 30 shows the user interface 1300 upon activation of the move icon 2903, in accordance with some embodiments of the present invention. A move block form 3001 is shown to include a hierarchy view 3003 of the block to be moved, and a set of selection fields 3005 for identifying a destination location for the block to be moved. The destination location can be specified by grower and/or farm and/or field and/or block within the AGVERDICT® system 401.

Figure 31:
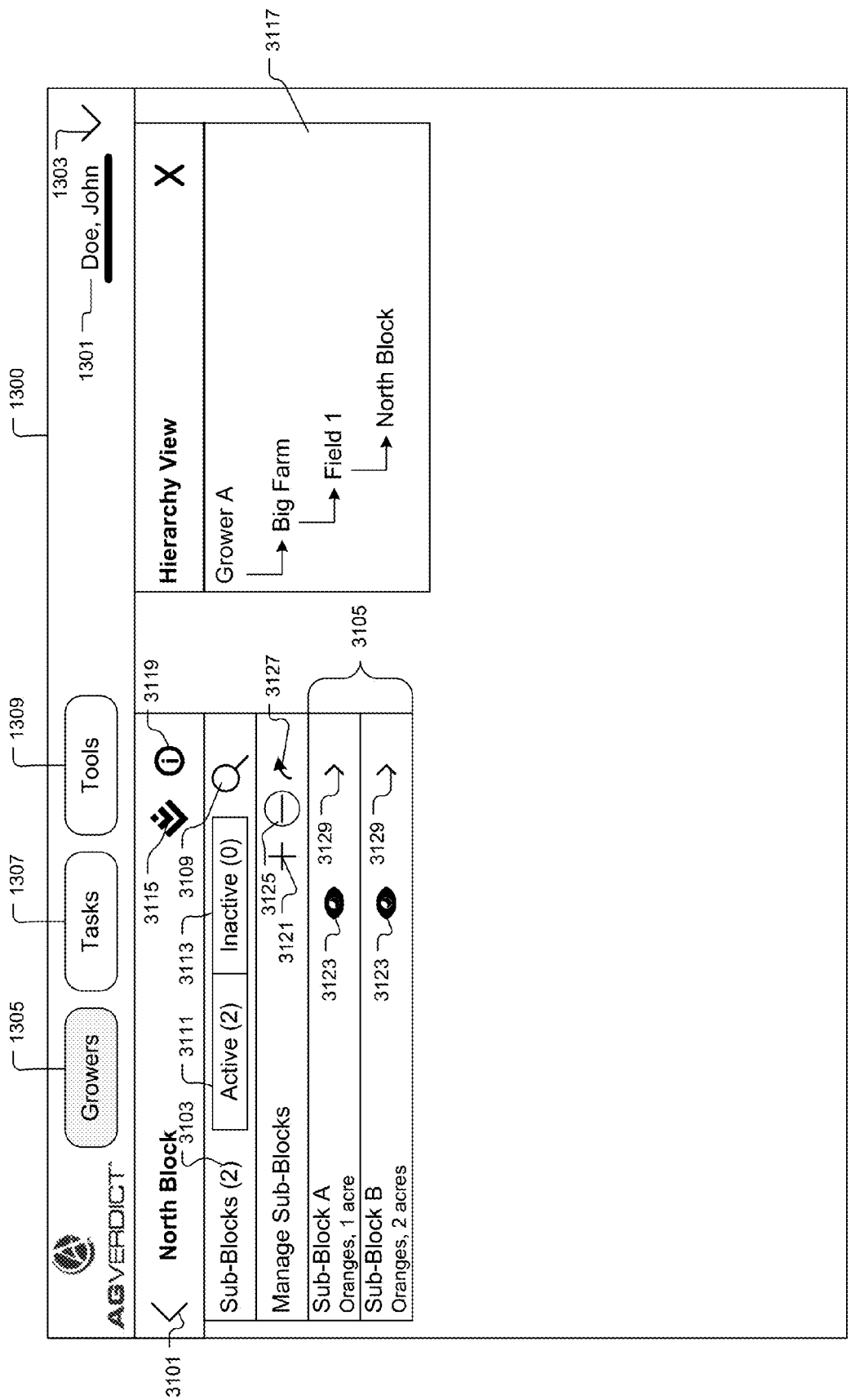
FIG. 31 shows the user interface upon selection of the activatable navigation icon for a given block in the listing of blocks, in accordance with some embodiments of the present invention.

With reference back to FIG. 25, each block in the listing of blocks 2505 has a corresponding activatable navigation icon 2529, that when activated will cause the user interface 1300 to display information about the corresponding block. FIG. 31 shows the user interface 1300 upon selection of the activatable navigation icon 2529 for a given block in the listing of blocks 2505, in accordance with some embodiments of the present invention. The name of the selected block is displayed along with an activatable navigation icon 3101 that when activated will cause the user interface 1300 to display the listing of blocks 2505 from which the selected block was selected, such as shown in FIG. 25. A number of sub-blocks indicator 3103 is displayed showing the number of sub-blocks currently registered for the selected block with the AGVERDICT® system 401. An active sub-block indicator 3111 is provided to show the number currently active sub-blocks within the currently selected block. Similarly, an inactive sub-block indicator 3111 is provided to show the number of currently inactive sub-blocks within the currently selected block. Also, a listing of the sub-blocks 3105 for the selected block is provided. An activatable search icon 3109 is provided to enable a user to search for a particular sub-block of the selected block within the listing of sub-blocks 3105. In some embodiments, activation of the search icon 3109 causes a search field to be displayed to allow the user to enter a search term for locating a particular sub-block of the selected block within the listing of blocks 3105, in a similar manner as discussed with regard to presentation of the search field 1401 as shown in FIG. 14.

An activatable hierarchy view button 3115 is provided that upon activation shows a hierarchy view 3117 of the currently selected block. The hierarchy view 3117 is a tree view of the associations of the currently selected block up to the currently selected grower. Also, an activatable view/edit block icon 3119 is provided that when activated will allow the user to view and edit information about the currently selected block using the interface as shown in FIG. 27.

Figure 32:
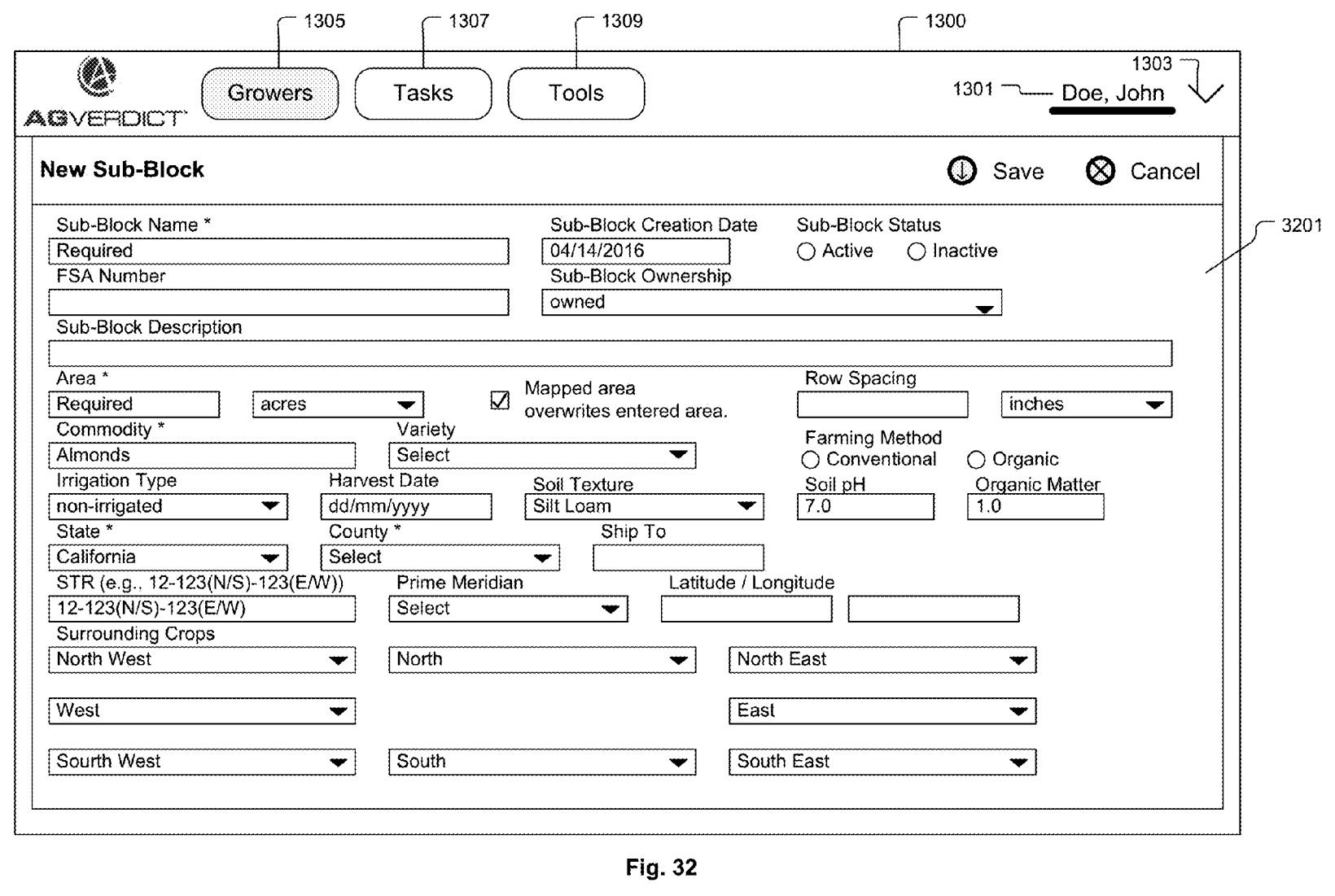

Also, an add sub-block icon 3121 is provided that upon activation will allow the user to create a new sub-block within the AGVERDICT® system 401 for the currently selected block. FIG. 32 shows the user interface 1300 upon selection of the add sub-block icon 3121, in accordance with some embodiments of the present invention. The user interface 1300 of FIG. 32 shows a form 3201 for entering information about the new sub-block to be created for the currently selected block within the AGVERDICT® system 401. The new sub-block entry within form 3201 can either be saved or cancelled. Upon saving or cancelling the new sub-block entry, the user interface 1300 will revert back to the listing of sub-blocks for the currently selected block as shown in FIG. 31.

Figure 33:
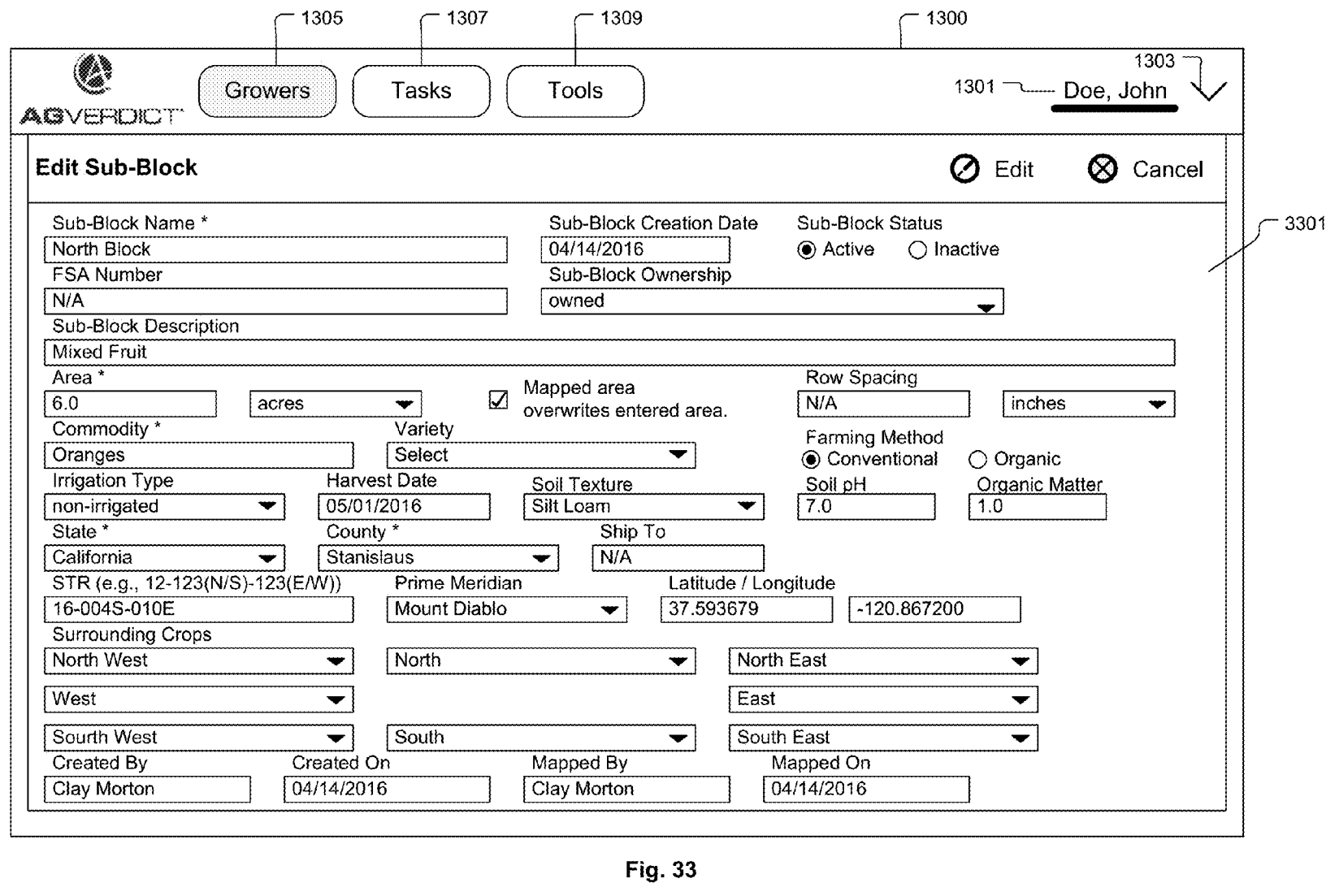

Each sub-block of the currently selected block is shown by name in the listing of sub-blocks 3105 and has a corresponding activatable view/edit block icon 3123, that when activated will allow the user to view and edit information about the corresponding sub-block. FIG. 33 shows the user interface 1300 upon selection of the view/edit sub-block icon 3123, in accordance with some embodiments of the present invention. The user interface 1300 of FIG. 33 shows a form 3301 for editing information about the selected sub-block within the AGVERDICT® system 401. The edited sub-block data within form 3301 can either be saved or cancelled. Upon saving or cancelling the edited sub-block data, the user interface 1300 will revert back to the listing of sub-blocks 3105 for the currently selected block as shown in FIG. 31.

Figure 34:
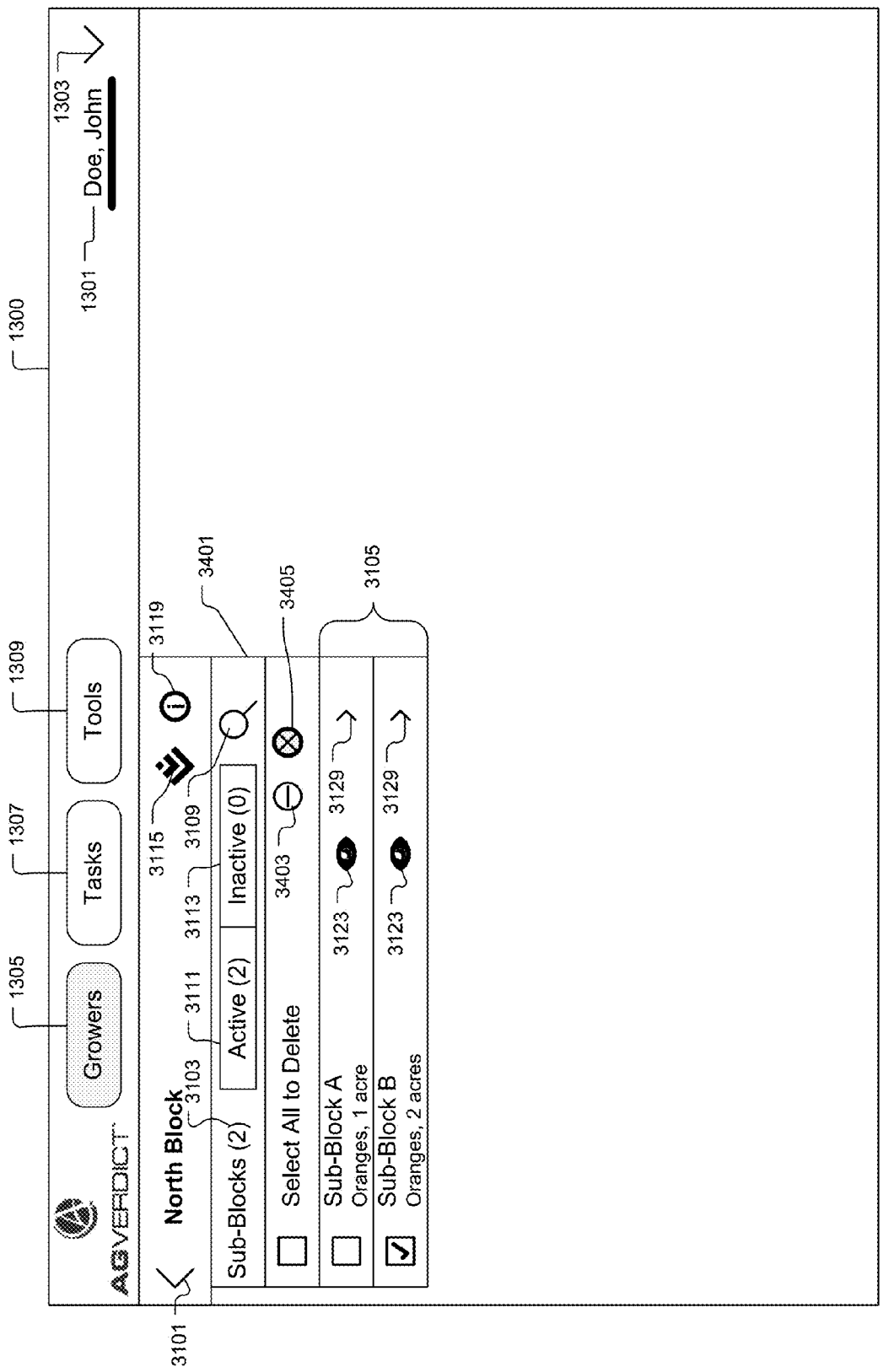
FIG. 34 shows the user interface upon selection of the delete sub-block icon, in accordance with some embodiments of the present invention.

Also, in FIG. 31, an activatable delete block icon 3125 is provided that upon activation will allow the user to delete a sub-block within the AGVERDICT® system 401. FIG. 34 shows the user interface 1300 upon selection of the delete sub-block icon 3125, in accordance with some embodiments of the present invention. The user interface 1300 of FIG. 34 shows a form 3401 that provides selection icons for each of the sub-blocks in the listing of sub-blocks 3105 for the currently selected block. The form 3401 also provides a delete icon 3403 that when activated will cause the currently selected sub-blocks to be deleted from the AGVERDICT® system 401. The form 3401 also provides a cancel icon 3405 that when activated will cancel the form 3401 and cancel the sub-block deletion process and return the user interface 1300 to the view as shown in FIG. 31.

Figure 35:
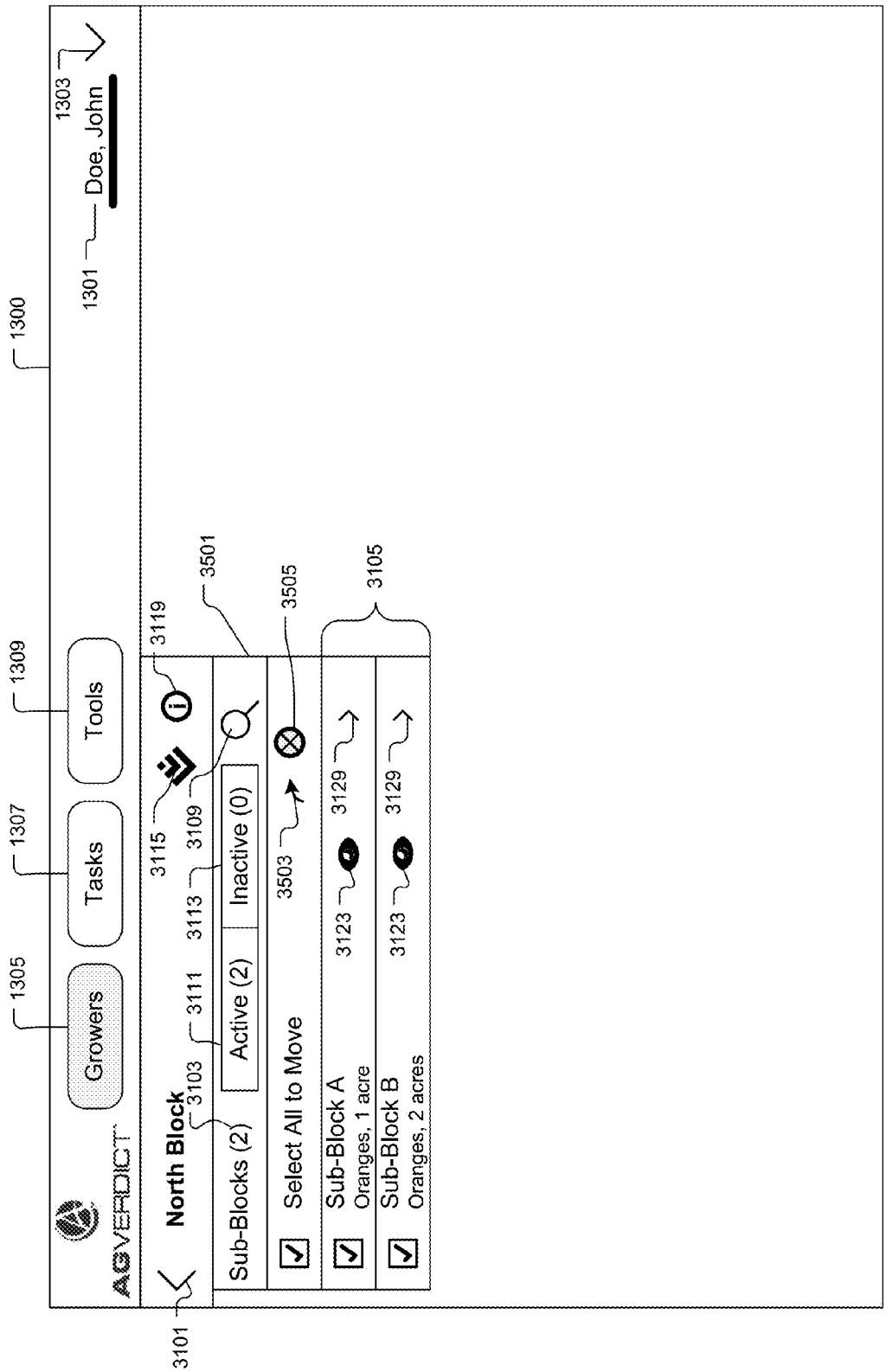
FIG. 35 shows the user interface upon selection of the move sub-block icon, in accordance with some embodiments of the present invention.

Also, in FIG. 31, an activatable move sub-block icon 3127 is provided that upon activation will allow the user to move a sub-block within the AGVERDICT® system 401 to another grower and/or farm and/or field and/or block and/or sub-block. FIG. 35 shows the user interface 1300 upon selection of the move sub-block icon 3127, in accordance with some embodiments of the present invention. The user interface 1300 of FIG. 35 shows a form 3501 that provides selection icons for each of the sub-blocks in the listing of sub-blocks 3105 for the currently selected block. The form 3501 also provides a move icon 3503 that when activated will cause the currently selected sub-blocks to be moved within the AGVERDICT® system 401. The form 3501 also provides a cancel icon 3505 that when activated will cancel the form 3501 and cancel the sub-block move process and return the user interface 1300 to the view as shown in FIG. 31.

Figure 36:
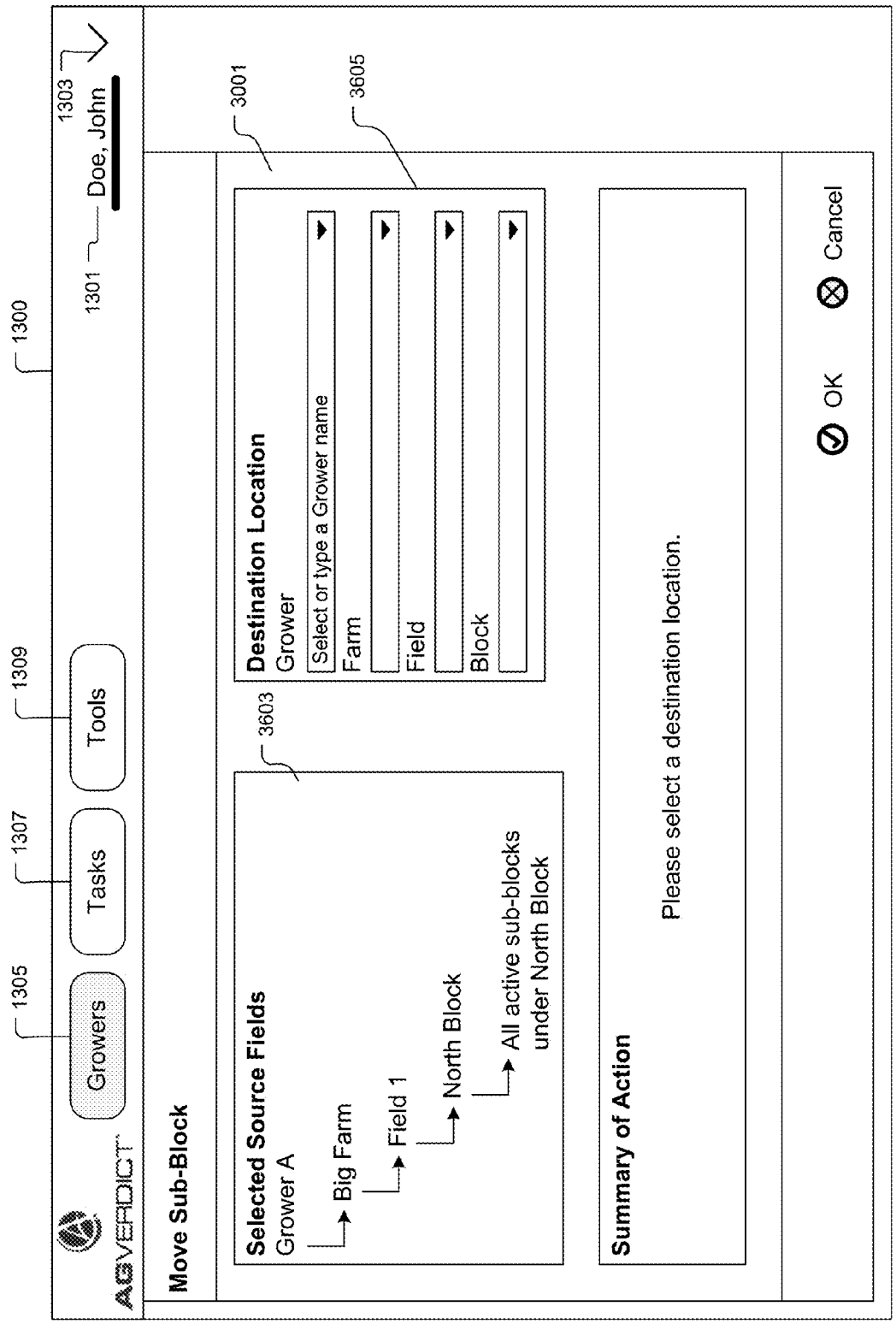
FIG. 36 shows the user interface upon activation of the move icon, in accordance with some embodiments of the present invention.

FIG. 36 shows the user interface 1300 upon activation of the move icon 3503, in accordance with some embodiments of the present invention. A move block form 3601 is shown to include a hierarchy view 3603 of the sub-block to be moved, and a set of selection fields 3605 for identifying a destination location for the sub-block to be moved. The destination location can be specified by grower and/or farm and/or field and/or block within the AGVERDICT® system 401.

Figure 37:
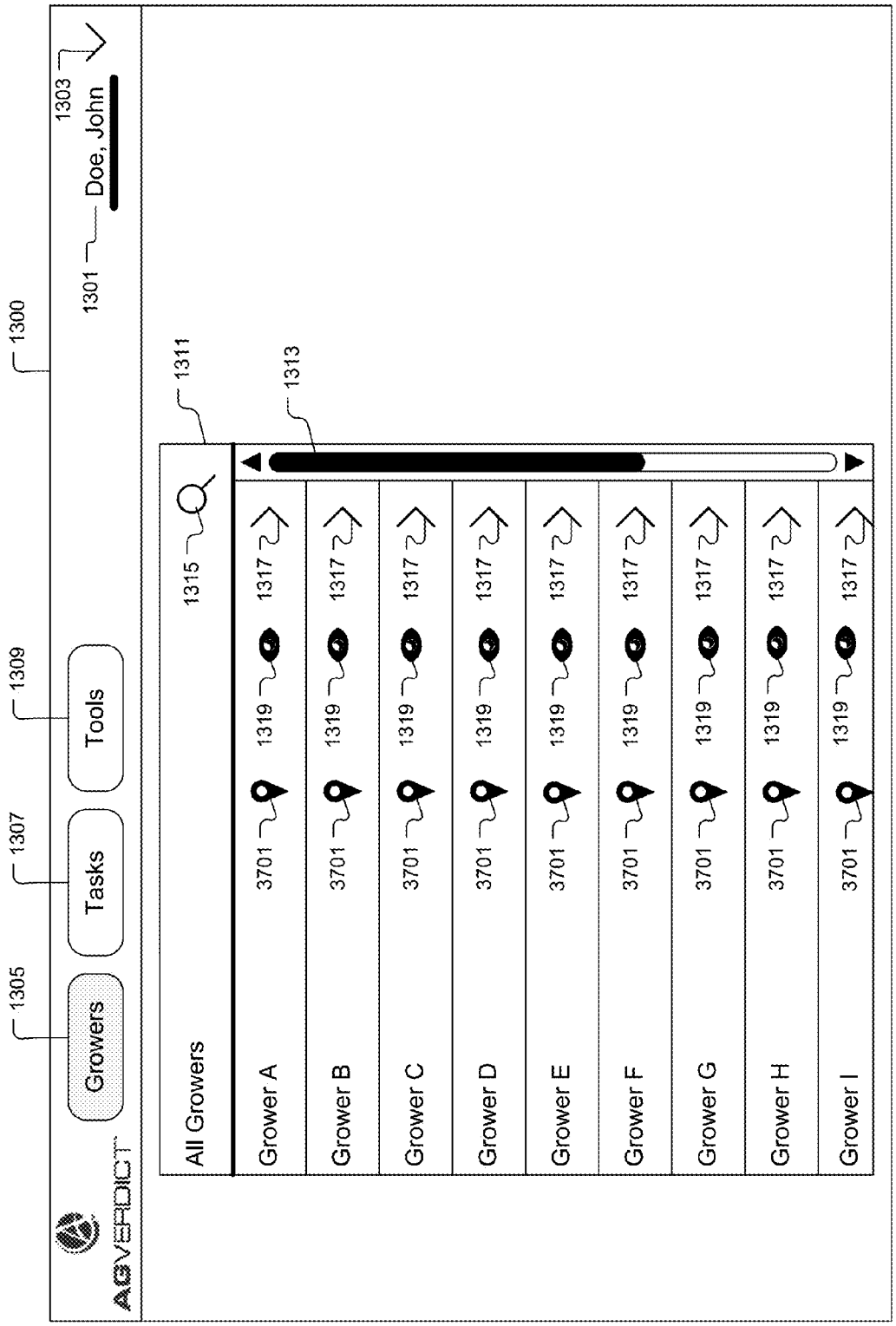
FIG. 37 shows a variation of the user interface of FIG. 13 in which each grower in the listing of growers has a corresponding activatable map view icon, which upon activation causes the user interface to show a map of the grower's agricultural enterprise, in accordance with some embodiments of the present invention.
Figure 38:
FIG. 38 shows the user interface upon selection of the map view icon, in accordance with some embodiments of the present invention.

FIG. 37 shows a variation of the user interface 1300 of FIG. 13 in which each grower in the listing of growers 1311 has a corresponding activatable map view icon 3701, which upon activation causes the user interface 1300 to show a map of the grower's agricultural enterprise, in accordance with some embodiments of the present invention. FIG. 38 shows the user interface 1300 upon selection of the map view icon 3701, in accordance with some embodiments of the present invention. The user interface 1300 in FIG. 38 displays a terrestrial image 3801 within which the grower's agricultural enterprise resides. It should be understood that the terrestrial image 3801 used to generate the map of the grower's agricultural enterprise can be sourced from essentially any aerial image provider and/or satellite image provider. Additionally, a number of view controls 3803 can be provided in conjunction with the terrestrial image 3801. For example, in some embodiments, the view controls 3803 include a zoom-in control 3805, a zoom-out control 3807, and a move control 3809.

Figure 39:
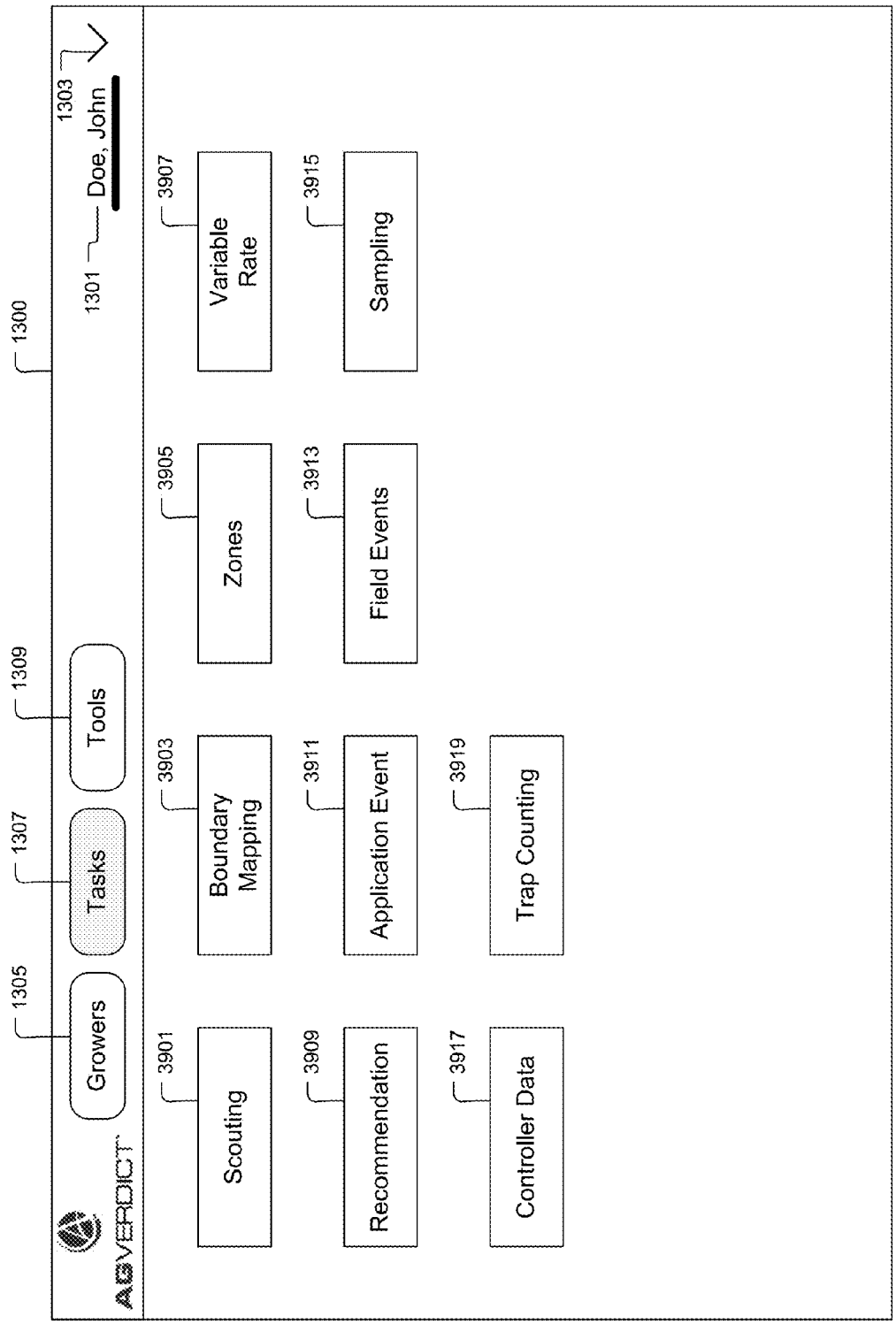
FIG. 39 shows the user interface with the tasks button activated to cause the user interface to show a number of activatable task icons for various tasks that can be performed by the user within the AGVERDICT® system, in accordance with some embodiments of the present invention.

FIG. 39 shows the user interface 1300 with the tasks button 1307 activated to cause the user interface 1300 to show a number of activatable task icons for various tasks that can be performed by the user within the AGVERDICT® system 401, in accordance with some embodiments of the present invention. In some embodiments, the activatable task icons includes a scouting icon 3901, a boundary mapping icon 3903, a zones icon 3905, a variable rate icon 3907, a recommendation icon 3909, an application event icon 3911, a field events icon 3913, a sampling icon 3915, a controller data icon 3917, and a trap counting icon 3919. It should be understood that in other embodiments, the AGVERDICT® system 401 can include more or less activatable task icons than those depicted in the example of FIG. 39.

Figure 40:
FIG. 40 shows the user interface upon activation of the scouting icon, in accordance with some embodiments of the present invention.

FIG. 40 shows the user interface 1300 upon activation of the scouting icon 3901, in accordance with some embodiments of the present invention. The user interface 1300 of FIG. 40 includes a scouting visit menu 4001 for selecting a scouting visit to view. The user interface 1300 also shows a terrestrial image 4003 including the map of the grower's agricultural enterprise corresponding to the scouting visits. In some embodiments, the scouting visits are identified by date and/or scouting data entry person. An activatable search icon 4005 is also provided to enable a user to search for a particular scouting visit. In some embodiments, activation of the search icon 4005 causes a search field to be displayed to allow the user to enter a search term for locating a particular scouting visit, in a similar manner as discussed with regard to presentation of the search field 1401 as shown in FIG. 14.

Figure 41:
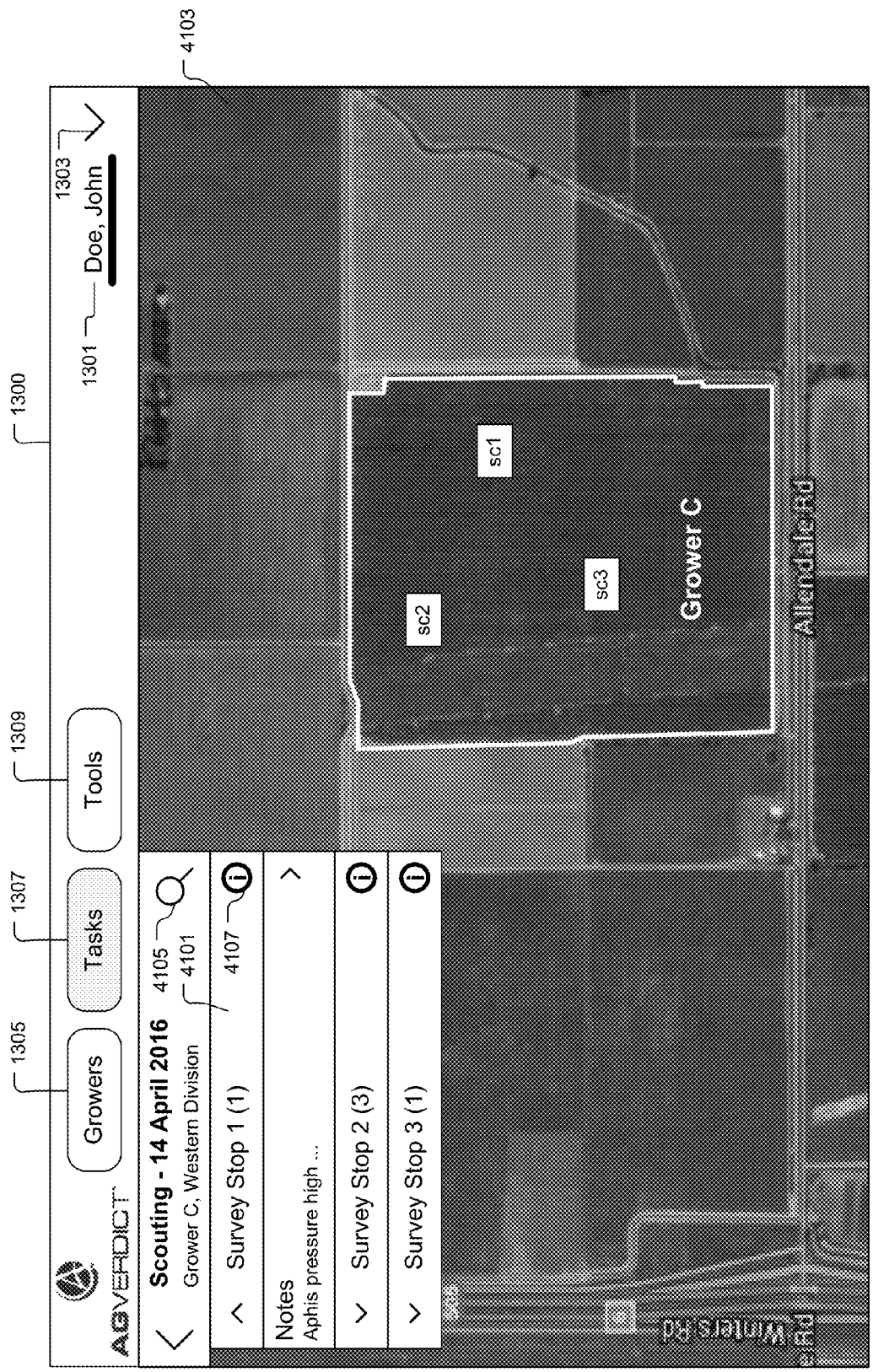
FIG. 41 shows the user interface upon selection of particular scouting visit in the scouting visit menu, in accordance with some embodiments of the present invention.

FIG. 41 shows the user interface 1300 upon selection of particular scouting visit in the scouting visit menu 4001, in accordance with some embodiments of the present invention. A scouting entry listing 4101 is displayed for the selected scouting visit. Each entry in the scouting entry listing 4101 includes observation data taken at a particular geolocation within the grower's operation. Again, an activatable search icon 4105 is also provided to enable a user to search for a particular scouting entry. In some embodiments, activation of the search icon 4105 causes a search field to be displayed to allow the user to enter a search term for locating a particular scouting entry, in a similar manner as discussed with regard to presentation of the search field 1401 as shown in FIG. 14. The user interface 1300 also shows a terrestrial image 4103 including the map of the grower's operation. Scouting symbols (sc1, sc2, sc3) are shown on the map of the grower's operation for each scouting entry at the geolocation corresponding to each scouting entry. Each scouting symbol (sc1, sc2, sc3) can be activated to display details of the corresponding scouting entry. Also, each scouting entry in the scouting entry listing 4101 can be selected to display details of the scouting entry.

Figure 42:
FIG. 42 shows the user interface upon activation of the navigation icon for Survey Stop 1 in FIG. 41, in accordance with some embodiments of the present invention.
Figure 43:
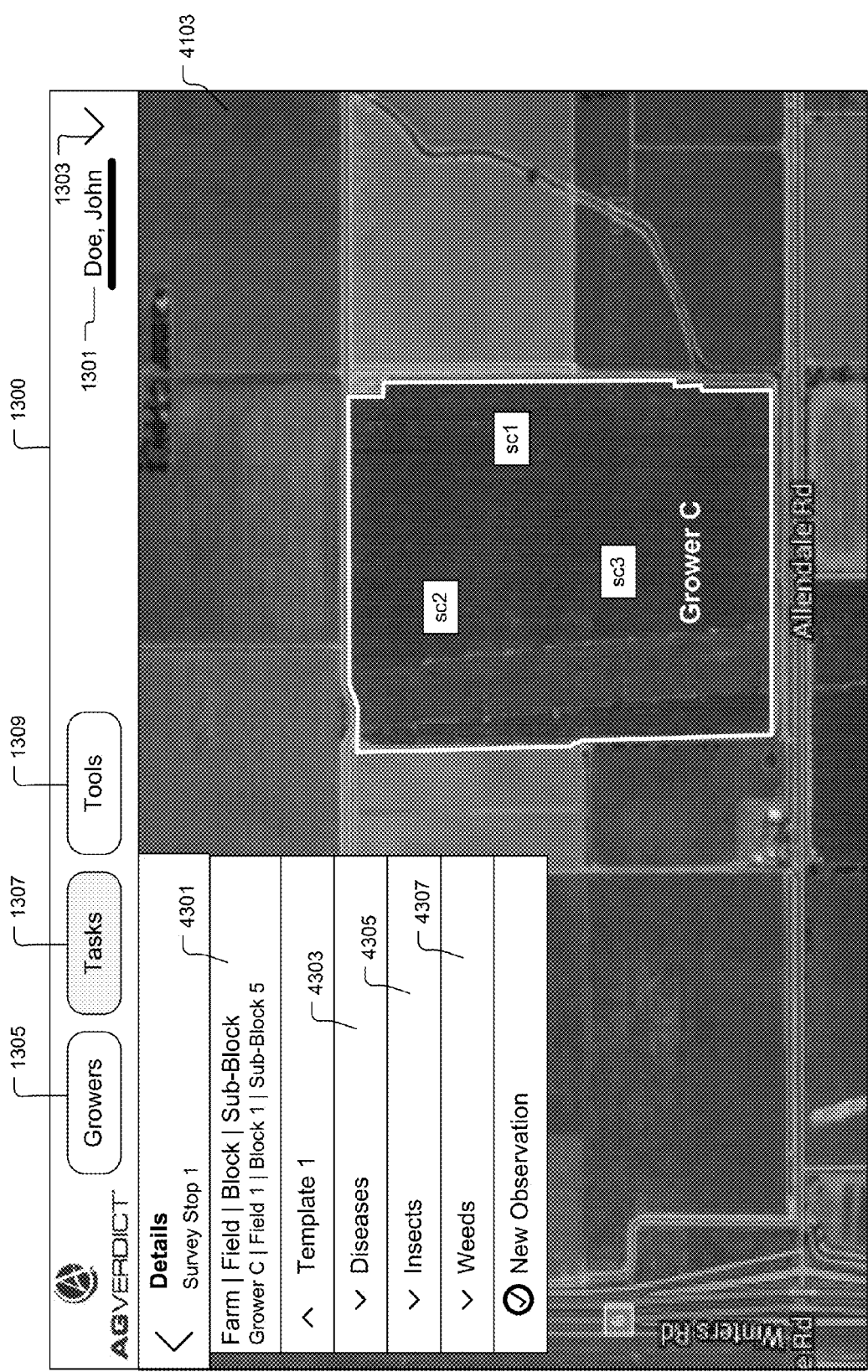
FIG. 43 shows an example scouting entry form that can be displayed upon selection of the edit icon, in accordance with some embodiments of the present invention.

And, each scouting entry in the scouting entry listing 4101 has a corresponding activatable navigation icon 4109 that when activated shows notes entered for the particular scouting entry. For example, FIG. 42 shows the user interface 1300 upon activation of the navigation icon 4109 for Survey Stop 1 in FIG. 41, in accordance with some embodiments of the present invention. Also, each scouting entry in the scouting entry listing 4101 has a corresponding activatable edit icon 4107 that when activated causes the user interface 1300 to show a form for entering data for the scouting entry. FIG. 43 shows an example scouting entry form 4301 that can be displayed upon selection of the edit icon 4107, in accordance with some embodiments of the present invention. The example scouting entry form 4301 provides menus for entering observation information, such as a disease entry menu 4303, an insects entry menu 4305, a weeds entry menu 4307, and provides a selection for indicating that the scouting entry is for a new observation. It should be understood that in various embodiments, the scouting entry form 4301 can be defined to provide for entry of essentially any observational data that may be observed within a field.

Figure 44:
FIG. 44 shows the user interface upon selection of the disease entry menu, in accordance with various embodiments of the present invention.
Figure 45:
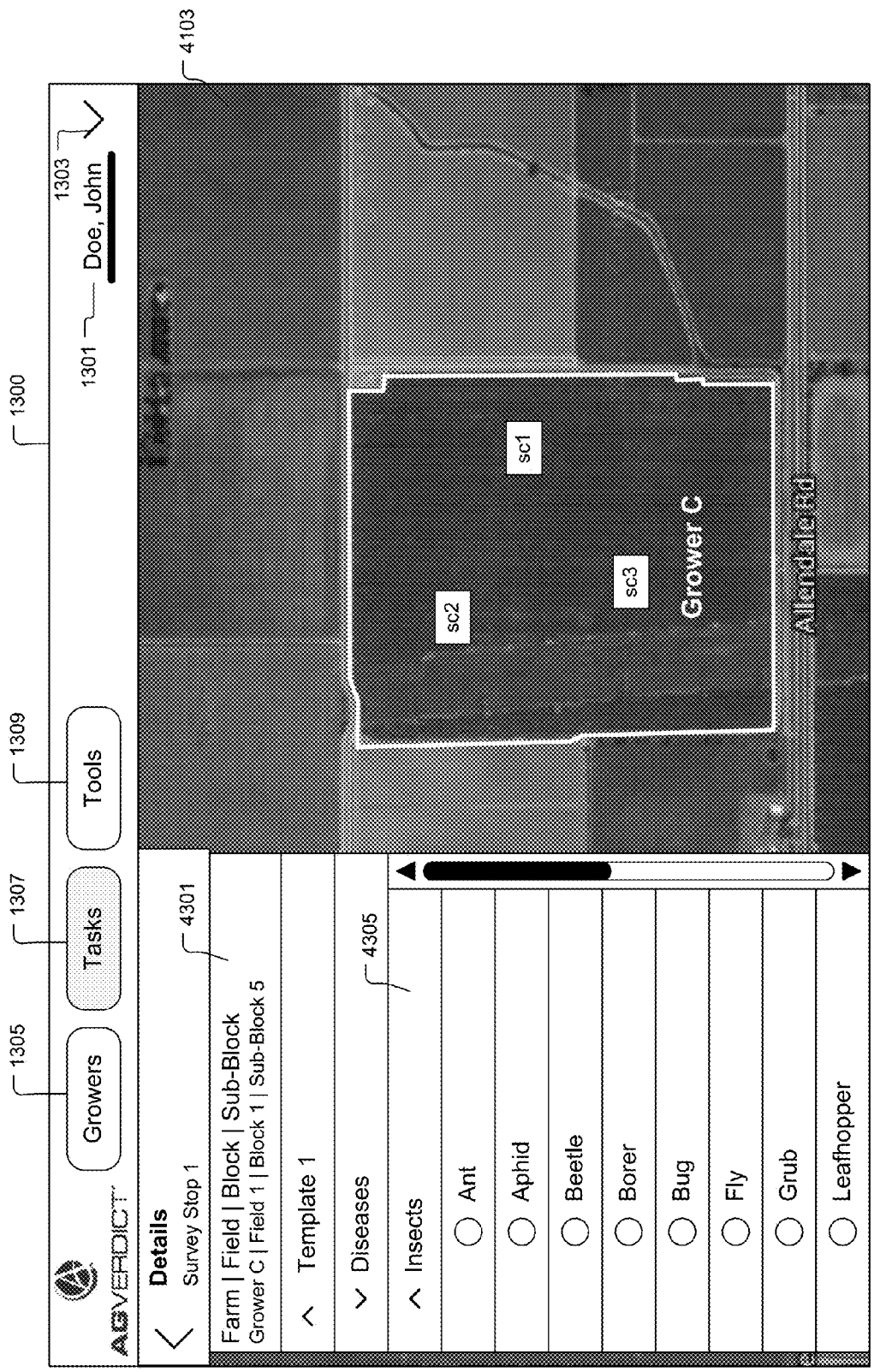
FIG. 45 shows the user interface upon selection of the insects entry menu, in accordance with various embodiments of the present invention.
Figure 46:
FIG. 46 shows the user interface upon selection of the weeds entry menu, in accordance with various embodiments of the present invention.

FIG. 44 shows the user interface 1300 upon selection of the disease entry menu 4303, in accordance with various embodiments of the present invention. An example listing of possible diseases for inclusion in the disease entry menu 4303 include alternaria, bacterial, blight, fungus, fusarium, mildew, mold, mosaic, phytophthora, pythium, rhizoctoria, rot, rust, scald, smut, virus, wilt, among others. FIG. 45 shows the user interface 1300 upon selection of the insects entry menu 4305, in accordance with various embodiments of the present invention. An example listing of possible insects for inclusion in the insects entry menu 4305 include ant, aphid, beetle, borer, bug, fly, grub, leafhopper, leafminer, leaf roller, looper, maggot, mite, moth, thrips, weevil, worm, among others. FIG. 46 shows the user interface 1300 upon selection of the weeds entry menu 4307, in accordance with various embodiments of the present invention. An example listing of possible weeds for inclusion in the weed entry menu 4307 include bind weed, brome, clover, fescue, foxtail, grass, knotweed, lambsquarter, lettuce, mayweed, mustard, nightshade, pigweed, sowthistle, spurge, thistle, volunteer, among others.

Figure 47:
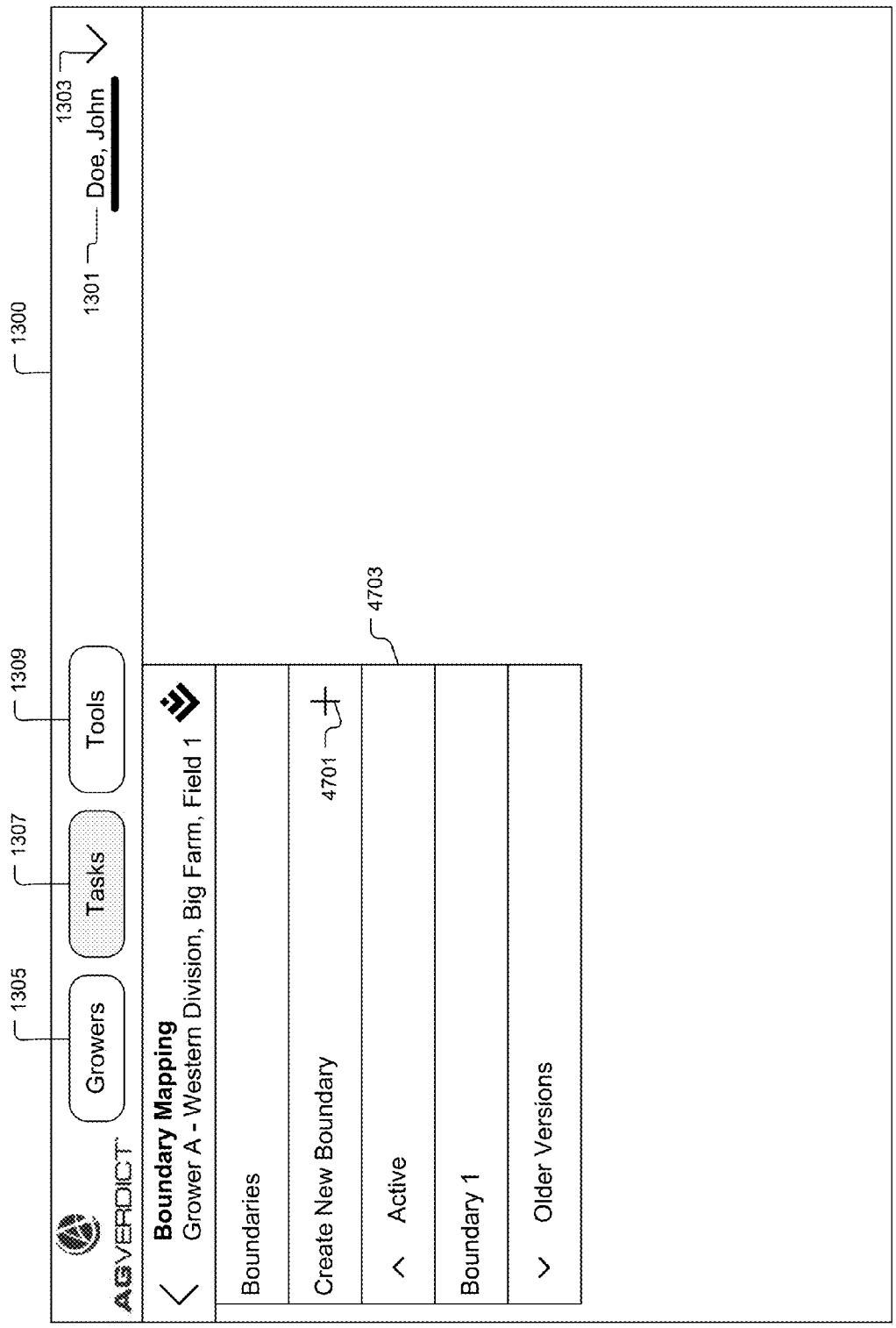
FIG. 47 shows the user interface upon activation of the boundary mapping icon as shown in the user interface view of FIG. 39, in accordance with some embodiments of the present invention.
Figure 49:
FIG. 49 shows the user interface upon selecting next to proceed with drawing of the boundary on the terrestrial image, in accordance with some embodiments of the present invention.

FIG. 47 shows the user interface 1300 upon activation of the boundary mapping icon 3903 as shown in the user interface 1300 view of FIG. 39, in accordance with some embodiments of the present invention. A create new boundary icon 4701 is provided that upon activation causes the user interface 1300 to display a utility for drawing a boundary on a terrestrial image of the currently selected grower's agricultural operation. FIG. 48 shows the user interface 1300 upon selection of the create new boundary icon 4701, in accordance with some embodiments of the present invention. A new boundary entry form 4801 is provided in which the user enters information about the boundary that is to be created. An option is provided to allow the user to draw the boundary directly on the terrestrial image of the currently selected grower's agricultural operation. FIG. 49 shows the user interface 1300 upon selecting to proceed with drawing of the boundary on the terrestrial image, in accordance with some embodiments of the present invention. The user interface 1300 provides a number of drawing tools 4901 that allow the user to manually draw and edit linear boundaries on the terrestrial image as shown in the user interface. In some embodiments, the drawing tools 4901 include a rectangle drawing tool 4903, a circle drawing tool 4905, a polygon drawing tool 4907, a select tool 4909, an edit tool 4911, and a navigate tool 4913, among others.

Figure 50:
FIG. 50 shows the user interface after selection of a previously defined boundary in which a boundary edit form is displayed to enable the user to edit information about the previously defined boundary, in accordance with some embodiments of the present invention.

With reference back to FIG. 47, a menu 4703 of previously defined boundary listings is shown. Selection of a given one of the previously defined boundary listings will cause the user interface 1300 to display information about the previously defined boundary for editing. For example, FIG. 50 shows the user interface 1300 after selection of a previously defined boundary in which a boundary edit form 5001 is displayed to enable the user to edit information about the previously defined boundary, in accordance with some embodiments of the present invention. When the next button is selected in the form 5001, the user interface 1300 allows the user to draw/edit the boundary directly on the terrestrial image of the currently selected grower's agricultural operation, as previously described with regard to FIG. 49.

With reference back to FIG. 39, selection of the zones icon 3905 causes the AGVERDICT® system 401 to display within the user interface 1300 tools for creating geographic zones within a given geographic area through geolocation coordinate entries that define the boundary of the zone and/or by providing a drawing utility, such as shown in the example of FIG. 49, that allows the user to manually draw the zone on a terrestrial image and/or by uploading of a shapefile that defines the boundary of the zone. Selection of the zones icon 3905 also causes the user interface 1300 to display tools for editing zone information and to provide forms for entering and/or uploading data for zones. Various types of data can be entered/uploaded including SSURGO data, Veris data, soil sampling data, tissue sampling data, image data, yield data, moisture data, elevation data, manual data, among other types of data.

The variable rate icon 3907 as shown in FIG. 39 provides for specification of a variable rate prescription to be performed over a specified geographic area. Upon selection of the variable rate icon 3907, the user interface 1300 displays a form that allows for entry of information pertinent to a given variable rate prescription. Some information that can be included within a variable rate prescription includes: the grower's name, the preparer's name (agronomist, pest control advisor, salesman, etc.), the applicator's name, the applicator's license number, the location where the variable rate application is to be performed (identified by grower, farm, field, block, and/or sub-block as registered in the AGVERDICT® system 401), the size of the area over which the variable rate application is to be performed, the commodity being grown in the subject area, the boundary of the subject area, the application data and time, the application method, the cost per acre of the application, reasons for performing the application (field observation, prevention, plant, leaf, fruit, presence of pest, sweep count, trap count, other count, harvest aid, pest is known to occur, among other reasons), notes/comments about the variable rate application, product selection information (element, product name, minimum application rate, maximum application rate, switch rate, tolerances, percentages, costs), and specification of product to be applied, among other types of information.

The recommendation icon 3909 as shown in FIG. 39 provides for entry of a recommendation for a grower. Upon selection of the recommendation icon 3909, the user interface 1300 displays a form that allows for entry of information pertinent to a given recommendation. Some information that can be included within a recommendation includes: product information (product type, application method, application timing, spray volume, product name, rate, pest, product provider, product cost, among other types of product information), overview information (branch, originator identification, proposed date, expiration date, pest control advisor, lot number, requestor type, license number, reason for recommendation, grower purchase order number, instructions for application, among other types of overview information), location information (grower/farm/field/block/sub-block, days to harvest, boundary definition, proposed area, treated area, among other types of location information), application information (applicator company identification and license number, applicator name and license number, processor name, supervisor name and license number, tank size, incorporation depth, droplet size, nozzle size, posting requirements, posting responsibility, target pressure, delivery instructions, notes, among other types of application information), among other types of recommendation information.

The application event icon 3911 as shown in FIG. 39 provides for entry of information for an agricultural product application event for a grower. Upon selection of the application event icon 3911, the user interface 1300 displays a form that allows for entry of information pertinent to a given application event. Some information that can be included within an application event includes: event title, event description, tank mix information, application method, application timing, spray volume, product information (product name, application rate, pest identification, product provider, REI, PHI), application details (processor name, supervisor name, supervisor license number, target pressure, incorporation depth, droplet size, nozzle size, posting requirements, posting responsibility, water source, reason for application, equipment type used for application and equipment identification number), work order details (proposed date, expiration date, delivery instructions, tank size), location information (location in which to perform application, location name, proposed area, start date, end date, time in, time out, treated area, weather (wind speed, temperature, wind direction, humidity), applicator notes), notes and application comments, among other types of information.

The field events icon 3913 as shown in FIG. 39 provides for entry of information for an agricultural field event. Upon selection of the field event icon 3913, the user interface 1300 displays a form that allows for entry of information pertinent to a given field event. Examples of field events include an application event (such as described with regard to the application event icon 3911), a crop maintenance event, a harvest event, an irrigation event, a planting event, a tillage event, among other types of events. Some information that can be included within a form for a crop maintenance event includes: event title, start date, end date, start time, end time, activity (bee pollination, crop inspection, drying, grafting, manure application, mating disruption, mouse baiting, mowing, pruning, shipping, storage, thinning, training, transplanting, tying, weeding, rogueing, among other activities), activity acreage, equipment used (air seeder, baler, chisel plow, combine, cultivator, drill, electrostatic machine, harrow, harvester, tillage machine, planter, plow, pull-behind sprayer, seeder, sprayer, spreader, swather, tractor, trailer, truck, wagon, among other types of equipment), equipment cost per acre, total equipment cost, personnel name, personnel cost per acre, personnel total cost, other cost per acre, other total cost, description of other costs, total cost per acre, total cost for crop maintenance, notes, among other types of information for the crop maintenance event.

Some information that can be included within a form for a harvest event includes: event title, start date, end date, start time, end time, crop/commodity identification, crop/commodity variety information, harvest method/type (bale, combine, cut, digger, final harvest, hand harvest, mechanical harvest, picked, rake, stripped, swathed), harvest width, harvest acreage, average yield per acre, field total yield, crop price per acre, crop value, crop quality, yield map, lot number, pre-harvest details (pre-harvest dates, pre-harvest time, pre-harvest method (cut, defoliate, roll, swath, vine kill, windrow, among others), equipment used (air seeder, baler, chisel plow, combine, cultivator, drill, electrostatic machine, harrow, harvester, tillage machine, planter, plow, pull-behind sprayer, seeder, sprayer, spreader, swather, tractor, trailer, truck, wagon, among other types of equipment), equipment cost per acre, total equipment cost, personnel name, personnel cost per acre, personnel total cost, other cost per acre, other total cost, description of other costs, total cost per acre, total cost for harvest event, notes, among other types of information for the harvest event.

Some information that can be included within a form for an irrigation event includes: event title, start date, end date, start time, end time, irrigation type (drip, flood, furrow, hand lines, linear, micro, overhead sprinkler, pivot, rainfall, sprinkler, wheel lines, among others), irrigation acreage, irrigation rate, irrigation total, water source, timer settings, start position, stop position, application event (yes/no), personnel name, personnel cost per acre, personnel total cost, other cost per acre, other total cost, description of other costs, total cost per acre, total cost for irrigation event, notes, among other types of information for the irrigation event.

Some information that can be included within a form for a planting event includes: event title, start date, end date, start time, end time, crop/commodity identification, crop/commodity variety information, source, seed generation (breeder, certified, foundation, registered), seed lot number, seed depth, grower applied seed treatment (yes/no), seed cost per acre, total seed cost, planting type (bed, broadcast, charcoal seeded, direct seeded, drill, no-till drill, row planter, transplant), planted acreage, residue percentage, soil moisture percentage, soil temperature, field condition, planting direction, row type (bed, double, single), row or bed spacing, planting rate per acre, planter width, plant spacing, population, as-planted map (yes/no), planting application event (yes/no), equipment used (air seeder, baler, chisel plow, combine, cultivator, drill, electrostatic machine, harrow, harvester, tillage machine, planter, plow, pull-behind sprayer, seeder, sprayer, spreader, swather, tractor, trailer, truck, wagon, among other types of equipment), equipment cost per acre, total equipment cost, personnel name, personnel cost per acre, personnel total cost, other cost per acre, other total cost, description of other costs, total cost per acre, total cost for planting event, notes, among other types of information for the planting event.

Some information that can be included within a form for a tillage event includes: event title, start date, end date, start time, end time, tillage type (bedding, chemical incorporation, chisel, corrugating, cultivate, dammer-dyke, disc, disc-ripper, eliminator, harrow, hilling, land plane, lay-by, lifting, listing, mark-out, mowing, plow, ridge till incorporation, rip, rock pick, roto-till, strip till, vertical tillage, among other types of tillage), tillage acreage, application event (yes/no), equipment used (air seeder, baler, chisel plow, combine, cultivator, drill, electrostatic machine, harrow, harvester, tillage machine, planter, plow, pull-behind sprayer, seeder, sprayer, spreader, swather, tractor, trailer, truck, wagon, among other types of equipment), equipment cost per acre, total equipment cost, personnel name, personnel cost per acre, personnel total cost, other cost per acre, other total cost, description of other costs, total cost per acre, total cost for tillage event, notes, among other types of information for the tillage event.

The sampling events icon 3915 as shown in FIG. 39 provides for entry of information for an agricultural-related sampling event. Upon selection of the sampling event icon 3915, the user interface 1300 displays a form that allows for entry of information pertinent to a given sampling event. Examples of sampling events include a directed event, a grid event, a composite event, a zone-directed event, a zone-composite event, a directed-composite event, among other types of sampling events. Some information that can be included within a form for a sampling event includes: event title, start date, end date, start time, end time, sampling acreage, target pH, laboratory account number, field commodity and yield goal, other commodity and yield goal, field county, major soil type, tissue type (petiole, leaf, whole plant, among others), previous commodity, sampling depth, laboratory name, identification of laboratory analysis package, cost per acre, total cost, laboratory event identifier, equipment used (air seeder, baler, chisel plow, combine, cultivator, drill, electrostatic machine, harrow, harvester, tillage machine, planter, plow, pull-behind sprayer, seeder, sprayer, spreader, swather, tractor, trailer, truck, wagon, among other types of equipment), equipment cost per acre, total equipment cost, personnel name, personnel cost per acre, personnel total cost, other cost per acre, other total cost, description of other costs, total cost per acre, total cost for sampling event, notes, among other types of information for the sampling event.

The controller data icon 3917 as shown in FIG. 39 provides for entry of information into the AGVERDICT® system 401 from a controller of a piece of agricultural equipment. Upon selection of the controller data icon 3917, the user interface 1300 displays a form that allows for entry/uploading of information from a controller into the AGVERDICT® system 401. Also, upon selection of the controller data icon 3917, the user interface 1300 displays one or more tables showing data received into the AGVERDICT® system 401 from one or more controllers, where the data is presented in a format that is understandable and meaningful to a user of the AGVERDICT® system 401.

Figure 51:
FIG. 51 shows the user interface upon activation of the trap counting icon, in accordance with some embodiments of the present invention.
Figure 52:
FIG. 52 shows the user interface upon selection of particular trap in the trap menu, in accordance with some embodiments of the present invention.

The trap counting icon 3919 as shown in FIG. 39 provides for entry of information into and retrieval of information from the AGVERDICT® system 401 regarding counting of pests captured in traps deployed within the grower's agricultural enterprise. FIG. 51 shows the user interface 1300 upon activation of the trap counting icon 3919, in accordance with some embodiments of the present invention. The user interface 1300 of FIG. 51 includes a trap menu 5101 for selecting a trap to view. The user interface 1300 also shows a terrestrial image 5103 including the map of the grower's agricultural enterprise corresponding to the trap counting. In some embodiments, the traps are identified by trap name, pest type, lure life remaining, and trap location. An activatable search icon 5105 is also provided to enable a user to search for a particular trap. In some embodiments, activation of the search icon 5105 causes a search field to be displayed to allow the user to enter a search term for locating a particular trap, in a similar manner as discussed with regard to presentation of the search field 1401 as shown in FIG. 14. A trap symbol is shown on the terrestrial image 5103 at each geolocation of the traps in the trap menu 5101. FIG. 52 shows the user interface 1300 upon selection of particular trap in the trap menu 5101, in accordance with some embodiments of the present invention.

Figure 53:
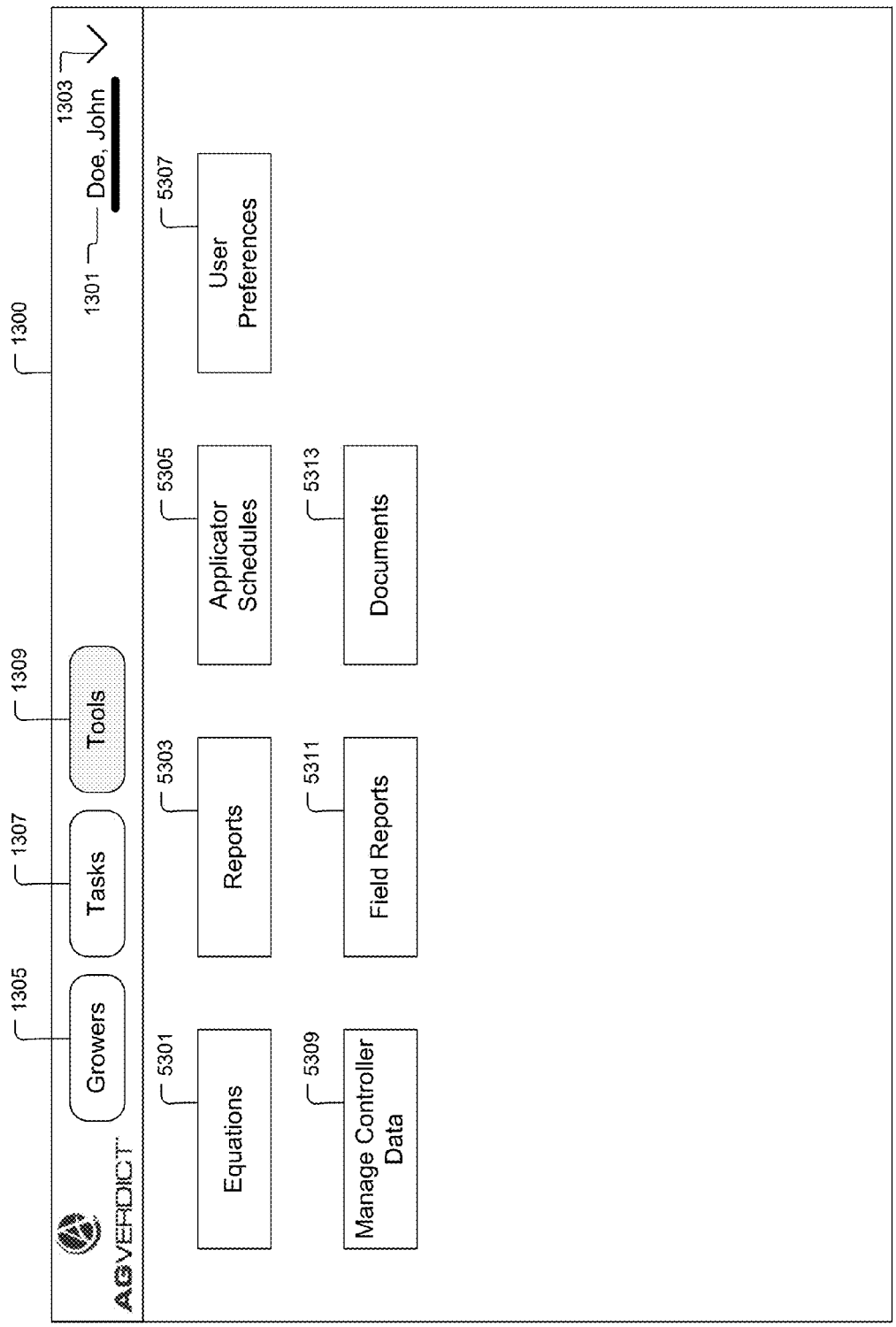
FIG. 53 shows the user interface with the tools button activated to cause the user interface to show a number of activatable tool icons for various tools that can be used by the user within the AGVERDICT® system, in accordance with some embodiments of the present invention.

FIG. 53 shows the user interface 1300 with the tools button 1309 activated to cause the user interface 1300 to show a number of activatable tool icons for various tools that can be used by the user within the AGVERDICT® system 401, in accordance with some embodiments of the present invention. In some embodiments, the activatable tool icons includes an equations icon 5301, a reports icon 5303, an applicator schedules icon 5305, a user preferences icon 5307, a manage controller data icon 5309, a field reports icon 5311, and a documents icon 5313. It should be understood that in other embodiments, the AGVERDICT® system 401 can include more or less activatable tool icons than those depicted in the example of FIG. 53.

Activation of the equations icon 5301 causes the user interface 1300 to display an equation editor interface that allows a user to define an equation for operating on data within the AGVERDICT® system 401. The equation editor interface provides for definition of essentially any form of mathematical equation within a conditional statement framework, e.g., if-then-else-elseif, using system variables, database variables, user-defined variables, and/or zone variables, where the variables correspond to accessible data within the AGVERDICT® system 401. The results generated by the user-defined equations can be used to generate prescriptions, recommendations, variable rate prescriptions, and essentially any other type of output generated by the AGVERDICT® system 401. Also, user-defined equations can be made private within the AGVERDICT® system 401. For example, if a trusted advisor creates equations to operate on data within the AGVERDICT® system 401, the equations created by the trusted advisor can be kept private so that the trusted advisor can use their equations to support various growers registered within the AGVERDICT® system 401 without disclosing their equations to the growers.

Activation of the reports icon 5303 causes the user interface 1300 to display a reports menu that includes a listing of different types of reports that can be generated by the AGVERDICT® system 401. In some embodiments, the different types of reports include a farm field report, a product use report, a sample summary report, a directed sample points map, and a field event summary report, among others. Upon selection of the farm field report, the user interface 1300 displays a series of data entry/selection fields for entering/selecting data for generation of the farm field report, including data for identifying the grower, the farm, the commodity, the variety of the commodity, and the status of the field (active/inactive) to be used in generating the farm field report. In some embodiments, the farm field report can include a mapping of the fields/blocks selected for generation of the report and information for each of the fields/blocks selected for the report, such as commodity and variety grown in the field/block, acreage of the field/block, and geolocation, among other types of information.

Upon selection of the product use report, the user interface 1300 displays a series of data entry/selection fields for entering/selecting data for generation of the product use report, including data for identifying the grower, farm, field, application identifier, number, start date, and completion date, among other types of data. The product use report shows information summarizing how a given agricultural product was applied to a specified geographic area. Upon selection of the sample summary report, the user interface 1300 displays a series of data entry/selection fields for entering/selecting data for generation of the sample summary report, including data for identifying the grower, farm, field, block, sub-block, commodity type, sampling person, date range over which sampling was performed, among other types of data. The sample summary report shows information listing samples that were taken in a specified geographic area, such as soil samples, tissue samples, or other types of samples.

Upon selection of the directed sample points map report, the user interface 1300 displays a series of data entry/selection fields for entering/selecting data for generation of the directed sample points map report, including data for identifying the grower, farm, field, block, sub-block, sample type, sample points, and layer name, among other types of data. The directed sample reports map shows information listing directed samples that were taken in a specified geographic area, such as soil samples, tissue samples, or other types of samples. Upon selection of the field event summary reports, the user interface 1300 displays a series of data entry/selection fields for entering/selecting data for generation of the field event summary report, including data for identifying the grower, farm, field, block, sub-block, field event type, date range over which field events occurred, commodity type and variety, among other types of data. The field event summary report shows information summarizing essentially any type of event that was performed within a specified geographic area.

With reference back to FIG. 53, activation of the applicator schedules icon 5305 causes the user interface 1300 to display a form to allow the user to enter data for scheduling agricultural product applications based on a recommendation generated within the AGVERDICT® system 401. In some embodiments, the application schedule can identify the application method (air/ground), the scheduled application date, and the assigned applicator, among other types of data.

Activation of the user preferences icon 5307 causes the user interface 1300 to display a menu for adjusting/selecting various parameters that affect how the AGVERDICT® system 401 is presented to the user and how the AGVERDICT® system 401 operates for the user. Activation of the manage controller data icon 5309 causes the user interface 1300 to display a form that allows the user to upload controller data, i.e., data from a controller of a specified piece of agricultural equipment, from either a locally stored file or from a controller data service. The user interface 1300 can also show a table listing controller data files that have been uploaded and/or queued for uploading, along with an uploading status indicator. Activation of the documents icon 5313 causes the user interface 1300 to display a form that allows the user to upload and download documents that may be relevant to the grower's agricultural operations.

Activation of the field reports icon 5311 causes the user interface 1300 to display a form that displays a series of data entry/selection fields for entering/selecting data for generation of the field report, including data for identifying the grower, farm, field, block, sub-block, commodity type and variety, source (application event/recommendation), report name (application report, fertilizer report, field history report), report format, and date range of interest, among other types of data. The field report shows information summarizing operations performed within a given field over the specified date range of interest.

Within the AGVERDICT® system 401, one of the more computer intensive operations involves the interpolation of data sample points across a geographical area to create a raster which is used to generate an interpolated heat map. Usually these rasters are at a 1 meter by 1 meter resolution. Due to the fact that the data samples are taken from a relatively smooth function with non-pathological behavior, it is a great saving in time to create an interpolated value at some raster resolution greater than the 1 meter by 1 meter resolution and then fill in the 1 meter by 1 meter raster with calculated points that represent a linear interpolation of the four nearest calculated interpolations. For example, if a 6 meter by 6 meter sampling of the interpolation value is used and linear interpolations of the resulting sub-sampled set are performed to create the 1 meter by 1 meter raster, the result is actually calculation of one fully interpolated value for each of 36 raster elements, which amounts to a reduction of computation costs by a factor of 36.

In some embodiments, the AGVERDICT® system 401 implements an algorithm for creating interpolated rasters that includes making two passes over the input data. A first pass over the input data creates a fully interpolated raster at the requested sub-sampled rate. For example, if it is desired to sub-sample at the rate of one interpolated sample for every 6 meter by 6 meter cell of output data, the first pass over the input data can be done using a step size of 6 meters. In a second pass, the lower resolution raster is scanned and every pixel goes through a filter that generates a patch of raster points corresponding to the expansion of that data point to the final raster resolution. For example, the sub-sampled raster element at position (0,0) would be expanded to cover the patch [(0,0) to (5,5)]. Therefore, the algorithm for creating interpolated rasters includes expansion of a sub-sampled point to the corresponding patch of raster points. This is not as simple as just taking each subsampled point and expanding it because there are adjoining points that contribute to overlapping patches that must be considered.

Figure 54:
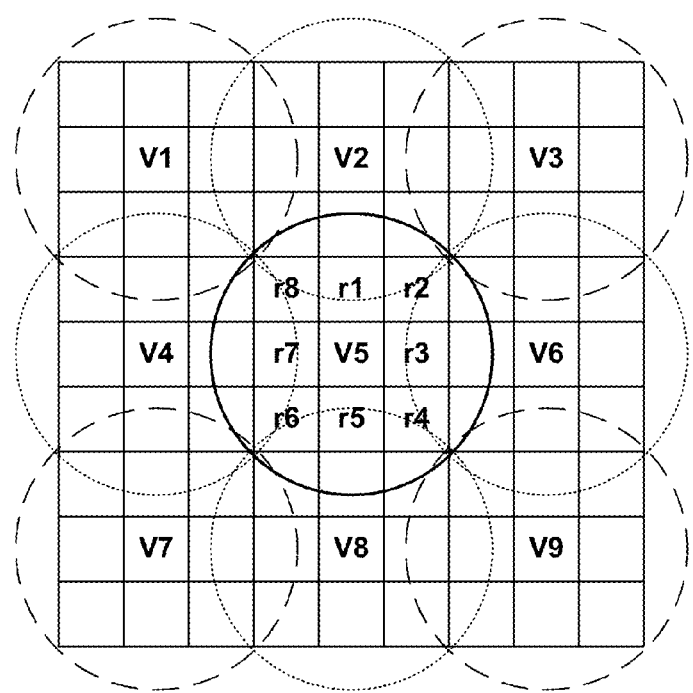
FIG. 54 shows a 9 meter by 9 meter raster at a resolution of 1 meter that has been sampled at a 3 meter by 3 meter sampling rate to illustrate the algorithm for creating interpolated heat maps as implemented by the AGVERDICT® system, in accordance with some embodiments of the present invention.

FIG. 54 shows a 9 meter by 9 meter raster at a resolution of 1 meter that has been sampled at a 3 meter by 3 meter sampling rate to illustrate the algorithm for creating interpolated rasters as implemented by the AGVERDICT® system 401, in accordance with some embodiments of the present invention. In the example of FIG. 54, with regard to the sample point V5, there are eight surrounding raster points r1, r2, r3, r4, r5, r6, r7, and r8 that will be approximated by the values in the sub-sampled raster, i.e., by the values corresponding to sub-sample points V1, V2, V3, V4, V5, V6, V7, V8, and V9. As shown in FIG. 54, there are two classes of raster points that have two different expressions. Specifically, raster points r1, r3, r5, and r7 represent a first class of raster points (class 1), and are approximated as a function of the sub-sample point in whose neighborhood it lies and one other sub-sample point referred to as its nearest neighbor (NN).

For purposes of description, the sub-sample point around which the current interpolation is being performed is referred to as point V. As an example of interpolation for a class 1 point, consider the raster point r7. For raster point r7, its NN is sub-sample point V4. The expression for interpolation for a class 1 raster point is shown in Equation 1, wherein the values of c1 and c2 represent the actual linear mapping from sub-sampled points to the output raster points.

In some embodiments, the linear mapping from sub-sampled points to the output raster points is based on a line-of-sight distance from the sub-sampled points to the output raster points. In these embodiments, with regard to the 3 meter by 3 meter sub-sample raster resolution and 1 meter by 1 meter final output raster resolution of FIG. 54, the value of c1 is 1 and the value of c2 is 2 in Equation 1. In some embodiments, the linear mapping from sub-sampled points to the output raster points can also be based on other parameters in addition to the line-of-sight distance from the sub-sampled points to the output raster points. For example, in some embodiments, elevation and/or surface conditions and/or other parameters associated with the sub-sampled points and the output raster points can be combined with the line-of-sight distance from the sub-sampled points to the output raster points to do the linear mapping from sub-sampled points to the output raster points.

$$[(c1*V)+(c2*NN)]/(c1+c2) \qquad \text{Equation 1.}$$

Raster points r2, r4, r6, and r8 represent a second class of raster points (class 2), and are approximated as a function of the sub-sampled point in whose neighborhood it lies and three other sub-sampled points. Again, the sub-sample point around which the current interpolation is being performed is referred to as point V. The three other sub-sampled points can be labeled as the NearestNeigbor1 (NN1), the Nearest Neighbor2 (NN2), and the Diagonal Neighbor (DN). With regard to FIG. 54, as an example of a class 2 interpolation for raster point r8, DN=V1, NN1=V4, and NN2=V2. The expression for interpolation for a class 2 raster point is shown in Equation 2, wherein the values of c1, c2, c3, and c4 represent the actual linear mapping from sub-sampled points to the output raster points.

As mentioned above, in some embodiments, the linear mapping from sub-sampled points to the output raster points is based on a line-of-sight distance from the sub-sampled points to the output raster points. In these embodiments, with regard to the 3 meter by 3 meter sub-sample raster resolution and 1 meter by 1 meter final output raster resolution of FIG. 54, the value of c3 is 1.414 and the value of c4 is 2.236 and the value of c5 is 2.236 and the value of c6 is 2.828 in Equation 2. As previously mentioned, in some embodiments, the linear mapping from sub-sampled points to the output raster points can also be based on other parameters in addition to the line-of-sight distance from the sub-sampled points to the output raster points.

$$[(c1*V)+(c2*NN1)+(c3*NN2)+(c4*DN)]/(c1+c2+c3+c4) \qquad \text{Equation 2.}$$

The interpolation process for creating interpolated rasters as described with regard to FIG. 54 can be applied when the function being approximated is a smooth continuous function over the geographical coordinate system. If the function being approximated is expected to have small scale discontinuities or rapid excursions on a small scale, the interpolation process described above will tend to smooth out these discontinuities and/or excursions and eliminate them. This smoothing out and possible elimination of discontinuities and/or excursions can be either useful or problematic depending on the intended use of the output raster, i.e., of the interpolation results. In practice, implementation of the above-described interpolation process within the AGVER- DICT® system 401 has increased the calculation speed of a raster of interpolated yield values for a crop data set by a factor of 10 to 100. It should be understood, however, that the AGVERDICT® system 401 can be defined to use many different types of interpolation processes/algorithms, with the above-described raster interpolation process representing an example.

In some embodiments, the AGVERDICT® system 401 provides a cloud-based system for generation of a geospatial data map of agricultural-related data. The geospatial data map is defined to provide a visual depiction of the agricultural-related data, or results based thereon, over a specified geographic area. In some embodiments, the geospatial data map is defined as a heat map for the specified geographic area in which a given geographic area/band having similar agricultural-related data values is depicted by a particular color and in which geographic areas/bands having dissimilar agricultural-related data values are depicted by different colors. In some embodiments, the geospatial data map is defined as a point map for the specified geographic area in which agricultural-related data values are shown at various point locations across the specified geographic area. In some embodiments, the geospatial data map is defined as a zone map for the specified geographic area in which different geographic zones are depicted within the specified geographic area, with the different geographic zones corresponding to different agricultural management parameters based on the agricultural-related data. In some embodiments, the different geographic zones are defined as polygonal shapes based on the agricultural-related data. It should be understood that the heat map, the point map, and the zone map are examples of how the geospatial data map can be defined. In other embodiments, the geospatial data map can be defined in other ways, so long as the geospatial data map provides a visual depiction of the agricultural-related data, or results based thereon, over the specified geographic area.

The AGVERDICT® system 401 includes a registration module configured to provide an agricultural enterprise control application to a subscriber for installation on a remote subscriber computing device. The AGVERDICT® system 401 also includes a data receiving module configured to receive sampled agricultural-related data associated with a given geographic area. The sampled agricultural-related data includes values for an agricultural parameter at different geographic locations within the given geographic area. In some embodiments, the sampled agricultural-related data includes one or more of soil survey geographic database (SSURGO) data, Veris soil electrical conductivity data, soil sampling data, tissue sampling data, aerial imagery data, satellite imagery data, commodity yield data, moisture data, elevation data, field event data, data from controllers of agricultural equipment, product application data, planting data, scouting data, trap counting data, boundary mapping data, field sensor data including soil moisture data, temperature data, barometric pressure data, humidity data, rainfall data, wind speed data, wind direction data, and sunlight intensity data.

In some embodiments, the AGVERDICT® system 401 includes an analysis module configured to process the received sampled agricultural-related data to generate a sub-sampled raster of agricultural-related data over the given geographic area. In some embodiments, the AGVERDICT® system 401 includes a data processing module configured to transform the received sampled agricultural-related data into an analysis-ready format for the analysis module. With reference to FIG. 54, the sub-sampled raster of agricultural-related data over the given geographic area includes data for the 1 meter by 1 meter geographic cells identified as V1, V2, V3, V4, V5, V6, V7, V8, and V9. The analysis module is further configured to process the sub-sampled raster of agricultural-related data over the given geographic area to generate a final output raster of agricultural-related data over the given geographic area. The final output raster has a higher resolution than the sub-sampled raster. For example, with regard to FIG. 54, the final output raster includes data for each of the eighty-one 1 meter by 1 meter geographic cells. The final output raster can also be referred to as a geostatistical raster.

In some embodiments, the AGVERDICT® system 401 includes a geospatial data map generation module configured to generate image data that when used to control a display of the remote subscriber computing device causes the display to show a geospatial data map based on the final output raster of agricultural-related data over the given geographic area. And, in some embodiments, the AGVERDICT® system 401 includes a communication module configured to transmit geospatial data map display instructions including the generated image data over a wireless communication channel to the remote subscriber computing device. The geospatial data map display instructions cause the remote subscriber computing device to process the image data to display the geospatial data map on the display of the remote subscriber computing device.

In some embodiments, the different geographic locations of the sampled agricultural-related data correspond to geographic locations of the sub-sampled raster of the agricultural-related data over the given geographic area, such that each geographic location within the sub-sampled raster has a corresponding sampled value for the agricultural parameter. For example, with reference to the example of FIG. 54, the different geographic locations of the sampled agricultural-related data correspond to geographic locations V1, V2, V3, V4, V5, V6, V7, V8, and V9 of the sub-sampled raster of the agricultural-related data over the given geographic area, such that each geographic location V1, V2, V3, V4, V5, V6, V7, V8, and V9 within the sub-sampled raster has a corresponding sampled value for the agricultural parameter. In other words, in these embodiments, a sampled value for the agricultural-related data is taken at each geographic location V1, V2, V3, V4, V5, V6, V7, V8, and V9 within the sub-sampled raster.

In some embodiments, the analysis module is configured to interpolate between the values for the agricultural parameter at different geographic locations within the given geographic area to generate the sub-sampled raster of the agricultural-related data over the given geographic area, such that each geographic location within the sub-sampled raster has a corresponding value for the agricultural parameter. For example, with reference to the example of FIG. 54, if sampled values for the agricultural-related data is provided at some, but not all, of the geographic locations V1, V2, V3, V4, V5, V6, V7, V8, and V9, the analysis module is configured to interpolate between the sampled values for the agricultural parameter at different geographic locations within the given geographic area to generate the missing values in the sub-sampled raster of the agricultural-related data over the given geographic area, such that each geographic location V1, V2, V3, V4, V5, V6, V7, V8, and V9 within the sub-sampled raster has a corresponding value for the agricultural parameter. For example, if a sampled value for the agricultural parameter is not available for geographic location V2, the analysis module is configured to interpolate between the sampled values for the agricultural parameter at geographic locations V1, V3, and V5 to generate the missing value in the sub-sampled raster at geographic location V2.

In some embodiments, the analysis module is configured to determine estimated values for the agricultural parameter at each geographic location within the final output raster. For example, with reference to the example of FIG. 54, the analysis module is configured to determine estimated values for the agricultural parameter at each of the eighty-one 1 meter by 1 meter geographic locations within the final output raster. In some embodiments, an estimated value for the agricultural parameter at a given geographic location within the final output raster is determined by linearly mapping the values for the agricultural parameter at neighboring geographic locations within the sub-sampled raster onto the given geographic location within the final output raster. For example, as discussed above with regard to FIG. 54, values are estimated for the agricultural parameter at each of the class 1 raster locations (e.g., r1, r3, r5, r7) and each of the class 2 raster locations (r2, r4, r6, r8) by linearly mapping the values of the agricultural parameter at neighboring geographic locations within the sub-sampled raster (V1, V2, V3, V4, V5, V6, V7, V8, V9) onto the class 1 and class 2 raster locations within the final output raster.

Also, as discussed with regard to FIG. 54 and Equation 2, the neighboring geographic locations within the sub-sampled raster relative to a given location within the final output raster correspond to multiple geographic locations within the sub-sampled raster that have either a horizontal spatial relationship to the given geographic location within the final output raster relative to a top view of the final output raster, or a vertical spatial relationship to the given geographic location within the final output raster relative to the top view of the final output raster, or a diagonal spatial relationship to the given geographic location within the final output raster relative to the top view of the final output raster. For example, considering the final output raster location r3 in FIG. 54, the sub-sampled raster locations V5 and V6 have a horizontal spatial relationship to the geographic location of the final output raster location r3 relative to a top view of the final output raster. Also, for example, considering the final output raster location r1 in FIG. 54, the sub-sampled raster locations V5 and V2 have a vertical spatial relationship to the geographic location of the final output raster location r1 relative to a top view of the final output raster. And, for example, considering the final output raster location r2 in FIG. 54, the sub-sampled raster locations V2, V3, V5, and V6 have a diagonal spatial relationship to the geographic location of the final output raster location r2 relative to a top view of the final output raster.

In some embodiments, linearly mapping the values for the agricultural parameter at neighboring geographic locations within the sub-sampled raster onto the given geographic location within the final output raster includes weighting of each value for the agricultural parameter at a given neighboring geographic location by a distance measured between the given neighboring geographic location and the given geographic location within the final output raster. For example, considering the final output raster location r3 in FIG. 54, the values of the agricultural parameter at the sub-sampled raster locations V5 and V6 are linearly mapped onto the final output raster location r3 by: a) weighting the value of the agricultural parameter at the sub-sampled raster location V5 by the distance measured between the geographic location of the sub-sampled raster location V5 and the final output raster location r3, and b) weighting the value of the agricultural parameter at the sub-sampled raster location V6 by the distance measured between the geographic location of the sub-sampled raster location V6 and the final output raster location r3. This weighting is summarized in Equation 1.

And, as another example, considering the final output raster location r8 in FIG. 54, the values of the agricultural parameter at the sub-sampled raster locations V1, V2, V4, and V5 are linearly mapped onto the final output raster location r8 by: a) weighting the value of the agricultural parameter at the sub-sampled raster location V1 by the distance measured between the geographic location of the sub-sampled raster location V1 and the final output raster location r8, and b) weighting the value of the agricultural parameter at the sub-sampled raster location V2 by the distance measured between the geographic location of the sub-sampled raster location V2 and the final output raster location r8, and c) weighting the value of the agricultural parameter at the sub-sampled raster location V5 by the distance measured between the geographic location of the sub-sampled raster location V5 and the final output raster location r8, and d) weighting the value of the agricultural parameter at the sub-sampled raster location V4 by the distance measured between the geographic location of the sub-sampled raster location V4 and the final output raster location r8. This weighting is summarized in Equation 2.

Figure 56:
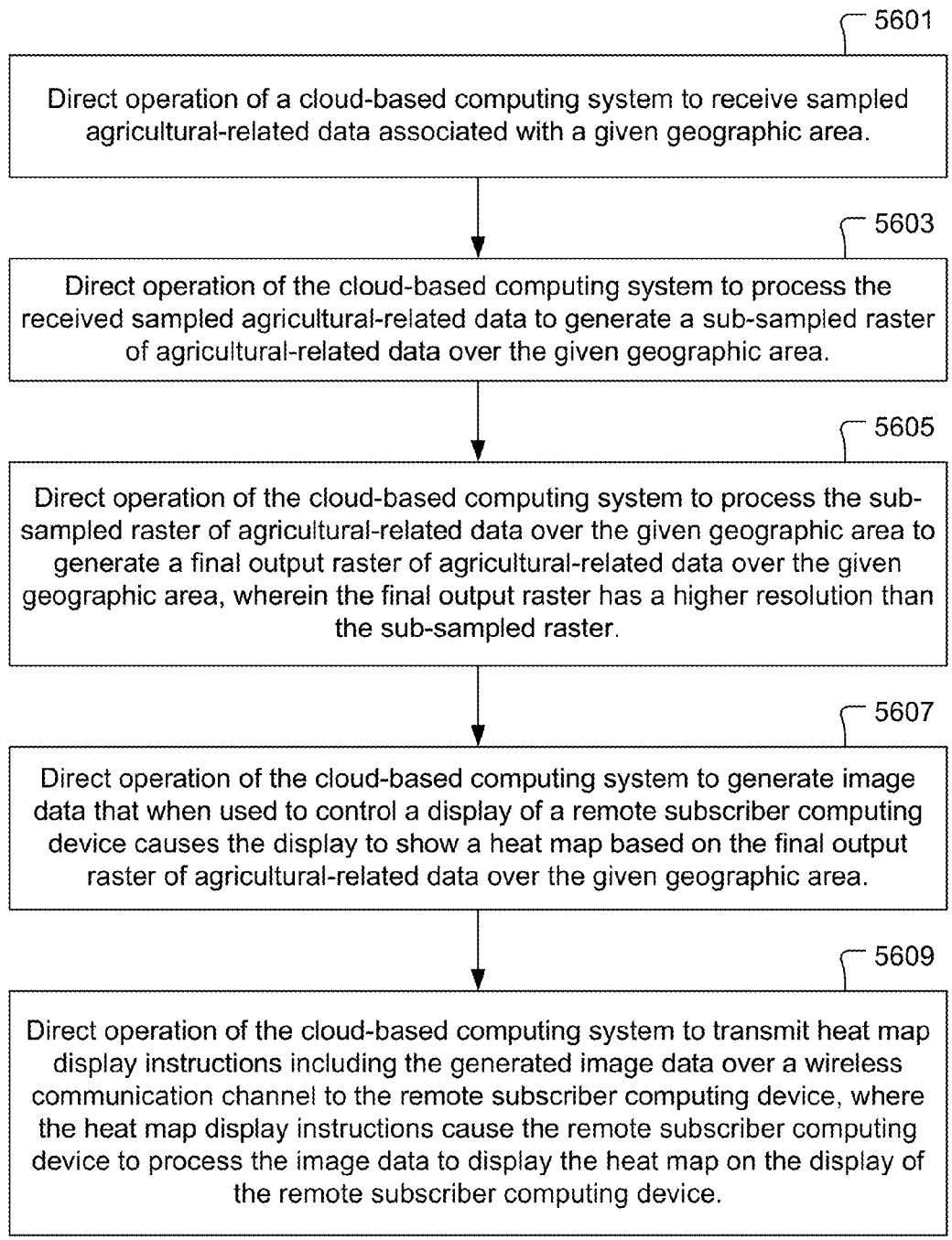
FIG. 56 shows a flowchart of a method for generation of a geospatial data map of agricultural-related data, in accordance with some embodiments of the present invention.

FIG. 56 shows a flowchart of a method for generation of a geospatial data map of agricultural-related data, in accordance with some embodiments of the present invention. The method includes an operation 5601 for directing operation of a cloud-based computing system to receive sampled agricultural-related data associated with a given geographic area. The sampled agricultural-related data includes values for an agricultural parameter at different geographic locations within the given geographic area. In various example embodiments, the sampled agricultural-related data includes one or more of soil survey geographic database (SSURGO) data, Veris soil electrical conductivity data, soil sampling data, tissue sampling data, aerial imagery data, satellite imagery data, commodity yield data, moisture data, elevation data, field event data, data from controllers of agricultural equipment, product application data, planting data, scouting data, trap counting data, boundary mapping data, field sensor data including soil moisture data, temperature data, barometric pressure data, humidity data, rainfall data, wind speed data, wind direction data, and sunlight intensity data.

In some embodiments, the method can include an optional operation for directing operation of the cloud-based computing system to transform the received sampled agricultural-related data into an analysis-ready format. The method also includes an operation 5603 for directing operation of the cloud-based computing system to process the received sampled agricultural-related data to generate a sub-sampled raster of agricultural-related data over the given geographic area.

In some embodiments, the different geographic locations of the sampled agricultural-related data correspond to geographic locations of a sub-sampled raster of agricultural-related data over the given geographic area, such that each geographic location within the sub-sampled raster has a corresponding sampled value for the agricultural parameter. In other words, in these embodiments, a sampled value for the agricultural-related data is taken/available at each geographic location within the sub-sampled raster. Therefore, in these embodiments, the operation 5603 includes directly applying the received sampled agricultural-related data to generate the sub-sampled raster of agricultural-related data over the given geographic area.

In some embodiments, the operation 5603 includes interpolating between the values for the agricultural parameter at different geographic locations within the given geographic area to generate the sub-sampled raster of agricultural-related data over the given geographic area, such that each geographic location within the sub-sampled raster has a corresponding value for the agricultural parameter. For example, if sampled values for the agricultural-related data is provided at some, but not all, of the geographic locations of the sub-sampled raster, interpolation is done between the sampled values for the agricultural parameter to generate the missing values in the sub-sampled raster of the agricultural-related data over the given geographic area, such that each geographic location within the sub-sampled raster has a corresponding value (either directly sampled or interpolated) for the agricultural parameter.

The method also includes an operation 5605 for directing operation of the cloud-based computing system to process the sub-sampled raster of agricultural-related data over the given geographic area to generate a final output raster (i.e., geostatistical raster) of agricultural-related data over the given geographic area. The final output raster has a higher resolution than the sub-sampled raster.

The operation 5605 also includes directing operation of the cloud-based computing system to determine estimated values for the agricultural parameter at each geographic location within the final output raster. In some embodiments, an estimated value for the agricultural parameter at a given geographic location within the final output raster is determined by linearly mapping the values for the agricultural parameter at neighboring geographic locations within the sub-sampled raster onto the given geographic location within the final output raster. The neighboring geographic locations within the sub-sampled raster correspond to multiple geographic locations within the sub-sampled raster that have either a horizontal spatial relationship to the given geographic location within the final output raster relative to a top view of the final output raster, or a vertical spatial relationship to the given geographic location within the final output raster relative to the top view of the final output raster, or a diagonal spatial relationship to the given geographic location within the final output raster relative to the top view of the final output raster.

This linear mapping of values for the agricultural parameter at neighboring geographic locations within the sub-sampled raster onto the given geographic location within the final output raster is discussed above with reference to FIG. 54. Also, as discussed above, in some embodiments, linearly mapping the values for the agricultural parameter at neighboring geographic locations within the sub-sampled raster onto the given geographic location within the final output raster includes weighting of each value for the agricultural parameter at a given neighboring geographic location by a distance measured between the given neighboring geographic location and the given geographic location within the final output raster.

The method also includes an operation 5607 for directing operation of the cloud-based computing system to generate image data that when used to control a display of a remote subscriber computing device causes the display to show a geospatial data map based on the final output raster of agricultural-related data over the given geographic area. And, the method includes an operation 5609 for directing operation of the cloud-based computing system to transmit geospatial data map display instructions including the generated image data over a wireless communication channel to the remote subscriber computing device. The geospatial data map display instructions cause the remote subscriber computing device to process the image data to display the geospatial data map on the display of the remote subscriber computing device.

Conventionally, identification of similar data areas within a geographical raster can be a complicated and poorly defined process. Often, such identification of similar data areas within a geographical raster is done by eye, which brings with it problems of subtle patterns being overlooked or dismissed. In addition, manual editing of zones within a geographical raster can be a labor intensive operation. In processing agricultural data, the AGVERDICT® system 401 can automatically perform many processes that involve finding zones of similar data in a raster image and collecting those points together into defined regions with a label indicating a class of data.

Figure 55:
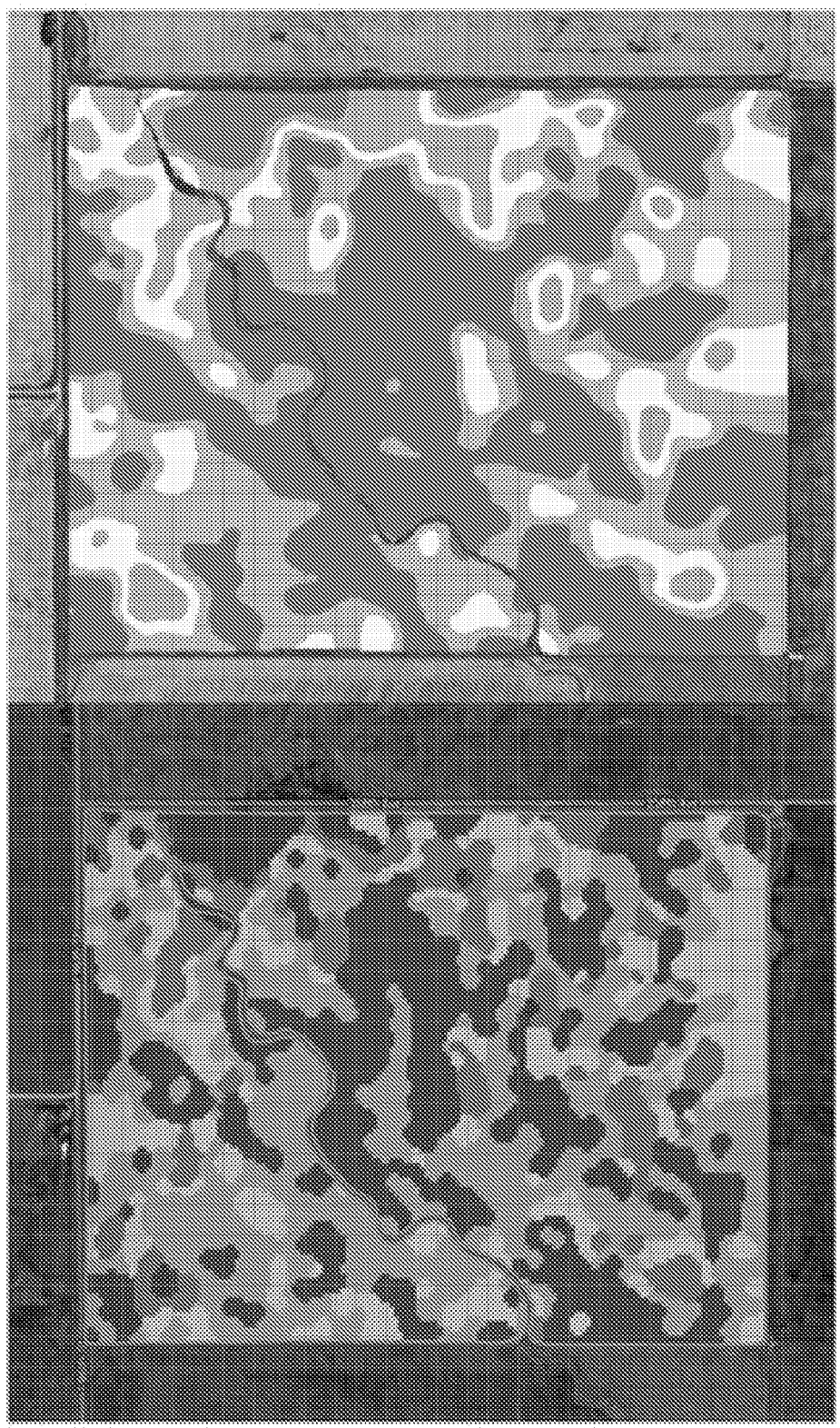
FIG. 55 shows a comparison of zones that are identified using the K-Means algorithm with zones that are identified with an algorithm that preserves laminar types of zones.

Existing zoning algorithms such as K-Nearest Neighbors (KNN) and K-Means tend to create approximately oval zones that can poorly represent the apparent patterns visually present in the geographical raster. One defect present in the results of conventional zoning algorithms is the disappearance of laminar type zones that flow between adjacent zones to create bands of variation. For example, FIG. 55 shows a comparison of zones that are identified using the K-Means algorithm with zones that are identified with an algorithm that preserves laminar types of zones. As shown in FIG. 55, the zones identified using the K-Means algorithm do not show the laminar types of zones that are actually visually present in the geographic raster.

In some embodiments of the present invention, a single linkage hierarchical clustering methodology is adapted to identify linkages between adjacent points on a raster that had been determined to belong provisionally in the same zone. These linkages are identified by linking to adjacent points from a single point to create clusters that have the capability to go around corners and between other clusters. Within the AGVERDICT® system 401, identification of these linkages between adjacent points on the raster is combined with density shift clustering to provide an automatic zone identification method capable of identifying zones having laminar flow characteristics.

In density shift clustering, elements of a data set undergoing a clustering operation are assigned to exemplars. Then, the values of the assigned points are shifted toward the exemplar by some amount known as the learning coefficient. Then, new exemplars are calculated, new assignments are made, and another shift in values is calculated. This density shift clustering method tends to converge to stable cluster groups over several repetitions.

In the AGVERDICT® system 401, a graph of connected points discovered by the single linkage algorithm is used to constitute a group defined by the discovered links. Then, each point in the graph is moved in value towards the average point value for members of that graph. This process continues until the average amount of movement for all elements of the raster fall below a threshold value. In addition, a data annealing process is used in which the range within which a point had to fall to be a member of a cluster was slowly decreased over time. In this manner, it is possible to identify potential clusters of similar data and give them a nudge towards each other and then recalculate the clusters using a narrower criteria so as to find the clusters that survived and became stable.

In some embodiments, certain business constraints can be applied to the zone identification method. For example, in some embodiments, a business constraint can be applied that requires no zone cluster to be smaller than 0.5 acre. In this example embodiment, the last step of processing after finding stable clusters is to identify small clusters and merge them with the closest cluster in space and in average value to comply with the business constraint. This process provides clean and acceptable sized clusters, i.e., zones of similar data, which clearly identify and point out features of the geographical raster that were visible to the naked eye.

The zone identification algorithm implemented by the AGVERDICT® system 401 conceptualizes each point in the raster as either the root of a graph or a node in a graph. A raster point in this structure has a position and up to eight children, because each position in a raster has eight neighbors, such as discussed with regard to FIG. 54. A node takes on the value of the raster at the point that it is assigned to in the graph. The node also keeps a record of the average value of itself and its descendants, the standard deviation of itself and its descendants, the minimum of itself and its descendants, and the maximum of itself and its descendants. These statistics are maintained for graph nodes that are root nodes, because otherwise the update time for adding a new node to a large graph can become excessive.

In the zone identification algorithm implemented by the AGVERDICT® system 401 there are three operations that occur in the clustering process, including 1) initializing the raster with single point graphs, 2) identifying stable clusters, and 3) removing clusters that are too small. For the operation of initializing the raster with single point graphs, there are several operations performed to get a raster ready for cluster analysis, including 1) cleaning the data, 2) determining zone bands, and 3) normalizing the data. To clean the data, all of the raster data is scanned and any values that are Infinite or a NaN value are replaced with the raster's no data value. The no data value is a float value that has been designated to signify that at this point the raster has no valid value. To determine zone bands, a palette generation method is applied to the raster to create definitions of the maximum and minimum values for each zone. In some embodiments, the palette generation method is the K-Means method, but in other embodiments, any palette generation method can be used, such as one that satisfies the IPallete interface. Also, the minimum value and the maximum value are recorded for the raster. If the values in the raster span a range that is too small to effectively cluster, the data in the raster can be normalized. In some embodiments, a normalization method referred to as "normalize plus one" is used. This normalize plus one method normalizes the values to a range of 0 to 99 and then adds one to the normalized value. This ensures that there are no zero values in the data. If the data is normalized, then the palette ranges are normalized also, as well as the recorded minimum value and the maximum value for the raster.

For the operation of identifying stable clusters, a function is used to define new links given to a point and its neighbors. The function takes the raster which is going to be analyzed and performs an estimation-maximization process on the raster. First, the graph links are calculated to create an estimation of the correct zone assignments. Then, the raster is updated to partially maximize the raster values membership in this zone by moving them in value towards the zone in which they should reside. Raster values that are clearly in one of the zones quickly move toward the zones mid-value and stay there. Points that are ambivalent will move back and forth between candidate zones, but as the small zone parameter and the learning parameter increases and the smoothing operations are applied these ambivalent points will eventually get locked into a stable zone and stop shifting around.

The following outline describes the function for creating graphs of connected points on the raster of singular graph nodes:

I. CreateClusterLinks:
1. Scan through the raster and for each PointGraph node that is a root node and has not been marked as having been visited do the following:
   a. Create a new queue of PointGraphs and place the current PointGraph in the queue
   b. While the queue is not empty do the following:
      i. Dequeue the next PointGraph
      ii. If this PointGraph has not been visited do the following:
         1. Get neighboring PointGraphs
         2. If there are more than zero neighbors, call the links function on neighbors to add qualifying points to the current PointGraph
         3. Add all unvisited neighbors to queue
         4. Update PointGraph in raster
      iii. If this Point Graph has been visited go to step i.

II. While the total movement of values in the raster is greater than a threshold value do the following:
1. Create a raster of PointGraphs set to the value at each raster point
2. Call CreateClusterLinks
3. With the Updated raster of PointGraphs do the following Aggregation and Learning Operation:
   a. Scan the raster and get a list of all root nodes in the raster.
   b. Partition the list of graphs according to whether they are larger or smaller than a set size. In this case, use the square of the iteration number. So effectively each iteration we are coalescing areas with one more number of rows and columns, even though each graph represents an irregular shaped set of connected raster points.
   c. For each small graph thus identified, the value at each node of the graph is set to the mid-point of the majority vote of band codes amongst its neighbors.
   d. Now the original raster values and the PointGraph values are used to perform a bounded Hebbian learning step to update the values in the raster being analyzed. The learning function is as shown in Equation 3:

$$X_{orig} - \beta*(X_{orig} - X.\text{Root.Avg}_{point\ graph})\qquad\text{Equation 3.}$$

where β is a learning coefficient. $X_{orig}$ is the value of the original raster at a point on the raster. And $X.\text{Root.Avg}_{point\ graph}$ is the root average for the graph node located at the same point on the raster. The bounds for the update are the original minimum and maximum calculated in the previous operation of initializing the raster with single point graphs. The amount of change in the original value is collected over the entire raster to determine how much the values in the raster have changed on the average for points that were adjusted.

4. The raster is then smoothed by taking the median of a small neighborhood around each point.

The operation of removing clusters that are too small is an optional business logic requirement for removing all zones that are smaller than an specified threshold size (x acre). Since after normalization, all rasters have a 1 meter by 1 meter resolution, it is desirable to remove all identified graphs that are smaller than y nodes since each represents 1 square meter. For example, if the threshold size is 0.5 acre (x=0.5 acre), then graphs that are smaller than 2023 nodes (y=2023 nodes) are removed. The number of small zone removal passes performed is based on smoothing requirements passed into the top level function call.

The following outline describes the function for performing an initial smoothing operation on the raster:

I. While the required number of passes have not been completed and while there are still small zones remaining, perform the following actions:
 1. Create a raster of graph nodes from the input raster
 2. Call CreateClusterLinks
 3. Partition graphs into two groups, those larger than size y and those smaller than size y
 4. For each graph in the small graph class do the following:
  a. If graph has a single node, get its neighbors. If graph is larger than a single node, get the corners of its minimum bounding rectangle and place in a list called the fill values.
  b. Get candidate list of distinct elements of this list that have band codes greater than zero and are not equal to the node value of this graph node.
  c. If there are candidate elements, fill the graph's node positions with the value from the candidate list that is closest in value to the graphs root node value.
  d. If there are no candidate values, take the average of all fill values calculated in step a that have a non-zero band value.
  e. Fill all the points in the small graph with this value.

After the zone processing has finished, some clean up operations can be performed on the raster. For example, if normalization has been applied to the raster, the raster is de-normalized to revert back to its original values and the palette bands are re-calculated using the de-normalized raster.

It should be appreciated that the AGVERDICT® system 401 provides for merging of agriculture data with geolocation data to provide: geolocation-dependent monitoring of agricultural processes, geolocation-dependent analysis of agricultural data, generation of geolocation-dependent agricultural data analysis reports, generation of geolocation-dependent recommendations for crop selection and for variety/hybrid selection based on analysis of agricultural data, generation of geolocation-dependent agricultural process recommendations (prescriptions) based on analysis of agricultural data, generation of geographic zone maps within a given field based on analysis of agricultural data to provide for precise recommendations, and generation and transmission of machine controller instructions to enable automatic implementation of geolocation-dependent agricultural process recommendations (prescriptions), among other functions and services.

The AGVERDICT® system 401 is capable of taking in data from a variety of data sources including manual data entered by the grower and/or trusted advisor, data automatically acquired by operation of equipment in field (controller data), data provided from laboratories, data provided from trusted advisors, data from satellite imagery, among other types of data. Examples of the types of data that can be input to the AGVERDICT® system 401 include soil and tissue sampling data, scouting data, trap counting data, SSURGO data, data from field sensors, satellite imagery data, aerial imagery data, machine (controller) data, field event data, among other types of data.

The AGVERDICT® system 401 implements a closed-loop data process flow including data collection, data analysis, automated and/or manual agricultural operation decision making based on the data analysis, and continuing back with data collection. The data collected by the AGVERDICT® system 401 can be processed to generate zone-level results. And, based on these zone-level results, the AGVERDICT® system 401 can generate planting maps and prescription maps, including variable rate maps that specify how a given agricultural operation is to be performed within a given geographic area as a function of geolocation. The planting maps, prescription map, and variable rate maps can be transmitted to the grower directly from the AGVERDICT® system 401, and in some cases can be transmitted directly from the AGVERDICT® system 401 to controllers and/or controller services of agricultural equipment within the grower's agricultural enterprise. The controllers then execute the planting map, prescription map, and/or variable rate map in the field in an automated manner and report data back to the AGVERDICT® system 401 regarding how the prescribed operations were actually performed in the field.

The AGVERDICT® system 401 also provides for nutrition recommendation equation generation in which equations/algorithms can be created, saved and shared for creating zone-level variable rate maps for process recommendations. The equations can be defined using different types of variables (database variables, user-defined variables, among other variable types) based on data from field sampling, management zones, and user-defined information, among other types of data. The equations can also use nested arguments and conditional statements, such as if-then-else-elseif statements, and can use other algorithm control structures, such as for-loops, while-loops, and essentially any other type of logical algorithm control structure.

The AGVERDICT® system 401 also provides the label checking feature for verifying that recommended products and recommended applications of products are legal and used according to manufacturer instructions. The label checking feature verifies that recommendations generated within the AGVERDICT® system 401 comply with manufacturer labels for chemicals and with federal, state, and local regulations. Implementation of the label checking feature can include use of an electronic label database, such as the Crop Data Management System (CDMS). In some embodiments, the label checking features operates to automatically compare products and/or product combinations to be applied, commodity, timing, methods of applications, and other factors about the field to the manufacturer label information and to applicable regulations.

The AGVERDICT® system 401 is implemented within a cloud-based computing platform and can be accessed over the Internet. All data provided to the AGVERDICT® system 401 can be uploaded to the cloud. Information and results generated by the AGVERDICT® system 401 can be wirelessly transmitted to the user's computing device for display within either a web browser or through an application executing on the user's computing device. Also, the AGVERDICT® system 401 interface provided on the user's computing device can be used to enter data into the AGVERDICT® system 401, such as scouting data, trap counting data, sampling data, or other types of observational data. Prescriptions generated by the AGVERDICT® system 401 can be wirelessly transmitted to machine controllers or hardwire transmitted, e.g., by flash drive. The prescriptions can be formatted as needed for any type of machine controller.

In the various embodiments described herein, it should be understood that embodiments may be combined to define specific implementations, and in some cases, implementations can be defined by combining only specific elements described herein. In each of the implementations, the systems provide physical technical results. These technical results are not results that can be manually produced by paper and pencil, but instead require processing by client devices, servers, and distributed internet systems, so as to provide intelligent data that can be used in an efficient manner via receiving devices. In some instances, the results are embodied in specific plans that are engineered to meet a specific technical goal. The technical goal can, for instance, define plan for use of specific agricultural methods, use specific quantifies of supplies, apply specific agricultural nutrients to the land, work the land in specific manners, and/or adjust land maintenance or production plans to meet predefined goals and/or requirements. In some embodiments, implementations described herein can assist farming efforts to improve crop production, improve water utilization, avoid drought impacts, re-engineer farming plans and/or procedures, and/or define specific action plans for improving farming operations. In some embodiments, the data and/or reports can be generated dynamically via a computing device, which may be provided with access to the Internet (e.g., databases, servers, APIs, GPS, etc.). A server or groups of servers can, in some embodiments, be configured to process cloud operations that enable processing of data. The data may be data that is gathered dynamically from other severs, systems, or user input, and the data may be optimized and processed for specific user/client implementations to meet requests and/or supply recommendations.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A cloud-based system for generation of a geospatial data map of agricultural-related data, comprising:
    a registration module configured to provide an agricultural enterprise control application to a subscriber for installation on a remote subscriber computing device, wherein the registration module is stored in a memory;
    a data receiving module configured to receive sampled agricultural-related data associated with a given geographic area, wherein the data receiving module is stored in a memory;
    an analysis module configured to process the received sampled agricultural-related data to generate a sub-sampled raster of agricultural-related data over the given geographic area, the analysis module further configured to process the sub-sampled raster of agricultural-related data over the given geographic area to generate a final output raster of agricultural-related data over the given geographic area, the final output raster having a higher resolution than the sub-sampled raster, wherein the analysis module is stored in a memory;
    a geospatial data map generation module configured to generate image data that when used to control a display of the remote subscriber computing device causes the display to show a geospatial data map based on the final output raster of agricultural-related data over the given geographic area, wherein the geospatial data map generation module is stored in a memory; and
    a communication module configured to transmit geospatial data map display instructions including the generated image data over a wireless communication channel to the remote subscriber computing device, wherein the geospatial data map display instructions cause the remote subscriber computing device to process the image data to display the geospatial data map on the display of the remote subscriber computing device, wherein the communication module is stored in a memory.

2. The cloud-based system for generation of the geospatial data map of agricultural-related data as recited in claim 1, wherein the sampled agricultural-related data includes values for an agricultural parameter at different geographic locations within the given geographic area.

3. The cloud-based system for generation of the geospatial data map of agricultural-related data as recited in claim 2, wherein the different geographic locations of the sampled agricultural-related data correspond to geographic locations of the sub-sampled raster of the agricultural-related data over the given geographic area, such that each geographic location within the sub-sampled raster has a corresponding sampled value for the agricultural parameter.

4. The cloud-based system for generation of the geospatial data map of agricultural-related data as recited in claim 3, wherein the analysis module is configured to determine estimated values for the agricultural parameter at each geographic location within the final output raster, wherein an estimated value for the agricultural parameter at a given geographic location within the final output raster is determined by linearly mapping the values for the agricultural parameter at neighboring geographic locations within the sub-sampled raster onto the given geographic location within the final output raster.

5. The cloud-based system for generation of the geospatial data map of agricultural-related data as recited in claim 4, wherein the neighboring geographic locations within the sub-sampled raster correspond to multiple geographic locations within the sub-sampled raster that have either a horizontal spatial relationship to the given geographic location within the final output raster relative to a top view of the final output raster, or a vertical spatial relationship to the given geographic location within the final output raster relative to the top view of the final output raster, or a diagonal spatial relationship to the given geographic location within the final output raster relative to the top view of the final output raster.

6. The cloud-based system for generation of the geospatial data map of agricultural-related data as recited in claim 4, wherein linearly mapping the values for the agricultural parameter at neighboring geographic locations within the sub-sampled raster onto the given geographic location within the final output raster includes weighting of each value for the agricultural parameter at a given neighboring geographic location by a distance measured between the given neighboring geographic location and the given geographic location within the final output raster.

7. The cloud-based system for generation of the geospatial data map of agricultural-related data as recited in claim 2, wherein the analysis module is configured to interpolate between the values for the agricultural parameter at different geographic locations within the given geographic area to generate the sub-sampled raster of the agricultural-related data over the given geographic area, such that each geographic location within the sub-sampled raster has a corresponding value for the agricultural parameter.

8. The cloud-based system for generation of the geospatial data map of agricultural-related data as recited in claim 7, wherein the analysis module is configured to determine estimated values for the agricultural parameter at each geographic location within the final output raster, wherein an estimated value for the agricultural parameter at a given geographic location within the final output raster is determined by linearly mapping the values for the agricultural parameter at neighboring geographic locations within the sub-sampled raster onto the given geographic location within the final output raster.

9. The cloud-based system for generation of the geospatial data map of agricultural-related data as recited in claim 8, wherein the neighboring geographic locations within the sub-sampled raster correspond to multiple geographic locations within the sub-sampled raster that have either a horizontal spatial relationship to the given geographic location within the final output raster relative to a top view of the final output raster, or a vertical spatial relationship to the given geographic location within the final output raster relative to the top view of the final output raster, or a diagonal spatial relationship to the given geographic location within the final output raster relative to the top view of the final output raster.

10. The cloud-based system for generation of the geospatial data map of agricultural-related data as recited in claim 8, wherein linearly mapping the values for the agricultural parameter at neighboring geographic locations within the sub-sampled raster onto the given geographic location within the final output raster includes weighting of each value for the agricultural parameter at a given neighboring geographic location by a distance measured between the given neighboring geographic location and the given geographic location within the final output raster.

11. The cloud-based system for generation of the geospatial data map of agricultural-related data as recited in claim 1, further comprising:
a data processing module configured to transform the received sampled agricultural-related data into an analysis-ready format for the analysis module, wherein the data processing module is stored in a memory.

12. The cloud-based system for generation of the geospatial data map of agricultural-related data as recited in claim 1, wherein the sampled agricultural-related data includes one or more of soil survey geographic database (SSURGO) data, Veris soil electrical conductivity data, soil sampling data, tissue sampling data, aerial imagery data, satellite imagery data, commodity yield data, moisture data, elevation data, field event data, data from controllers of agricultural equipment, product application data, planting data, scouting data, trap counting data, boundary mapping data, field sensor data including soil moisture data, temperature data, barometric pressure data, humidity data, rainfall data, wind speed data, wind direction data, and sunlight intensity data.

13. A method for generation of a geospatial data map of agricultural-related data, comprising:
directing operation of a cloud-based computing system to receive sampled agricultural-related data associated with a given geographic area;
directing operation of the cloud-based computing system to process the received sampled agricultural-related data to generate a sub-sampled raster of agricultural-related data over the given geographic area;
directing operation of the cloud-based computing system to process the sub-sampled raster of agricultural-related data over the given geographic area to generate a final output raster of agricultural-related data over the given geographic area, the final output raster having a higher resolution than the sub-sampled raster;
directing operation of the cloud-based computing system to generate image data that when used to control a display of a remote subscriber computing device causes the display to show a geospatial data map based on the final output raster of agricultural-related data over the given geographic area; and
directing operation of the cloud-based computing system to transmit geospatial data map display instructions including the generated image data over a wireless communication channel to the remote subscriber computing device, wherein the geospatial data map display instructions cause the remote subscriber computing device to process the image data to display the geospatial data map on the display of the remote subscriber computing device.

14. The method as recited in claim 13, wherein the sampled agricultural-related data includes values for an agricultural parameter at different geographic locations within the given geographic area.

15. The method as recited in claim 14, wherein the different geographic locations of the sampled agricultural-related data correspond to geographic locations of the sub-sampled raster of agricultural-related data over the given geographic area, such that each geographic location within the sub-sampled raster has a corresponding sampled value for the agricultural parameter.

16. The method as recited in claim 15, wherein directing operation of the cloud-based computing system to process the sub-sampled raster of agricultural-related data over the given geographic area to generate the final output raster of agricultural-related data over the given geographic area includes directing operation of the cloud-based computing system to determine estimated values for the agricultural parameter at each geographic location within the final output raster, wherein an estimated value for the agricultural parameter at a given geographic location within the final output raster is determined by linearly mapping the values for the agricultural parameter at neighboring geographic locations within the sub-sampled raster onto the given geographic location within the final output raster.

17. The method as recited in claim 16, wherein the neighboring geographic locations within the sub-sampled raster correspond to multiple geographic locations within the sub-sampled raster that have either a horizontal spatial relationship to the given geographic location within the final output raster relative to a top view of the final output raster, or a vertical spatial relationship to the given geographic location within the final output raster relative to the top view of the final output raster, or a diagonal spatial relationship to the given geographic location within the final output raster relative to the top view of the final output raster.

18. The method as recited in claim 16, wherein linearly mapping the values for the agricultural parameter at neighboring geographic locations within the sub-sampled raster onto the given geographic location within the final output raster includes weighting of each value for the agricultural parameter at a given neighboring geographic location by a distance measured between the given neighboring geographic location and the given geographic location within the final output raster.

19. The method as recited in claim 14, wherein directing operation of the cloud-based computing system to process the received sampled agricultural-related data to generate the sub-sampled raster of agricultural-related data over the given geographic area includes interpolating between the values for the agricultural parameter at different geographic locations within the given geographic area to generate the sub-sampled raster of agricultural-related data over the given geographic area, such that each geographic location within the sub-sampled raster has a corresponding value for the agricultural parameter.

20. The method as recited in claim 19, wherein directing operation of the cloud-based computing system to process the sub-sampled raster of agricultural-related data over the given geographic area to generate the final output raster of agricultural-related data over the given geographic area includes determining estimated values for the agricultural parameter at each geographic location within the final output raster, wherein an estimated value for the agricultural parameter at a given geographic location within the final output raster is determined by linearly mapping the values for the agricultural parameter at neighboring geographic locations within the sub-sampled raster onto the given geographic location within the final output raster.

21. The method as recited in claim 20, wherein the neighboring geographic locations within the sub-sampled raster correspond to multiple geographic locations within the sub-sampled raster that have either a horizontal spatial relationship to the given geographic location within the final output raster relative to a top view of the final output raster, or a vertical spatial relationship to the given geographic location within the final output raster relative to the top view of the final output raster, or a diagonal spatial relationship to the given geographic location within the final output raster relative to the top view of the final output raster.

22. The method as recited in claim 20, wherein linearly mapping the values for the agricultural parameter at neighboring geographic locations within the sub-sampled raster onto the given geographic location within the final output raster includes weighting of each value for the agricultural parameter at a given neighboring geographic location by a distance measured between the given neighboring geographic location and the given geographic location within the final output raster.

23. The method as recited in claim 13, further comprising:
  directing operation of the cloud-based computing system to transform the received sampled agricultural-related data into an analysis-ready format.

24. The method as recited in claim 13, wherein the sampled agricultural-related data includes one or more of soil survey geographic database (SSURGO) data, Veris soil electrical conductivity data, soil sampling data, tissue sampling data, aerial imagery data, satellite imagery data, commodity yield data, moisture data, elevation data, field event data, data from controllers of agricultural equipment, product application data, planting data, scouting data, trap counting data, boundary mapping data, field sensor data including soil moisture data, temperature data, barometric pressure data, humidity data, rainfall data, wind speed data, wind direction data, and sunlight intensity data.

* * * * *